(12) United States Patent
Ikenaga

(10) Patent No.: US 12,480,200 B2
(45) Date of Patent: Nov. 25, 2025

(54) METHOD OF QUALITY DETERMINING OF DEPOSITION MASK, METHOD OF MANUFACTURING DEPOSITION MASK, METHOD OF MANUFACTURING DEPOSITION MASK DEVICE, METHOD OF SELECTING DEPOSITION MASK, AND DEPOSITION MASK

(71) Applicant: DAI NIPPON PRINTING CO., LTD., Tokyo (JP)

(72) Inventor: Chikao Ikenaga, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 261 days.

(21) Appl. No.: 18/329,004

(22) Filed: Jun. 5, 2023

(65) Prior Publication Data

US 2023/0329077 A1 Oct. 12, 2023

Related U.S. Application Data

(60) Division of application No. 17/142,582, filed on Jan. 6, 2021, which is a continuation of application No. PCT/JP2019/023374, filed on Jun. 12, 2019.

(30) Foreign Application Priority Data

Jul. 9, 2018 (JP) .................................. 2018-130259

(51) Int. Cl.
*G03F 7/00* (2006.01)
*C23C 14/04* (2006.01)
(Continued)

(52) U.S. Cl.
CPC .......... *C23C 14/042* (2013.01); *G03F 7/0015* (2013.01); *G06T 7/0006* (2013.01);
(Continued)

(58) Field of Classification Search
CPC ........ C23C 14/042; C23C 14/12; C23C 14/24
See application file for complete search history.

(56) References Cited

U.S. PATENT DOCUMENTS 5,214,563 A 5/1993 Estes
5,456,771 A 10/1995 Inoue et al.
(Continued)

FOREIGN PATENT DOCUMENTS

CN 104838037 A 8/2015
CN 105637110 A 6/2016
(Continued)

OTHER PUBLICATIONS

English translation JP-2019508588-A (Year: 2019).*
(Continued)

*Primary Examiner* — Jason L Vaughan
*Assistant Examiner* — Amanda Kreiling
(74) *Attorney, Agent, or Firm* — BURR PATENT LAW, PLLC

(57) ABSTRACT

A method of quality determination of a deposition mask according to the present disclosure includes: a measuring step that measures a dimension X1 from a P1 point to a Q1 point, and a dimension X2 from a P2 point to a Q2 point; and a determining step that determines a quality of a deposition mask, based on the dimension X1 and the dimension X2 measured in the measuring step.

7 Claims, 34 Drawing Sheets

(51) Int. Cl.
  G06T 7/00 (2017.01)
  H10K 71/16 (2023.01)
(52) U.S. Cl.
  CPC ......... *H10K 71/164* (2023.02); *H10K 71/166* (2023.02); *G06T 2207/30108* (2013.01)

(56) References Cited

U.S. PATENT DOCUMENTS

| | | | |
|---|---|---|---|
| 5,534,969 | A | 7/1996 | Miyake |
| 7,794,545 | B2 | 9/2010 | Yotsuya |
| 8,286,579 | B2 | 10/2012 | Sung et al. |
| 10,600,963 | B2 | 3/2020 | Ikenaga |
| 10,991,883 | B2 | 4/2021 | Ikenaga |
| 2003/0101932 | A1 | 6/2003 | Kang |
| 2005/0287897 | A1 | 12/2005 | Tanaka et al. |
| 2009/0311427 | A1 | 12/2009 | Marcanio et al. |
| 2011/0171768 | A1 | 7/2011 | Hong et al. |
| 2011/0229633 | A1 | 9/2011 | Hong et al. |
| 2012/0217474 | A1 | 8/2012 | Zang et al. |
| 2012/0240850 | A1 | 9/2012 | Kobayashi et al. |
| 2014/0147949 | A1 | 5/2014 | Hong et al. |
| 2015/0328662 | A1 | 11/2015 | Mizumura |
| 2016/0208392 | A1 | 7/2016 | Ikenaga et al. |
| 2016/0237546 | A1 | 8/2016 | Ikenaga et al. |
| 2016/0293844 | A1 | 10/2016 | Takeda et al. |
| 2017/0130320 | A1 | 5/2017 | Kobayashi et al. |
| 2017/0141315 | A1 | 5/2017 | Ikenaga |
| 2017/0278905 | A1 | 9/2017 | Hsu et al. |
| 2018/0071764 | A1 | 3/2018 | Gong et al. |
| 2018/0083193 | A1 | 3/2018 | Kim et al. |
| 2018/0351164 | A1 | 12/2018 | Hellmich et al. |
| 2019/0112699 | A1 | 4/2019 | Shinno |
| 2019/0140178 | A1 | 5/2019 | Ikenaga |
| 2019/0323117 | A1 | 10/2019 | Ikenaga |
| 2021/0140030 | A1 | 5/2021 | Jang |
| 2021/0187576 | A1 | 6/2021 | Wu et al. |
| 2021/0242405 | A1 | 8/2021 | Ikenaga |

FOREIGN PATENT DOCUMENTS

| | | | | |
|---|---|---|---|---|
| CN | 108286034 | A | | 7/2018 |
| CN | 208501081 | U | | 2/2019 |
| EP | 1 426 461 | A1 | | 6/2004 |
| JP | 2001-234385 | A1 | | 8/2001 |
| JP | 2006-012597 | A | | 1/2006 |
| JP | 2007-186740 | A | | 7/2007 |
| JP | 2009-074160 | A | | 4/2009 |
| JP | 2009-127127 | A | | 6/2009 |
| JP | 2011-195960 | A | | 10/2011 |
| JP | 2012-111195 | A | | 6/2012 |
| JP | 5382259 | B1 | | 1/2014 |
| JP | 2014-148743 | A1 | | 8/2014 |
| JP | 5641462 | B1 | | 11/2014 |
| JP | 2015-078401 | A1 | | 4/2015 |
| JP | 2015-168884 | A | | 9/2015 |
| JP | 2016-053192 | A1 | | 4/2016 |
| JP | 2017-020080 | A1 | | 1/2017 |
| JP | 6299922 | B1 | | 3/2018 |
| JP | 2019508588 | A | * | 3/2019 |
| JP | 7288594 | B2 | | 6/2023 |
| JP | 7356653 | B2 | | 10/2023 |
| WO | WO-2017171309 | A1 | * 10/2017 | ........... C23C 14/042 |
| WO | 2018/131474 | A1 | | 7/2018 |
| WO | 2020/012862 | A1 | | 1/2020 |

OTHER PUBLICATIONS

Korean Office Action (with English translation) dated Feb. 16, 2024 (Application No. 10-2023-7011789).
Japanese Office Action (with English translation) dated Nov. 7, 2023 (Application No. 2023-159190).
Japanese Office Action (with English translation) dated Jan. 12, 2024 (Application No. 2023-087262).
Japanese Office Action (with English translation) dated Jan. 19, 2024 (Application No. 2023-159190).
U.S. Advisory Action (U.S. Appl. No. 17/142,582) dated Jun. 15, 2023 (11 pages).
Chinese Office Action (with English translation) dated Aug. 11, 2023 (Application No. 202210978739.4).
Japanese Office Action (with English translation) dated Oct. 27, 2023 (Application No. 2023-087262).
International Search Report and Written Opinion (Application No. PCT/JP2019/023374) dated Aug. 27, 2019.
Japanese Office Action (Application No. 2017-238092) dated Apr. 27, 2018 (with English translation).
Japanese Office Action (Application No. 2018-138764) dated Aug. 17, 2018 (with English translation).
Korean Office Action (Application No. 10-2018-7031082) dated Mar. 24, 2020 (with English translation).
Extended European Search Report (Application No. 17891878.5) dated Oct. 12, 2020.
Taiwanese Office Action (Application No. 109105393) dated Nov. 19, 2020 (with English translation).
International Search Report and Written Opinion (Application No. PCT/JP2017/046751) dated Feb. 13, 2018 (with English translation).
English translation of the International Preliminary Report on Patentability (Chapter I) (Application No. PCT/JP2017/046751) dated Jul. 25, 2019.
Korean Office Action (Application No. 10-2020-7030539) dated Jan. 4, 2021 (with English translation).
English translation of the International Preliminary Report on Patentability (Chapter I) (Application No. PCT/JP2019/023374) dated Jan. 21, 2021.
U.S. Office Action (U.S. Appl. No. 16/096,480) dated Jun. 29, 2020.
Japanese Office Action (Application No. 2018-192919) dated Nov. 30, 2021 (with English translation).
Japanese Office Action (Application No. 2020-530050) dated Jan. 28, 2022 (with English translation).
Extended European Search Report (Application No. 19834110.9) dated Apr. 5, 2022.
Chinese Office Action (Application No. 201910603031.9) dated Apr. 25, 2022 (with English translation).
Chinese Office Action (Application No. 202010440398.6) dated May 6, 2022 (with English translation).
Japanese Office Action (Application No. 2018-192919) dated May 27, 2022 (with English translation).
Korean Office Action (Application No. 10-2021-7003519) dated Aug. 19, 2022 (with English translation).
Japanese Office Action (Application No. 2018-192919) dated Sep. 27, 2022 (with English translation).
Japanese Office Action (Application No. 2018-192919) dated Mar. 3, 2023 (with English translation).
Korean Office Action (with English translation) dated Jun. 25, 2024 (Application No. 10-2023-7011789).
U.S. Examiner's Answer (U.S. Appl. No. 17/142,582) dated Sep. 13, 2023 (23 pages).
Decision on Appeal dated May 2, 2025 (U.S. Appl. No. 17/142,582).

* cited by examiner $\alpha_X=200, \alpha_Y=65.0$

| SAMPLE | $\alpha_x-X1$ | $\alpha_x-X2$ | $\|\alpha_x-(X1+X2)/2\|$ THRESHOLD VALUE: 13.3 μm | $\alpha_u-U1$ THRESHOLD VALUE: ±4.0 μm | DETERMINATION RESULT OF EQUATION (1) | $\|X1-X2\|$ THRESHOLD VALUE: 20.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -13.6 | 6.4 | 3.6 | 3.9 | OK | 20.0 | 2.7 | OK | OK |
| 2 | -4.9 | -4.1 | 4.5 | 3.8 | OK | 0.9 | 0.1 | OK | OK |
| 3 | 2.1 | -7.6 | 2.8 | 3.1 | OK | 9.7 | 0.9 | OK | OK |
| 4 | 5.9 | 13.3 | 9.6 | -3.8 | OK | 7.4 | 0.8 | OK | OK |
| 5 | 13.0 | 13.5 | 13.3 | -3.9 | OK | 0.5 | 0.1 | OK | OK |
| 6 | 13.0 | -7.0 | 3.0 | -0.4 | OK | 20.0 | 3.0 | OK | OK |
| 7 | -13.5 | 8.0 | 2.7 | 3.0 | OK | 21.5 | 3.2 | NG | NG |
| 8 | -8.7 | 12.9 | 2.1 | -0.4 | OK | 21.5 | 3.3 | NG | NG |
| 9 | 8.6 | -12.9 | 2.1 | 2.7 | OK | 21.5 | 3.1 | NG | NG |
| 10 | 13.3 | -8.2 | 2.6 | 0.2 | OK | 21.4 | 3.3 | NG | NG |
| 11 | -26.1 | -11.5 | 18.8 | 11.6 | NG | 14.6 | 2.2 | OK | NG |
| 12 | -17.2 | -10.7 | 13.9 | 9.0 | NG | 6.5 | 1.9 | OK | NG |
| 13 | -14.0 | -17.3 | 15.7 | 9.9 | NG | 3.3 | 2.5 | OK | NG |
| 14 | 14.3 | 18.6 | 16.4 | -7.6 | NG | 4.3 | 0.5 | OK | NG |
| 15 | 17.8 | 13.4 | 15.6 | -7.1 | NG | 4.4 | 2.4 | OK | NG |
| 16 | 26.3 | 6.5 | 16.4 | -7.6 | NG | 19.9 | 2.9 | OK | NG |
| 17 | -26.3 | -1.3 | 13.8 | 8.9 | NG | 25.0 | 3.1 | NG | NG |
| 18 | -32.0 | 4.0 | 14.0 | 9.0 | NG | 36.0 | 3.5 | NG | NG |
| 19 | 31.0 | 10.6 | 20.8 | -9.8 | NG | 20.4 | 3.2 | NG | NG |
| 20 | 26.1 | 1.2 | 13.6 | -6.0 | NG | 24.9 | 3.3 | NG | NG |
| 21 | -23.1 | -3.5 | 13.3 | -3.8 | OK | 19.6 | 2.9 | OK | OK |
| 22 | -22.8 | -2.7 | 12.7 | -3.7 | OK | 20.1 | 3.3 | NG | NG |
| 23 | 3.5 | 23.2 | 13.4 | -4.1 | NG | 19.7 | 2.9 | OK | NG |
| 24 | 3.1 | 23.4 | 13.3 | -4.0 | OK | 20.2 | 3.3 | NG | NG |
| 25 | 2.8 | 23.5 | 13.2 | -3.9 | OK | 20.6 | 3.3 | NG | NG |

FIG.29

$\alpha_X = 200, \alpha_Y = 43.3$

| SAMPLE | $\alpha_X - X1$ | $\alpha_X - X2$ | $\|\alpha_X - (X1+X2)/2\|$ THRESHOLD VALUE: ±13.3 μm | $\alpha_U - U1$ THRESHOLD VALUE: ±4.0 μm | DETERMINATION RESULT OF EQUATION (1) | $\|X1-X2\|$ THRESHOLD VALUE: 13.3 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -10.1 | 3.1 | 3.5 | 3.9 | OK | 13.3 | 2.7 | OK | OK |
| 2 | -4.8 | -4.2 | 4.5 | 3.8 | OK | 0.6 | 0.1 | OK | OK |
| 3 | 0.4 | -6.3 | 3.0 | 3.1 | OK | 6.7 | 0.9 | OK | OK |
| 4 | 7.3 | 12.0 | 9.6 | -3.8 | OK | 4.6 | 0.8 | OK | OK |
| 5 | 13.1 | 13.5 | 13.3 | -3.9 | OK | 0.4 | 0.1 | OK | OK |
| 6 | 9.6 | -3.5 | 3.0 | -0.4 | OK | 13.0 | 3.0 | OK | OK |
| 7 | -9.9 | 4.4 | 2.8 | 3.0 | OK | 14.4 | 3.2 | NG | NG |
| 8 | -5.3 | 9.6 | 2.1 | -0.4 | OK | 14.9 | 3.3 | NG | NG |
| 9 | 4.7 | -9.3 | 2.3 | 2.7 | OK | 14.0 | 3.1 | NG | NG |
| 10 | 9.8 | -4.3 | 2.8 | 0.2 | OK | 14.1 | 3.3 | NG | NG |
| 11 | -23.6 | -13.9 | 18.7 | 11.6 | NG | 9.8 | 2.2 | OK | NG |
| 12 | -15.8 | -11.9 | 13.9 | 9.0 | NG | 3.9 | 1.9 | OK | NG |
| 13 | -14.6 | -16.7 | 15.7 | 9.9 | NG | 2.1 | 2.5 | OK | NG |
| 14 | 14.7 | 17.8 | 16.2 | -7.6 | NG | 3.2 | 0.5 | OK | NG |
| 15 | 16.9 | 14.3 | 15.6 | -7.1 | NG | 2.6 | 2.4 | OK | NG |
| 16 | 23.4 | 10.1 | 16.8 | -7.6 | NG | 13.3 | 2.9 | OK | NG |
| 17 | -22.2 | -5.1 | 13.7 | 8.9 | NG | 17.2 | 3.1 | NG | NG |
| 18 | -25.8 | -1.8 | 13.8 | 9.0 | NG | 24.1 | 3.5 | NG | NG |
| 19 | 27.2 | 13.7 | 20.4 | -9.8 | NG | 13.5 | 3.2 | NG | NG |
| 20 | 22.0 | 5.3 | 13.6 | -6.0 | OK | 16.8 | 3.3 | NG | OK |
| 21 | -19.8 | -6.5 | 13.2 | -3.8 | OK | 13.3 | 2.9 | OK | OK |
| 22 | -19.3 | -5.9 | 12.6 | -3.7 | OK | 13.4 | 3.3 | NG | NG |
| 23 | 6.8 | 20.0 | 13.4 | -4.1 | NG | 13.2 | 2.9 | OK | NG |
| 24 | 6.4 | 20.0 | 13.2 | -4.0 | OK | 13.6 | 3.3 | NG | NG |
| 25 | 5.9 | 20.1 | 13.0 | -3.9 | OK | 14.2 | 3.3 | NG | NG |

FIG.30

$\alpha_x = 200, \alpha_y = 21.7$

| SAMPLE | $\alpha_x - X1$ | $\alpha_x - X2$ | $|\alpha_x - (X1+X2)/2|$ THRESHOLD VALUE: 13.3 μm | $\alpha_u - U1$ THRESHOLD VALUE: ±4.0 μm | DETERMINATION RESULT OF EQUATION (1) | $|X1-X2|$ THRESHOLD VALUE: 6.7 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -6.7 | -0.1 | 3.4 | 3.9 | OK | 6.6 | 2.7 | OK | OK |
| 2 | -4.6 | -4.3 | 4.4 | 3.8 | OK | 0.3 | 0.1 | OK | OK |
| 3 | -1.3 | -4.7 | 3.0 | 3.1 | OK | 3.4 | 0.9 | OK | OK |
| 4 | 8.4 | 10.9 | 9.7 | -3.8 | OK | 2.5 | 0.8 | OK | OK |
| 5 | 13.3 | 13.3 | 13.3 | -3.9 | OK | 0.1 | 0.1 | OK | OK |
| 6 | 6.5 | -0.1 | 3.2 | -0.4 | OK | 6.7 | 3.0 | OK | OK |
| 7 | -6.5 | 0.9 | 2.8 | 3.0 | OK | 7.4 | 3.2 | NG | NG |
| 8 | -1.5 | 5.6 | 2.0 | -0.4 | OK | 7.1 | 3.3 | NG | NG |
| 9 | 1.5 | -5.7 | 2.1 | 2.7 | OK | 7.2 | 3.1 | NG | NG |
| 10 | 6.2 | -1.0 | 2.6 | 0.2 | OK | 7.1 | 3.3 | NG | NG |
| 11 | -21.2 | -16.3 | 18.8 | 11.6 | NG | 5.0 | 2.2 | OK | NG |
| 12 | -15.1 | -12.7 | 13.9 | 9.0 | NG | 2.4 | 1.9 | OK | NG |
| 13 | -15.2 | -16.4 | 15.8 | 9.9 | NG | 1.2 | 2.5 | OK | NG |
| 14 | 15.7 | 17.3 | 16.5 | -7.6 | NG | 1.6 | 0.5 | OK | NG |
| 15 | 16.4 | 14.7 | 15.6 | -7.1 | NG | 1.6 | 2.4 | OK | NG |
| 16 | 19.7 | 13.1 | 16.4 | -7.6 | NG | 6.6 | 2.9 | OK | NG |
| 17 | -18.0 | -9.5 | 13.7 | 8.9 | NG | 8.5 | 3.1 | NG | NG |
| 18 | -20.1 | -7.8 | 14.0 | 9.0 | NG | 12.3 | 3.5 | NG | NG |
| 19 | 24.0 | 17.2 | 20.6 | -9.8 | NG | 6.8 | 3.2 | NG | NG |
| 20 | 17.6 | 9.4 | 13.5 | -6.0 | OK | 8.3 | 3.3 | NG | NG |
| 21 | -16.6 | -10.0 | 13.3 | -3.8 | OK | 6.6 | 2.9 | OK | OK |
| 22 | -16.2 | -9.4 | 12.8 | -3.7 | OK | 6.8 | 3.3 | NG | NG |
| 23 | 10.2 | 16.7 | 13.5 | -4.1 | NG | 6.4 | 2.9 | OK | NG |
| 24 | 9.7 | 16.5 | 13.1 | -4.0 | OK | 6.8 | 3.3 | NG | NG |
| 25 | 9.5 | 16.4 | 13.0 | -3.9 | OK | 6.9 | 3.3 | NG | NG |

FIG.31

$\alpha_X = 300, \alpha_Y = 65.0$

| SAMPLE | $\alpha_X - X_1$ | $\alpha_X - X_2$ | $\|\alpha_X - (X_1+X_2)/2\|$ THRESHOLD VALUE: 20.0 μm | $\alpha_U - U_1$ THRESHOLD VALUE: ±4.0 μm | DETERMINATION RESULT OF EQUATION (1) | $\|X_1 - X_2\|$ THRESHOLD VALUE: 30.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -20.1 | 9.8 | 5.1 | 3.9 | OK | 29.9 | 2.7 | OK | OK |
| 2 | -7.4 | -6.0 | 6.7 | 3.8 | OK | 1.4 | 0.1 | OK | OK |
| 3 | 2.9 | -11.8 | 4.4 | 3.1 | OK | 14.7 | 0.9 | OK | OK |
| 4 | 8.9 | 19.5 | 14.2 | -3.8 | OK | 10.6 | 0.8 | OK | OK |
| 5 | 19.7 | 20.0 | 19.9 | -3.9 | OK | 0.2 | 0.1 | OK | OK |
| 6 | 19.5 | -10.5 | 4.5 | -0.4 | OK | 30.0 | 3.0 | NG | NG |
| 7 | -20.1 | 12.2 | 4.0 | 3.0 | OK | 32.4 | 3.2 | NG | NG |
| 8 | -13.0 | 19.2 | 3.1 | -0.4 | OK | 32.3 | 3.3 | NG | NG |
| 9 | 12.7 | -19.6 | 3.4 | 2.7 | OK | 32.3 | 3.1 | NG | NG |
| 10 | 19.9 | -12.1 | 3.9 | 0.2 | OK | 32.0 | 3.3 | NG | NG |
| 11 | -39.0 | -17.1 | 28.0 | 11.6 | NG | 21.9 | 2.2 | OK | NG |
| 12 | -25.4 | -16.2 | 20.8 | 9.0 | NG | 9.2 | 1.9 | OK | NG |
| 13 | -21.0 | -26.2 | 23.6 | 9.9 | NG | 5.3 | 2.5 | OK | NG |
| 14 | 21.2 | 28.1 | 24.7 | -7.6 | NG | 7.0 | 0.5 | OK | NG |
| 15 | 26.7 | 20.1 | 23.4 | -7.1 | NG | 6.5 | 2.4 | OK | NG |
| 16 | 39.8 | 9.9 | 24.8 | -7.6 | NG | 29.9 | 2.9 | OK | NG |
| 17 | -39.7 | -1.7 | 20.7 | 8.9 | NG | 38.0 | 3.1 | NG | NG |
| 18 | -48.2 | 5.9 | 21.2 | 9.0 | NG | 54.1 | 3.5 | NG | NG |
| 19 | 46.5 | 15.7 | 31.1 | -9.8 | NG | 30.8 | 3.2 | NG | NG |
| 20 | 39.3 | 1.4 | 20.3 | -6.0 | NG | 37.9 | 3.3 | NG | NG |
| 21 | -34.6 | -5.3 | 20.0 | -3.8 | OK | 29.3 | 2.9 | OK | OK |
| 22 | -34.2 | -4.1 | 19.1 | -3.7 | OK | 30.1 | 3.3 | NG | NG |
| 23 | 5.2 | 35.0 | 20.1 | -4.1 | NG | 29.8 | 2.9 | OK | NG |
| 24 | 4.5 | 35.0 | 19.8 | -4.0 | OK | 30.5 | 3.3 | NG | NG |
| 25 | 3.9 | 35.0 | 19.4 | -3.9 | OK | 31.0 | 3.3 | NG | NG |

FIG.32

$\alpha_X = 300, \alpha_Y = 43.3$

| SAMPLE | $\alpha_X - X_1$ | $\alpha_X - X_2$ | $\|\alpha_X - (X_1+X_2)/2\|$ THRESHOLD VALUE: 20.0 μm | $\alpha_U - U_1$ THRESHOLD VALUE: ±4.0 μm | DETERMINATION RESULT OF EQUATION (1) | $\|X_1 - X_2\|$ THRESHOLD VALUE: 20.0 μm | $U_2$ THRESHOLD VALUE: 3.0 μm | DETERMINATION RESULT OF EQUATION (2) | OVERALL DETERMINATION RESULT |
|---|---|---|---|---|---|---|---|---|---|
| 1 | -14.9 | 4.8 | 5.0 | 3.9 | OK | 19.7 | 2.7 | OK | OK |
| 2 | -6.8 | -6.4 | 6.6 | 3.8 | OK | 0.5 | 0.1 | OK | OK |
| 3 | 0.7 | -9.2 | 4.3 | 3.1 | OK | 9.9 | 0.9 | OK | OK |
| 4 | 10.7 | 18.2 | 14.4 | -3.8 | OK | 7.5 | 0.8 | OK | OK |
| 5 | 19.8 | 19.9 | 19.8 | -3.9 | OK | 0.1 | 0.1 | OK | OK |
| 6 | 14.5 | -5.3 | 4.6 | -0.4 | OK | 19.8 | 3.0 | OK | OK |
| 7 | -15.0 | 6.9 | 4.1 | 3.0 | OK | 21.9 | 3.2 | NG | NG |
| 8 | -7.8 | 14.0 | 3.1 | -0.4 | OK | 21.7 | 3.3 | NG | NG |
| 9 | 7.4 | -14.3 | 3.4 | 2.7 | OK | 21.7 | 3.1 | NG | NG |
| 10 | 14.9 | -7.2 | 3.8 | 0.2 | OK | 22.1 | 3.3 | NG | NG |
| 11 | -35.5 | -20.7 | 28.1 | 11.6 | NG | 14.8 | 2.2 | OK | NG |
| 12 | -24.3 | -17.7 | 21.0 | 9.0 | NG | 6.5 | 1.9 | OK | NG |
| 13 | -22.0 | -25.0 | 23.5 | 9.9 | NG | 2.9 | 2.5 | OK | NG |
| 14 | 22.1 | 26.7 | 24.4 | -7.6 | NG | 4.6 | 0.5 | OK | NG |
| 15 | 25.8 | 21.1 | 23.4 | -7.1 | NG | 4.7 | 2.4 | OK | NG |
| 16 | 34.5 | 14.5 | 24.5 | -7.6 | NG | 20.0 | 2.9 | OK | NG |
| 17 | -33.5 | -8.2 | 20.8 | 8.9 | NG | 25.2 | 3.1 | NG | NG |
| 18 | -39.3 | -3.2 | 21.2 | 9.0 | NG | 36.1 | 3.5 | NG | NG |
| 19 | 41.3 | 20.7 | 31.0 | -9.8 | NG | 20.6 | 3.2 | NG | NG |
| 20 | 32.6 | 7.7 | 20.1 | -6.0 | NG | 24.9 | 3.3 | NG | NG |
| 21 | -29.7 | -9.8 | 19.8 | -3.8 | OK | 19.9 | 2.9 | OK | OK |
| 22 | -29.1 | -9.0 | 19.0 | -3.7 | OK | 20.1 | 3.3 | NG | NG |
| 23 | 10.1 | 30.1 | 20.1 | -4.1 | NG | 20.0 | 3.2 | NG | NG |
| 24 | 9.6 | 29.7 | 19.7 | -4.0 | OK | 20.1 | 2.9 | OK | NG |
| 25 | 9.2 | 30.0 | 19.6 | -3.9 | OK | 20.8 | 3.3 | NG | NG |

FIG.33

$\alpha_X = 300, \alpha_Y = 21.7$

| SAMPLE | $\alpha_X - X1$ | $\alpha_X - X2$ | $\|\alpha_X - (X1+X2)/2\|$ THRESHOLD VALUE: 20.0 μm | $\alpha_U - U1$ THRESHOLD VALUE: ±4.0 μm | DETERMINATION RESULT OF EQUATION (1) | $\|X1 - X2\|$ THRESHOLD VALUE: 10.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -10.3 | -0.4 | 5.3 | 3.9 | OK | 9.9 | 2.7 | OK | OK |
| 2 | -6.9 | -6.2 | 6.5 | 3.8 | OK | 0.7 | 0.1 | OK | OK |
| 3 | -1.8 | -6.8 | 4.3 | 3.1 | OK | 5.1 | 0.9 | OK | OK |
| 4 | 12.6 | 16.2 | 14.4 | -3.8 | OK | 3.6 | 0.8 | OK | OK |
| 5 | 19.9 | 20.0 | 19.9 | -3.9 | OK | 0.1 | 0.1 | OK | OK |
| 6 | 9.6 | -0.3 | 4.6 | -0.4 | OK | 10.0 | 3.0 | OK | OK |
| 7 | -9.6 | 1.3 | 4.1 | 3.0 | OK | 10.9 | 3.2 | NG | NG |
| 8 | -2.4 | 8.4 | 3.0 | -0.4 | OK | 10.8 | 3.3 | NG | NG |
| 9 | 1.9 | -8.7 | 3.4 | 2.7 | OK | 10.6 | 3.1 | NG | NG |
| 10 | 9.4 | -1.4 | 4.0 | 0.2 | OK | 10.8 | 3.3 | NG | NG |
| 11 | -31.7 | -24.4 | 28.0 | 11.6 | NG | 7.2 | 2.2 | OK | NG |
| 12 | -22.4 | -19.2 | 20.8 | 9.0 | NG | 3.3 | 1.9 | OK | NG |
| 13 | -22.5 | -24.5 | 23.5 | 9.9 | NG | 2.0 | 2.5 | OK | NG |
| 14 | 23.7 | 25.7 | 24.7 | -7.6 | NG | 2.0 | 0.5 | OK | NG |
| 15 | 24.7 | 22.2 | 23.5 | -7.1 | NG | 2.5 | 2.4 | OK | NG |
| 16 | 29.6 | 19.9 | 24.8 | -7.6 | NG | 9.7 | 2.9 | OK | NG |
| 17 | -26.9 | -14.4 | 20.7 | 8.9 | NG | 12.5 | 3.1 | NG | NG |
| 18 | -30.2 | -12.0 | 21.1 | 9.0 | NG | 18.1 | 3.5 | NG | NG |
| 19 | 36.1 | 25.8 | 31.0 | -9.8 | NG | 10.3 | 3.2 | NG | NG |
| 20 | 26.6 | 14.0 | 20.3 | -6.0 | NG | 12.6 | 3.3 | NG | NG |
| 21 | -25.0 | -15.0 | 20.0 | -3.8 | OK | 10.0 | 2.9 | OK | OK |
| 22 | -24.4 | -14.3 | 19.4 | -3.7 | OK | 10.1 | 3.3 | NG | NG |
| 23 | 15.2 | 25.1 | 20.2 | -4.1 | NG | 10.0 | 2.9 | OK | NG |
| 24 | 14.5 | 24.9 | 19.7 | -4.0 | OK | 10.4 | 3.3 | NG | NG |
| 25 | 14.3 | 24.8 | 19.6 | -3.9 | OK | 10.5 | 3.3 | NG | NG |

FIG.34

$\alpha_X = 400$, $\alpha_Y = 65.0$

| SAMPLE | $\alpha_x - X1$ | $\alpha_x - X2$ | $\|\alpha_x - (X1+X2)/2\|$ THRESHOLD VALUE: 26.7 μm | $\alpha_U - U1$ THRESHOLD VALUE: ±4.0 μm | DETERMINATION RESULT OF EQUATION (1) | $\|X1 - X2\|$ THRESHOLD VALUE: 40.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -26.9 | 12.7 | 7.1 | 3.9 | OK | 39.6 | 2.7 | OK | OK |
| 2 | -9.8 | -7.9 | 8.9 | 3.8 | OK | 1.9 | 0.1 | OK | OK |
| 3 | 3.8 | -15.8 | 6.0 | 3.1 | OK | 19.6 | 0.9 | OK | OK |
| 4 | 11.8 | 26.1 | 18.9 | -3.8 | OK | 14.3 | 0.8 | OK | OK |
| 5 | 26.3 | 27.1 | 26.7 | -3.9 | OK | 0.8 | 0.1 | OK | OK |
| 6 | 26.1 | -13.9 | 6.1 | -0.4 | OK | 40.0 | 3.0 | OK | OK |
| 7 | -27.2 | 16.5 | 5.4 | 3.0 | OK | 43.6 | 3.2 | NG | NG |
| 8 | -17.6 | 25.8 | 4.1 | -0.4 | OK | 43.4 | 3.3 | NG | NG |
| 9 | 17.0 | -25.7 | 4.3 | 2.7 | OK | 42.7 | 3.1 | NG | NG |
| 10 | 26.5 | -16.3 | 5.1 | 0.2 | OK | 42.8 | 3.3 | NG | NG |
| 11 | -51.8 | -23.1 | 37.4 | 11.6 | NG | 28.7 | 2.2 | OK | NG |
| 12 | -34.0 | -21.3 | 27.7 | 9.0 | NG | 12.7 | 1.9 | OK | NG |
| 13 | -28.2 | -35.0 | 31.6 | 9.9 | NG | 6.9 | 2.5 | OK | NG |
| 14 | 28.6 | 37.4 | 33.0 | -7.6 | NG | 8.8 | 0.5 | OK | NG |
| 15 | 36.0 | 26.6 | 31.3 | -7.1 | NG | 9.4 | 2.4 | OK | NG |
| 16 | 53.2 | 13.3 | 33.2 | -7.6 | NG | 40.0 | 2.9 | OK | NG |
| 17 | -52.8 | -2.5 | 27.7 | 8.9 | NG | 50.3 | 3.1 | NG | NG |
| 18 | -64.2 | 7.8 | 28.2 | 9.0 | NG | 72.0 | 3.5 | NG | NG |
| 19 | 61.7 | 21.0 | 41.3 | -9.8 | NG | 40.7 | 3.2 | NG | NG |
| 20 | 52.4 | 2.0 | 27.2 | -6.0 | NG | 50.4 | 3.3 | NG | NG |
| 21 | -46.3 | -6.7 | 26.5 | -3.8 | OK | 39.6 | 2.9 | OK | OK |
| 22 | -45.5 | -5.3 | 25.4 | -3.7 | OK | 40.1 | 3.3 | NG | NG |
| 23 | 7.1 | 47.1 | 27.1 | -4.1 | NG | 39.9 | 2.9 | OK | NG |
| 24 | 6.0 | 46.4 | 26.2 | -4.0 | OK | 40.4 | 3.3 | NG | NG |
| 25 | 5.7 | 46.5 | 26.1 | -3.9 | OK | 40.8 | 3.3 | NG | NG |

FIG.35

$\alpha_X = 400, \alpha_Y = 43.3$

| SAMPLE | $\alpha_x - X1$ | $\alpha_x - X2$ | $|\alpha_x - (X1+X2)/2|$ THRESHOLD VALUE: 26.7 μm | $\alpha_u - U1$ THRESHOLD VALUE: ±4.0 μm | DETERMINATION RESULT OF EQUATION (1) | $|X1 - X2|$ THRESHOLD VALUE: 26.7 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -20.5 | 6.1 | 7.2 | 3.9 | OK | 26.6 | 2.7 | OK | OK |
| 2 | -9.1 | -8.5 | 8.8 | 3.8 | OK | 0.6 | 0.1 | OK | OK |
| 3 | 0.5 | -12.1 | 5.8 | 3.1 | OK | 12.5 | 0.9 | OK | OK |
| 4 | 14.2 | 23.6 | 18.9 | -3.8 | OK | 9.5 | 0.8 | OK | OK |
| 5 | 26.7 | 26.6 | 26.6 | -3.9 | OK | 0.1 | 0.1 | OK | OK |
| 6 | 19.7 | -6.9 | 6.4 | -0.4 | OK | 26.6 | 3.0 | OK | OK |
| 7 | -19.6 | 9.2 | 5.2 | 3.0 | OK | 28.9 | 3.2 | NG | NG |
| 8 | -10.3 | 18.3 | 4.0 | -0.4 | OK | 28.6 | 3.3 | NG | NG |
| 9 | 9.8 | -18.5 | 4.3 | 2.7 | OK | 28.3 | 3.1 | NG | NG |
| 10 | 19.8 | -9.5 | 5.2 | 0.2 | OK | 29.3 | 3.3 | NG | NG |
| 11 | -47.0 | -27.9 | 37.4 | 11.6 | NG | 19.1 | 2.2 | OK | NG |
| 12 | -32.1 | -23.3 | 27.7 | 9.0 | NG | 8.8 | 1.9 | OK | NG |
| 13 | -29.3 | -34.0 | 31.7 | 9.9 | NG | 4.6 | 2.5 | OK | NG |
| 14 | 29.7 | 36.2 | 33.0 | -7.6 | NG | 6.5 | 0.5 | OK | NG |
| 15 | 34.6 | 28.3 | 31.5 | -7.1 | NG | 6.3 | 2.4 | OK | NG |
| 16 | 46.6 | 19.9 | 33.3 | -7.6 | NG | 26.6 | 2.9 | OK | NG |
| 17 | -44.4 | -11.0 | 27.7 | 8.9 | NG | 33.4 | 3.1 | NG | NG |
| 18 | -51.9 | -3.8 | 27.8 | 9.0 | NG | 48.1 | 3.5 | NG | NG |
| 19 | 55.2 | 27.5 | 41.4 | -9.8 | NG | 27.7 | 3.2 | NG | NG |
| 20 | 43.9 | 10.3 | 27.1 | -6.0 | NG | 33.6 | 3.3 | NG | NG |
| 21 | -39.5 | -13.2 | 26.3 | -3.8 | OK | 26.3 | 2.9 | OK | OK |
| 22 | -38.7 | -11.9 | 25.3 | -3.7 | OK | 26.8 | 3.3 | NG | NG |
| 23 | 13.6 | 40.2 | 26.9 | -4.1 | NG | 26.6 | 2.9 | OK | NG |
| 24 | 12.6 | 40.0 | 26.3 | -4.0 | OK | 27.4 | 3.3 | NG | NG |
| 25 | 12.6 | 40.2 | 26.4 | -3.9 | OK | 27.5 | 3.3 | NG | NG |

FIG.36

$\alpha_X = 40.0$, $\alpha_Y = 21.7$

| SAMPLE | $\alpha_X - X1$ | $\alpha_X - X2$ | $\|\alpha_X-(X1+X2)/2\|$ THRESHOLD VALUE: 26.7 μm | $\alpha_U - U1$ THRESHOLD VALUE: ±4.0 μm | DETERMINATION RESULT OF EQUATION (1) | $\|X1-X2\|$ THRESHOLD VALUE: 13.3 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -13.7 | -0.5 | 7.1 | 3.9 | OK | 13.2 | 2.7 | OK | OK |
| 2 | -8.9 | -8.6 | 8.7 | 3.8 | OK | 0.3 | 0.1 | OK | OK |
| 3 | -2.6 | -8.9 | 5.8 | 3.1 | OK | 6.3 | 0.9 | OK | OK |
| 4 | 16.7 | 21.5 | 19.1 | -3.8 | OK | 4.8 | 0.8 | OK | OK |
| 5 | 26.4 | 26.7 | 26.6 | -3.9 | OK | 0.3 | 0.1 | OK | OK |
| 6 | 12.8 | -0.4 | 6.2 | -0.4 | OK | 13.2 | 3.0 | OK | OK |
| 7 | -12.5 | 1.7 | 5.4 | 3.0 | OK | 14.2 | 3.2 | NG | NG |
| 8 | -2.9 | 11.4 | 4.2 | -0.4 | OK | 14.3 | 3.3 | NG | NG |
| 9 | 2.6 | -11.7 | 4.5 | 2.7 | OK | 14.2 | 3.1 | NG | NG |
| 10 | 12.3 | -1.9 | 5.2 | 0.2 | OK | 14.2 | 3.3 | NG | NG |
| 11 | -42.3 | -32.8 | 37.5 | 11.6 | NG | 9.5 | 2.2 | OK | NG |
| 12 | -30.0 | -25.7 | 27.9 | 9.0 | NG | 4.3 | 1.9 | OK | NG |
| 13 | -30.3 | -32.5 | 31.4 | 9.9 | NG | 2.2 | 2.5 | OK | NG |
| 14 | 31.3 | 34.4 | 32.8 | -7.6 | NG | 3.1 | 0.5 | OK | NG |
| 15 | 32.6 | 29.6 | 31.1 | -7.1 | NG | 3.0 | 2.4 | OK | NG |
| 16 | 39.5 | 26.4 | 32.9 | -7.6 | NG | 13.1 | 2.9 | OK | NG |
| 17 | -36.0 | -19.1 | 27.5 | 8.9 | NG | 16.9 | 3.1 | NG | NG |
| 18 | -40.1 | -16.0 | 28.0 | 9.0 | NG | 24.1 | 3.5 | NG | NG |
| 19 | 48.3 | 34.5 | 41.4 | -9.8 | NG | 13.7 | 3.2 | NG | NG |
| 20 | 35.4 | 18.7 | 27.1 | -6.0 | NG | 16.7 | 3.3 | NG | NG |
| 21 | -33.2 | -20.0 | 26.6 | -3.8 | OK | 13.2 | 2.9 | OK | OK |
| 22 | -32.4 | -18.8 | 25.6 | -3.7 | OK | 13.6 | 3.3 | NG | NG |
| 23 | 20.1 | 33.4 | 26.8 | -4.1 | NG | 13.2 | 2.9 | OK | NG |
| 24 | 19.7 | 33.1 | 26.4 | -4.0 | OK | 13.4 | 3.3 | NG | NG |
| 25 | 19.3 | 33.1 | 26.2 | -3.9 | OK | 13.8 | 3.3 | NG | NG |

$\alpha_X = 60.0$, $\alpha_Y = 65.0$

| SAMPLE | $\alpha_X - X1$ | $\alpha_X - X2$ | $\|\alpha_X-(X1+X2)/2\|$ THRESHOLD VALUE: 40.0 μm | $\alpha_U - U1$ THRESHOLD VALUE: ±4.0 μm | DETERMINATION RESULT OF EQUATION (1) | $\|X1-X2\|$ THRESHOLD VALUE: 80.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -40.2 | 19.3 | 10.5 | 3.9 | OK | 59.5 | 2.7 | OK | OK |
| 2 | -14.3 | -11.9 | 13.1 | 3.8 | OK | 2.4 | 0.1 | OK | OK |
| 3 | 6.1 | -23.4 | 8.7 | 3.1 | OK | 29.5 | 0.9 | OK | OK |
| 4 | 17.9 | 39.5 | 28.7 | -3.8 | OK | 21.6 | 0.8 | OK | OK |
| 5 | 39.5 | 40.4 | 40.0 | -3.9 | OK | 0.9 | 0.1 | OK | OK |
| 6 | 39.2 | -20.8 | 9.2 | -0.4 | OK | 60.0 | 3.0 | OK | OK |
| 7 | -40.6 | 24.3 | 8.2 | 3.0 | OK | 64.9 | 3.2 | NG | NG |
| 8 | -26.2 | 38.7 | 6.3 | -0.4 | OK | 64.9 | 3.3 | NG | NG |
| 9 | 25.5 | -38.8 | 6.7 | 2.7 | OK | 64.3 | 3.1 | NG | NG |
| 10 | 40.2 | -24.6 | 7.8 | 0.2 | OK | 64.8 | 3.3 | NG | NG |
| 11 | -78.1 | -34.4 | 56.3 | 11.6 | NG | 43.7 | 2.2 | OK | NG |
| 12 | -51.3 | -32.2 | 41.8 | 9.0 | NG | 19.1 | 1.9 | OK | NG |
| 13 | -41.9 | -52.3 | 47.1 | 9.9 | NG | 10.4 | 2.5 | OK | NG |
| 14 | 42.5 | 56.2 | 49.4 | -7.6 | NG | 13.7 | 0.5 | OK | NG |
| 15 | 53.7 | 40.1 | 46.9 | -7.1 | NG | 13.6 | 2.4 | OK | NG |
| 16 | 79.5 | 19.5 | 49.5 | -7.6 | NG | 60.0 | 2.9 | OK | NG |
| 17 | -78.9 | -3.5 | 41.2 | 8.9 | NG | 75.4 | 3.1 | NG | NG |
| 18 | -96.3 | 12.2 | 42.1 | 9.0 | NG | 108.5 | 3.5 | NG | NG |
| 19 | 92.6 | 31.6 | 62.1 | -9.8 | NG | 61.0 | 3.2 | NG | NG |
| 20 | 78.2 | 3.1 | 40.7 | -6.0 | NG | 75.1 | 3.3 | NG | NG |
| 21 | -69.3 | -10.2 | 39.8 | -3.8 | OK | 59.1 | 2.9 | OK | OK |
| 22 | -68.4 | -8.3 | 38.4 | -3.7 | OK | 60.1 | 3.3 | NG | NG |
| 23 | 10.3 | 70.2 | 40.3 | -4.1 | NG | 59.9 | 2.9 | OK | NG |
| 24 | 9.1 | 69.8 | 39.5 | -4.0 | OK | 60.7 | 3.3 | NG | NG |
| 25 | 8.3 | 70.1 | 39.2 | -3.9 | OK | 61.8 | 3.3 | NG | NG |

$\alpha_X = 600$, $\alpha_Y = 43.3$

| SAMPLE | $\alpha_X - X1$ | $\alpha_X - X2$ | $\|\alpha_X - (X1+X2)/2\|$ THRESHOLD VALUE: 40.0 μm | $\alpha_U - U1$ THRESHOLD VALUE: ±4.0 μm | DETERMINATION RESULT OF EQUATION (1) | $\|X1 - X2\|$ THRESHOLD VALUE: 40.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -30.3 | 9.3 | 10.5 | 3.9 | OK | 39.7 | 2.7 | OK | OK |
| 2 | -13.9 | -12.2 | 13.0 | 3.8 | OK | 1.6 | 0.1 | OK | OK |
| 3 | 0.9 | -18.6 | 8.8 | 3.1 | OK | 19.5 | 0.9 | OK | OK |
| 4 | 21.4 | 36.1 | 28.7 | -3.8 | OK | 14.7 | 0.8 | OK | OK |
| 5 | 39.6 | 40.3 | 40.0 | -3.9 | OK | 0.7 | 0.1 | OK | OK |
| 6 | 29.0 | -10.8 | 9.1 | -0.4 | OK | 39.8 | 3.0 | OK | OK |
| 7 | -29.8 | 13.7 | 8.1 | 3.0 | OK | 43.5 | 3.2 | NG | NG |
| 8 | -15.4 | 28.0 | 6.3 | -0.4 | OK | 43.4 | 3.3 | NG | NG |
| 9 | 14.7 | -27.8 | 6.6 | 2.7 | OK | 42.4 | 3.1 | NG | NG |
| 10 | 29.3 | -13.7 | 7.8 | 0.2 | OK | 43.0 | 3.3 | NG | NG |
| 11 | -70.7 | -41.5 | 56.1 | 11.6 | NG | 29.2 | 2.2 | OK | NG |
| 12 | -48.4 | -35.6 | 42.0 | 9.0 | NG | 12.8 | 1.9 | OK | NG |
| 13 | -43.4 | -50.4 | 46.9 | 9.9 | NG | 7.1 | 2.5 | OK | NG |
| 14 | 45.1 | 54.0 | 49.5 | -7.6 | NG | 9.0 | 0.5 | OK | NG |
| 15 | 51.4 | 42.5 | 46.9 | -7.1 | NG | 8.9 | 2.4 | OK | NG |
| 16 | 69.5 | 29.5 | 49.5 | -7.6 | NG | 40.0 | 2.9 | OK | NG |
| 17 | -66.3 | -15.9 | 41.1 | 8.9 | NG | 50.4 | 3.1 | NG | NG |
| 18 | -78.1 | -6.0 | 42.1 | 9.0 | NG | 72.1 | 3.5 | NG | NG |
| 19 | 82.5 | 41.5 | 62.0 | -9.8 | NG | 41.0 | 3.2 | NG | NG |
| 20 | 65.4 | 15.6 | 40.5 | -6.0 | NG | 49.8 | 3.3 | NG | NG |
| 21 | -59.6 | -20.3 | 39.9 | -3.8 | OK | 39.3 | 2.9 | OK | OK |
| 22 | -58.5 | -18.3 | 38.4 | -3.7 | OK | 40.3 | 3.3 | NG | NG |
| 23 | 20.3 | 60.2 | 40.3 | -4.1 | NG | 39.9 | 2.9 | OK | NG |
| 24 | 19.0 | 59.8 | 39.4 | -4.0 | OK | 40.8 | 3.3 | NG | NG |
| 25 | 18.9 | 59.9 | 39.4 | -3.9 | OK | 41.1 | 3.3 | NG | NG |

FIG.39

$\alpha_X = 600, \alpha_Y = 21.7$

| SAMPLE | $\alpha_X - X1$ | $\alpha_X - X2$ | $\lvert \alpha_X - (X1+X2)/2 \rvert$ THRESHOLD VALUE: 40.0μm | $\alpha_U - U1$ THRESHOLD VALUE: ±4.0μm | DETERMINATION RESULT OF EQUATION (1) | $\lvert X1 - X2 \rvert$ THRESHOLD VALUE: 20.0μm | U2 THRESHOLD VALUE: 3.0μm | DETERMINATION RESULT OF EQUATION (2) | OVERALL DETERMINATION RESULT |
|---|---|---|---|---|---|---|---|---|---|
| 1 | -20.4 | -0.7 | 10.5 | 3.9 | OK | 19.7 | 2.7 | OK | OK |
| 2 | -13.6 | -12.8 | 13.2 | 3.8 | OK | 0.8 | 0.1 | OK | OK |
| 3 | -3.6 | -13.4 | 8.5 | 3.1 | OK | 9.8 | 0.9 | OK | OK |
| 4 | 24.9 | 32.4 | 28.7 | -3.8 | OK | 7.5 | 0.8 | OK | OK |
| 5 | 39.7 | 40.0 | 39.8 | -3.9 | OK | 0.3 | 0.1 | OK | OK |
| 6 | 19.3 | -0.6 | 9.3 | -0.4 | OK | 19.9 | 3.0 | OK | OK |
| 7 | -18.8 | 2.7 | 8.0 | 3.0 | OK | 21.6 | 3.2 | NG | NG |
| 8 | -4.4 | 17.1 | 6.3 | -0.4 | OK | 21.5 | 3.3 | NG | NG |
| 9 | 4.1 | -17.3 | 6.6 | 2.7 | OK | 21.5 | 3.1 | NG | NG |
| 10 | 18.7 | -3.1 | 7.8 | 0.2 | OK | 21.8 | 3.3 | NG | NG |
| 11 | -63.4 | -48.9 | 56.2 | 11.6 | NG | 14.5 | 2.2 | OK | NG |
| 12 | -45.0 | -38.7 | 41.8 | 9.0 | NG | 6.3 | 1.9 | OK | NG |
| 13 | -45.3 | -48.9 | 47.1 | 9.9 | NG | 3.5 | 2.5 | OK | NG |
| 14 | 46.9 | 51.5 | 49.2 | -7.6 | NG | 4.6 | 0.5 | OK | NG |
| 15 | 49.3 | 44.7 | 47.0 | -7.1 | NG | 4.6 | 2.4 | OK | NG |
| 16 | 59.4 | 39.5 | 49.5 | -7.6 | NG | 20.0 | 2.9 | OK | NG |
| 17 | -53.9 | -28.7 | 41.3 | 8.9 | NG | 25.1 | 3.1 | NG | NG |
| 18 | -60.3 | -24.0 | 42.1 | 9.0 | NG | 36.3 | 3.5 | NG | NG |
| 19 | 72.3 | 51.9 | 62.1 | -9.8 | NG | 20.4 | 3.2 | NG | NG |
| 20 | 53.0 | 28.2 | 40.6 | -6.0 | NG | 24.8 | 3.3 | NG | NG |
| 21 | -49.7 | -29.9 | 39.8 | -3.8 | OK | 19.8 | 2.9 | OK | OK |
| 22 | -48.4 | -28.4 | 38.4 | -3.7 | OK | 20.1 | 3.3 | NG | NG |
| 23 | 30.3 | 50.2 | 40.2 | -4.1 | NG | 19.9 | 2.9 | OK | NG |
| 24 | 29.4 | 49.6 | 39.5 | -4.0 | OK | 20.1 | 3.3 | NG | NG |
| 25 | 29.0 | 49.4 | 39.2 | -3.9 | OK | 20.4 | 3.3 | NG | NG |

FIG.40

$\alpha_x = 80.0$, $\alpha_y = 65.0$

| SAMPLE | $\alpha_x - X1$ | $\alpha_x - X2$ | $\|\alpha_x-(X1+X2)/2\|$ THRESHOLD VALUE: 53.3 μm | $\alpha_u - U1$ THRESHOLD VALUE: ±4.0 μm | DETERMINATION RESULT OF EQUATION (1) | $\|X1-X2\|$ THRESHOLD VALUE: 80.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -53.9 | 25.2 | 14.3 | 3.9 | OK | 79.0 | 2.7 | OK | OK |
| 2 | -19.1 | -15.8 | 17.5 | 3.8 | OK | 3.2 | 0.1 | OK | OK |
| 3 | 8.5 | -31.1 | 11.3 | 3.1 | OK | 39.6 | 0.9 | OK | OK |
| 4 | 24.0 | 52.3 | 38.1 | -3.8 | OK | 28.3 | 0.8 | OK | OK |
| 5 | 52.4 | 53.8 | 53.1 | -3.9 | OK | 1.4 | 0.1 | OK | OK |
| 6 | 52.8 | -27.2 | 12.8 | -0.4 | OK | 80.0 | 3.0 | OK | OK |
| 7 | -54.4 | 32.5 | 10.9 | 3.0 | OK | 86.8 | 3.2 | NG | NG |
| 8 | -34.8 | 51.1 | 8.1 | -0.4 | OK | 85.9 | 3.3 | NG | NG |
| 9 | 33.4 | -52.4 | 9.5 | 2.7 | OK | 85.8 | 3.1 | NG | NG |
| 10 | 53.1 | -33.2 | 10.0 | 0.2 | OK | 86.3 | 3.3 | NG | NG |
| 11 | -104.3 | -45.5 | 74.9 | 11.6 | NG | 58.8 | 2.2 | OK | NG |
| 12 | -68.3 | -42.4 | 55.3 | 9.0 | NG | 25.9 | 1.9 | OK | NG |
| 13 | -55.7 | -69.8 | 62.8 | 9.9 | NG | 14.1 | 2.5 | OK | NG |
| 14 | 56.1 | 74.9 | 65.5 | -7.6 | NG | 18.8 | 0.5 | OK | NG |
| 15 | 71.7 | 53.6 | 62.6 | -7.1 | NG | 18.1 | 2.4 | OK | NG |
| 16 | 105.7 | 26.5 | 66.1 | -7.6 | NG | 79.2 | 2.9 | OK | NG |
| 17 | -104.9 | -5.3 | 55.1 | 8.9 | NG | 99.7 | 3.1 | NG | NG |
| 18 | -127.8 | 16.6 | 55.6 | 9.0 | NG | 144.4 | 3.5 | NG | NG |
| 19 | 123.8 | 41.9 | 82.8 | -9.8 | NG | 81.9 | 3.2 | NG | NG |
| 20 | 103.8 | 3.9 | 53.9 | -6.0 | NG | 99.9 | 3.3 | NG | NG |
| 21 | -92.3 | -13.9 | 53.1 | -3.8 | OK | 78.4 | 2.9 | OK | OK |
| 22 | -91.2 | -10.6 | 50.9 | -3.7 | OK | 80.5 | 3.3 | NG | NG |
| 23 | 14.0 | 93.2 | 53.6 | -4.1 | NG | 79.2 | 2.9 | OK | NG |
| 24 | 12.2 | 92.6 | 52.4 | -4.0 | OK | 80.3 | 3.3 | NG | NG |
| 25 | 11.0 | 93.1 | 52.0 | -3.9 | OK | 82.1 | 3.3 | NG | NG |

FIG.41

$\alpha_X = 800, \alpha_Y = 43.3$

| SAMPLE | $\alpha_X - X1$ | $\alpha_X - X2$ | $\|\alpha_X - (X1+X2)/2\|$ THRESHOLD VALUE: 53.3 μm | $\alpha_U - U1$ THRESHOLD VALUE: ±4.0 μm | DETERMINATION RESULT OF EQUATION (1) | $\|X1 - X2\|$ THRESHOLD VALUE: 53.3 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -40.4 | 12.6 | 13.9 | 3.9 | OK | 53.0 | 2.7 | OK | OK |
| 2 | -18.5 | -16.3 | 17.4 | 3.8 | OK | 2.2 | 0.1 | OK | OK |
| 3 | 1.6 | -25.0 | 11.7 | 3.1 | OK | 26.5 | 0.9 | OK | OK |
| 4 | 28.9 | 47.8 | 38.3 | -3.8 | OK | 18.9 | 0.8 | OK | OK |
| 5 | 52.7 | 53.7 | 53.2 | -3.9 | OK | 1.1 | 0.1 | OK | OK |
| 6 | 39.0 | -14.1 | 12.4 | -0.4 | OK | 53.1 | 3.0 | OK | OK |
| 7 | -39.9 | 18.1 | 10.9 | 3.0 | OK | 57.9 | 3.2 | NG | NG |
| 8 | -20.7 | 37.5 | 8.4 | -0.4 | OK | 58.2 | 3.3 | NG | NG |
| 9 | 19.8 | -37.4 | 8.8 | 2.7 | OK | 57.2 | 3.1 | NG | NG |
| 10 | 39.4 | -18.2 | 10.6 | 0.2 | OK | 57.7 | 3.3 | NG | NG |
| 11 | -94.2 | -55.3 | 74.7 | 11.6 | NG | 38.9 | 2.2 | OK | NG |
| 12 | -64.2 | -47.1 | 55.6 | 9.0 | NG | 17.1 | 1.9 | OK | NG |
| 13 | -58.5 | -67.7 | 63.1 | 9.9 | NG | 9.3 | 2.5 | OK | NG |
| 14 | 59.9 | 72.2 | 66.0 | -7.6 | NG | 12.3 | 0.5 | OK | NG |
| 15 | 68.7 | 56.4 | 62.5 | -7.1 | NG | 12.3 | 2.4 | OK | NG |
| 16 | 92.9 | 39.6 | 66.2 | -7.6 | NG | 53.3 | 2.9 | OK | NG |
| 17 | -88.4 | -21.7 | 55.1 | 8.9 | NG | 66.8 | 3.1 | NG | NG |
| 18 | -104.2 | -7.7 | 56.0 | 9.0 | NG | 96.6 | 3.5 | NG | NG |
| 19 | 110.1 | 56.0 | 83.0 | -9.8 | NG | 54.1 | 3.2 | NG | NG |
| 20 | 87.5 | 20.6 | 54.0 | -6.0 | NG | 66.9 | 3.3 | NG | NG |
| 21 | -79.1 | -26.5 | 52.8 | -3.8 | OK | 52.6 | 2.9 | OK | OK |
| 22 | -78.1 | -24.6 | 51.3 | -3.7 | OK | 53.5 | 3.3 | NG | NG |
| 23 | 26.7 | 80.0 | 53.4 | -4.1 | NG | 53.3 | 2.9 | OK | NG |
| 24 | 25.3 | 79.9 | 52.6 | -4.0 | OK | 54.6 | 3.3 | NG | NG |
| 25 | 24.6 | 79.6 | 52.1 | -3.9 | OK | 55.0 | 3.3 | NG | NG |

FIG.42

$\alpha_X = 800, \alpha_Y = 21.7$

| SAMPLE | $\alpha_X - X_1$ | $\alpha_X - X_2$ | $\|\alpha_X - (X_1+X_2)/2\|$ THRESHOLD VALUE: 53.3 μm | $\alpha_U - U_1$ THRESHOLD VALUE: ±4.0 μm | DETERMINATION RESULT OF EQUATION (1) | $\|X_1 - X_2\|$ THRESHOLD VALUE: 26.7 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -27.2 | -0.8 | 14.0 | 3.9 | OK | 26.5 | 2.7 | OK | OK |
| 2 | -17.9 | -17.0 | 17.4 | 3.8 | OK | 0.8 | 0.1 | OK | OK |
| 3 | -5.1 | -18.0 | 11.6 | 3.1 | OK | 13.0 | 0.9 | OK | OK |
| 4 | 33.3 | 43.1 | 38.2 | -3.8 | OK | 9.8 | 0.8 | OK | OK |
| 5 | 53.0 | 53.6 | 53.3 | -3.9 | OK | 0.6 | 0.1 | OK | OK |
| 6 | 25.6 | -1.0 | 12.3 | -0.4 | OK | 26.6 | 3.0 | OK | OK |
| 7 | -25.2 | 3.5 | 10.8 | 3.0 | OK | 28.7 | 3.2 | NG | NG |
| 8 | -6.0 | 22.6 | 8.3 | -0.4 | OK | 28.6 | 3.3 | NG | NG |
| 9 | 5.5 | -23.1 | 8.8 | 2.7 | OK | 28.6 | 3.1 | NG | NG |
| 10 | 25.0 | -4.0 | 10.5 | 0.2 | OK | 29.0 | 3.3 | NG | NG |
| 11 | -84.8 | -65.2 | 75.0 | 11.6 | NG | 19.7 | 2.2 | OK | NG |
| 12 | -59.9 | -51.5 | 55.7 | 9.0 | NG | 8.4 | 1.9 | OK | NG |
| 13 | -60.6 | -65.1 | 62.9 | 9.9 | NG | 4.5 | 2.5 | OK | NG |
| 14 | 62.6 | 68.8 | 65.7 | -7.6 | NG | 6.2 | 0.5 | OK | NG |
| 15 | 65.6 | 59.4 | 62.5 | -7.1 | NG | 6.2 | 2.4 | OK | NG |
| 16 | 79.3 | 52.7 | 66.0 | -7.6 | NG | 26.6 | 2.9 | OK | NG |
| 17 | -71.6 | -38.1 | 54.8 | 8.9 | NG | 33.5 | 3.1 | NG | NG |
| 18 | -80.3 | -32.0 | 56.2 | 9.0 | NG | 48.3 | 3.5 | NG | NG |
| 19 | 96.5 | 69.2 | 82.8 | -9.8 | NG | 27.3 | 3.2 | NG | NG |
| 20 | 70.9 | 37.5 | 54.2 | -6.0 | NG | 33.4 | 3.3 | NG | NG |
| 21 | -66.3 | -39.7 | 53.0 | -3.8 | OK | 26.6 | 2.9 | OK | OK |
| 22 | -64.6 | -37.7 | 51.1 | -3.7 | OK | 26.9 | 3.3 | NG | NG |
| 23 | 40.2 | 66.8 | 53.5 | -4.1 | NG | 26.6 | 2.9 | OK | NG |
| 24 | 39.1 | 66.0 | 52.6 | -4.0 | OK | 26.9 | 3.3 | NG | NG |
| 25 | 38.4 | 65.9 | 52.1 | -3.9 | OK | 27.5 | 3.3 | NG | NG |

FIG.43

$\alpha_X = 900, \alpha_Y = 65.0$

| SAMPLE | $\alpha_X - X1$ | $\alpha_X - X2$ | $\|\alpha_X - (X1+X2)/2\|$ THRESHOLD VALUE: 60.0 μm | $\alpha_U - U1$ THRESHOLD VALUE: ±4.0 μm | DETERMINATION RESULT OF EQUATION (1) | $\|X1 - X2\|$ THRESHOLD VALUE: 90.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -60.8 | 28.4 | 16.2 | 3.9 | OK | 89.1 | 2.7 | OK | OK |
| 2 | -22.4 | -17.8 | 20.1 | 3.8 | OK | 4.6 | 0.1 | OK | OK |
| 3 | 9.3 | -35.7 | 13.2 | 3.1 | OK | 45.0 | 0.9 | OK | OK |
| 4 | 27.8 | 59.5 | 43.6 | -3.8 | OK | 31.7 | 0.8 | OK | OK |
| 5 | 58.9 | 61.0 | 60.0 | -3.9 | OK | 2.1 | 0.1 | OK | OK |
| 6 | 58.4 | 30.6 | 44.5 | -0.4 | OK | 27.8 | 3.0 | OK | OK |
| 7 | -60.6 | 37.4 | 11.6 | 3.0 | OK | 98.0 | 3.2 | NG | NG |
| 8 | -40.3 | 57.3 | 8.5 | -0.4 | OK | 97.7 | 3.3 | NG | NG |
| 9 | 37.8 | -58.7 | 10.4 | 2.7 | OK | 96.5 | 3.1 | NG | NG |
| 10 | 59.7 | -37.0 | 11.3 | 0.2 | OK | 96.6 | 3.3 | NG | NG |
| 11 | -117.0 | -52.4 | 84.7 | 11.6 | NG | 64.7 | 2.2 | OK | NG |
| 12 | -77.1 | -47.8 | 62.5 | 9.0 | NG | 29.4 | 1.9 | OK | NG |
| 13 | -62.4 | -77.9 | 70.2 | 9.9 | NG | 15.5 | 2.5 | OK | NG |
| 14 | 63.0 | 84.4 | 73.7 | -7.6 | NG | 21.4 | 0.5 | OK | NG |
| 15 | 80.1 | 60.7 | 70.4 | -7.1 | NG | 19.3 | 2.4 | OK | NG |
| 16 | 119.0 | 29.0 | 74.0 | -7.6 | NG | 90.0 | 2.9 | NG | NG |
| 17 | -118.3 | -5.0 | 61.7 | 8.9 | NG | 113.3 | 3.1 | NG | NG |
| 18 | -144.9 | 17.8 | 63.6 | 9.0 | NG | 162.7 | 3.5 | NG | NG |
| 19 | 138.1 | 48.0 | 93.0 | -9.8 | NG | 90.1 | 3.2 | NG | NG |
| 20 | 118.4 | 4.7 | 61.6 | -6.0 | NG | 113.8 | 3.3 | NG | NG |
| 21 | -104.2 | -15.3 | 59.8 | -3.8 | OK | 88.9 | 2.9 | OK | OK |
| 22 | -102.9 | -12.8 | 57.9 | -3.7 | OK | 90.1 | 3.3 | NG | NG |
| 23 | 15.2 | 105.2 | 60.2 | -4.1 | NG | 90.0 | 2.9 | OK | NG |
| 24 | 13.8 | 104.9 | 59.4 | -4.0 | OK | 91.1 | 3.3 | NG | NG |
| 25 | 12.1 | 104.0 | 58.0 | -3.9 | OK | 91.8 | 3.3 | NG | NG |

FIG.44

$\alpha_X = 900, \alpha_Y = 43.3$

| SAMPLE | $\alpha_X - X1$ | $\alpha_X - X2$ | $\|\alpha_X - (X1+X2)/2\|$ THRESHOLD VALUE: 60.0 μm | $\alpha_U - U1$ THRESHOLD VALUE: ±4.0 μm | DETERMINATION RESULT OF EQUATION (1) | $\|X1 - X2\|$ THRESHOLD VALUE: 60.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -45.1 | 14.0 | 15.6 | 3.9 | OK | 59.1 | 2.7 | OK | OK |
| 2 | -21.3 | -18.5 | 19.9 | 3.8 | OK | 2.8 | 0.1 | OK | OK |
| 3 | 2.2 | -27.9 | 12.8 | 3.1 | OK | 30.2 | 0.9 | OK | OK |
| 4 | 32.4 | 53.9 | 43.2 | -3.8 | OK | 21.5 | 0.8 | OK | OK |
| 5 | 59.6 | 60.3 | 60.0 | -3.9 | OK | 0.7 | 0.1 | OK | OK |
| 6 | 54.7 | 36.1 | 45.4 | -0.4 | OK | 18.6 | 3.0 | OK | OK |
| 7 | -44.9 | 20.3 | 12.3 | 3.0 | OK | 65.2 | 3.2 | NG | NG |
| 8 | -23.9 | 41.9 | 9.0 | -0.4 | OK | 65.8 | 3.3 | NG | NG |
| 9 | 21.6 | -42.7 | 10.6 | 2.7 | OK | 64.2 | 3.1 | NG | NG |
| 10 | 44.0 | -20.4 | 11.8 | 0.2 | OK | 64.4 | 3.3 | NG | NG |
| 11 | -106.7 | -62.9 | 84.8 | 11.6 | NG | 43.7 | 2.2 | OK | NG |
| 12 | -71.8 | -52.8 | 62.3 | 9.0 | NG | 19.0 | 1.9 | OK | NG |
| 13 | -65.4 | -75.8 | 70.6 | 9.9 | NG | 10.4 | 2.5 | OK | NG |
| 14 | 66.9 | 80.5 | 73.7 | -7.6 | NG | 13.6 | 0.5 | OK | NG |
| 15 | 77.5 | 64.3 | 70.9 | -7.1 | NG | 13.2 | 2.4 | OK | NG |
| 16 | 103.7 | 44.2 | 74.0 | -7.6 | NG | 59.5 | 2.9 | OK | NG |
| 17 | -99.7 | -23.8 | 61.7 | 8.9 | NG | 76.0 | 3.1 | NG | NG |
| 18 | -117.3 | -8.7 | 63.0 | 9.0 | NG | 108.6 | 3.5 | NG | NG |
| 19 | 123.2 | 62.4 | 92.8 | -9.8 | NG | 60.8 | 3.2 | NG | NG |
| 20 | 99.2 | 23.5 | 61.4 | -6.0 | NG | 75.7 | 3.3 | NG | NG |
| 21 | -89.5 | -30.3 | 59.9 | -3.8 | OK | 59.2 | 2.9 | OK | OK |
| 22 | -87.8 | -27.7 | 57.8 | -3.7 | OK | 60.1 | 3.3 | NG | NG |
| 23 | 30.6 | 90.6 | 60.6 | -4.1 | NG | 60.0 | 2.9 | OK | NG |
| 24 | 28.5 | 89.5 | 59.0 | -4.0 | OK | 61.0 | 3.3 | NG | NG |
| 25 | 27.5 | 89.4 | 58.5 | -3.9 | OK | 61.9 | 3.3 | NG | NG |

FIG.45

$\alpha_X = 900, \alpha_Y = 21.7$

| SAMPLE | $\alpha_X - X1$ | $\alpha_X - X2$ | $|\alpha_X - (X1+X2)/2|$ THRESHOLD VALUE: 60.0 μm | $\alpha_U - U1$ THRESHOLD VALUE: ±4.0 μm | DETERMINATION RESULT OF EQUATION (1) | $|X1 - X2|$ THRESHOLD VALUE: 30.0 μm | U2 THRESHOLD VALUE: 3.0 μm | DETERMINATION RESULT OF EQUATION (2) | OVERALL DETERMINATION RESULT |
|---|---|---|---|---|---|---|---|---|---|
| 1 | -30.5 | -0.8 | 15.7 | 3.9 | OK | 29.8 | 2.7 | OK | OK |
| 2 | -20.5 | -19.1 | 19.8 | 3.8 | OK | 1.4 | 0.1 | OK | OK |
| 3 | -5.6 | -20.5 | 13.1 | 3.1 | OK | 14.9 | 0.9 | OK | OK |
| 4 | 37.9 | 48.4 | 43.1 | -3.8 | OK | 10.5 | 0.8 | OK | OK |
| 5 | 60.1 | 59.9 | 60.0 | -3.9 | OK | 0.1 | 0.1 | OK | OK |
| 6 | 49.6 | 40.3 | 45.0 | -0.4 | OK | 9.3 | 3.0 | OK | OK |
| 7 | -28.8 | 4.0 | 12.4 | 3.0 | OK | 32.7 | 3.2 | NG | NG |
| 8 | -7.5 | 25.3 | 8.9 | -0.4 | OK | 32.8 | 3.3 | NG | NG |
| 9 | 5.7 | -26.6 | 10.4 | 2.7 | OK | 32.3 | 3.1 | NG | NG |
| 10 | 28.0 | -4.3 | 11.9 | 0.2 | OK | 32.3 | 3.3 | NG | NG |
| 11 | -95.6 | -73.9 | 84.7 | 11.6 | NG | 21.8 | 2.2 | OK | NG |
| 12 | -67.1 | -57.5 | 62.3 | 9.0 | NG | 9.6 | 1.9 | OK | NG |
| 13 | -68.0 | -73.3 | 70.7 | 9.9 | NG | 5.3 | 2.5 | OK | NG |
| 14 | 70.3 | 77.4 | 73.9 | -7.6 | NG | 7.1 | 0.5 | OK | NG |
| 15 | 73.9 | 67.5 | 70.7 | -7.1 | NG | 6.4 | 2.4 | OK | NG |
| 16 | 88.8 | 59.4 | 74.1 | -7.6 | NG | 29.4 | 2.9 | OK | NG |
| 17 | -81.1 | -43.0 | 62.0 | 8.9 | NG | 38.1 | 3.1 | NG | NG |
| 18 | -90.4 | -35.9 | 63.2 | 9.0 | NG | 54.5 | 3.5 | NG | NG |
| 19 | 108.2 | 77.7 | 93.0 | -9.8 | NG | 30.4 | 3.2 | NG | NG |
| 20 | 80.3 | 42.6 | 61.4 | -6.0 | NG | 37.7 | 3.3 | NG | NG |
| 21 | -74.8 | -45.1 | 60.0 | -3.8 | OK | 29.7 | 2.9 | OK | OK |
| 22 | -72.7 | -42.7 | 57.7 | -3.7 | OK | 30.1 | 3.3 | NG | NG |
| 23 | 45.5 | 75.3 | 60.4 | -4.1 | NG | 29.8 | 2.9 | OK | NG |
| 24 | 43.8 | 74.0 | 58.9 | -4.0 | OK | 30.2 | 3.3 | NG | NG |
| 25 | 42.7 | 73.7 | 58.2 | -3.9 | OK | 30.9 | 3.3 | NG | NG |

FIG.46

METHOD OF QUALITY DETERMINING OF DEPOSITION MASK, METHOD OF MANUFACTURING DEPOSITION MASK, METHOD OF MANUFACTURING DEPOSITION MASK DEVICE, METHOD OF SELECTING DEPOSITION MASK, AND DEPOSITION MASK

CROSS REFERENCE TO RELATED APPLICATIONS

This application is a division of U.S. application Ser. No. 17/142,582, filed Jan. 6, 2021, which is a continuation of International Application No. PCT/JP2019/023374, filed Jun. 12, 2019, which designated the United States, the entireties of which are incorporated herein by reference.

FIELD OF THE INVENTION

The present disclosure relates to a method of quality determination of a deposition mask, a method of manufacturing a deposition mask, a method of manufacturing a deposition mask device, a method of selecting a deposition mask, and a deposition mask.

BACKGROUND OF THE INVENTION

A display device used in a portable device, such as a smartphone or a tablet PC, has been recently required to have high definition, for example, to have a pixel density of 500 ppi or more. A portable device is also desired to have ultra-high definition. In this case, a display device is required to have a pixel density of, e.g., 800 ppi or more.

Among display devices, an organic EL display device particularly has attracted attention because of its excellent responsibility, low power consumption and high contrast. A known method of forming pixels of an organic EL display device forms pixels in a desired pattern by using a deposition mask having through holes arranged in a desired pattern (see, for example, JP2001-234385A). To be specific, a deposition mask in a stretched state is brought into tight contact with a substrate for an organic EL display device. Then, the deposition mask and the substrate, which are in tight contact with each other, are put into a deposition device, and a deposition step of depositing an organic material on the substrate is performed. In this case, positions of through holes of the stretched mask need to be accurately reproduced as designed, in order to accurately manufacture an organic EL display device having a high pixel density.

SUMMARY OF THE INVENTION

The object of the present disclosure is to provide a method of quality determination of a deposition mask, a method of manufacturing a deposition mask, a method of manufacturing a deposition mask device, a method of selecting a deposition mask, and a deposition mask, which are capable of improving positional accuracy of through holes when a deposition mask is stretched.

A first aspect of the present disclosure is:
a method of quality determination of a deposition mask for determining a quality of a deposition mask extending in a first direction, the deposition mask comprising: a first center axis line that extends in the first direction and is arranged at a center position of a second direction orthogonal to the first direction; a P1 point and a Q1 point that are provided on one side of the first center axis line and are spaced apart from each other along the first direction; and a P2 point and a Q2 point that are provided on the other side of the first center axis line and are spaced apart from each other along the first direction; the method comprising:
a measuring step that measures a dimension X1 from the P1 point to the Q1 point, and a dimension X2 from the P2 point to the Q2 point; and
a determining step that determines a quality of the deposition mask, based on the dimension X1 and the dimension X2 measured in the measuring step.

As a second aspect of the present disclosure, in the method of quality determination of a deposition mask according to the aforementioned first aspect,
the determining step may determine whether an equation below is satisfied:

$$\left| \alpha_X - \frac{X1 + X2}{2} \right| \leq \frac{\alpha_X}{15} \times 10^{-3}$$

in which $\alpha_X$ represents a design value of the dimension X1 and the dimension X2.

As a third aspect of the present disclosure, in the method of quality determination of a deposition mask according to the aforementioned first or second aspect;
the deposition mask may have a plurality of through holes; and
the determining step may determine whether an equation below is satisfied:

$$|X1 - X2| \leq \frac{\alpha_X}{10} \times \frac{\alpha_Y}{W_Y} \times 10^{-3}$$

in which $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of the two through holes in the second direction.

As a fourth aspect of the present disclosure, in the method of quality determination of a deposition mask according to each of the aforementioned first to third aspects,
the P1 point and the P2 point may be intended to be symmetrically arranged with respect to the first center axis line during deposition, and the Q1 point and the Q2 point may be intended to be symmetrically arranged with respect to the first center axis line during deposition.

As a fifth aspect of the present disclosure, in the method of quality determination of a deposition mask according to each of the aforementioned first to fourth aspects;
the P1 point and the P2 point may be arranged on one side of a second center axis line arranged at a center position of the first direction; and
the Q1 point and the Q2 point may be arranged on the other side of the second center axis line.

As a sixth aspect of the present disclosure, in the method of quality determination of a deposition mask according to the fifth aspect,
the P1 point and the Q1 point may be intended to be symmetrically arranged with respect to the second center axis line during deposition, and the P2 point and the Q2 point may be intended to be symmetrically arranged with respect to the second center axis line during deposition.

A seventh aspect of the present disclosure is:
a method of manufacturing a deposition mask comprising:
a step of preparing a deposition mask; and
a step of determining a quality of the deposition mask by the method of quality determination of a deposition mask according to the aforementioned respective first to sixth aspects.

An eighth embodiment of the present disclosure is:
a method of manufacturing a deposition mask extending in a first direction, the deposition mask comprising: a first center axis line that extends in the first direction and is arranged at a center position of a second direction orthogonal to the first direction; a P1 point and a Q1 point that are provided on one side of the first center axis line and are spaced apart from each other along the first direction; and a P2 point and a Q2 point that are provided on the other side of the first center axis line and are spaced apart from each other along the first direction; the method comprising:
a step of preparing the deposition mask;
a measuring step that measures a dimension X1 from the P1 point to the Q1 point, and a dimension X2 from the P2 point to the Q2 point; and
a selecting step that selects the deposition mask wherein the dimension X1 and the dimension X2 measured in the measuring step satisfy an equation below:

$$\left| \alpha_X - \frac{X1 + X2}{2} \right| \leq \frac{\alpha_X}{15} \times 10^{-3}$$

in which $\alpha_X$ represents a design value of the dimension X1 and the dimension X2.

As a ninth aspect of the present disclosure, in the method of manufacturing a deposition mask according to the aforementioned eighth aspect;
the deposition mask may have a plurality of through holes; and
the selecting step may select the deposition mask that satisfies an equation below:

$$|X1 - X2| \leq \frac{\alpha_X}{10} \times \frac{\alpha_Y}{W_Y} \times 10^{-3}$$

in which $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of the two through holes in the second direction.

A tenth aspect of the present disclosure is:
a method of manufacturing a deposition mask extending in a first direction and having a plurality of through holes, the deposition mask comprising: a first center axis line that extends in the first direction and is arranged at a center position of a second direction orthogonal to the first direction; a P1 point and a Q1 point that are provided on one side of the first center axis line and are spaced apart from each other along the first direction; and a P2 point and a Q2 point that are provided on the other side of the first center axis line and are spaced apart from each other along the first direction; the method comprising:
a step of preparing the deposition mask;
a measuring step that measures a dimension X1 from the P1 point to the Q1 point, and a dimension X2 from the P2 point to the Q2 point; and
a selecting step that selects the deposition mask wherein the dimension X1 and the dimension X2 measured in the measuring step satisfy an equation below:

$$|X1 - X2| \leq \frac{\alpha_X}{10} \times \frac{\alpha_Y}{W_Y} \times 10^{-3}$$

in which $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of two through holes in the second direction.

The seventh to tenth aspects may be a deposition mask manufactured by the method of manufacturing a deposition mask in the seventh to tenth aspects.

An eleventh aspect of the present disclosure is:
a method of manufacturing a deposition mask device comprising:
a step of preparing the deposition mask by the method of manufacturing a deposition mask according to each of the aforementioned seventh to tenth aspects; and
a step of applying a tensile force to the deposition mask in the first direction and stretching the deposition mask on a frame.

The eleventh aspect may be a deposition mask manufactured by the method of manufacturing a deposition mask in the eleventh aspect.

A twelfth aspect of the present disclosure is:
a method of selecting a deposition mask extending in a first direction, the deposition mask comprising: a first center axis line that extends in the first direction and is arranged at a center position of a second direction orthogonal to the first direction; a P1 point and a Q1 point that are provided on one side of the first center axis line and are spaced apart from each other along the first direction; and a P2 point and a Q2 point that are provided on the other side of the first center axis line and are spaced apart from each other along the first direction; the method comprising:
a measuring step that measures a dimension X1 from the P1 point to the Q1 point, and a dimension X2 from the P2 point to the Q2 point; and
a selecting step that selects the deposition mask wherein the dimension X1 and the dimension X2 measured in the measuring step satisfy an equation below:

$$\left| \alpha_X - \frac{X1 + X2}{2} \right| \leq \frac{\alpha_X}{15} \times 10^{-3}$$

in which $\alpha_X$ represents a design value of the dimension X1 and the dimension X2.

A thirteenth aspect of the present disclosure is:
a method of selecting a deposition mask extending in a first direction and having a plurality of through holes, the deposition mask comprising: a first center axis line that extends in the first direction and is arranged at a center position of a second direction orthogonal to the first direction; a P1 point and a Q1 point that are provided on one side of the first center axis line and are spaced apart from each other along the first direction; and a P2 point and a Q2 point that are provided on the other side of the first center axis line and are spaced apart from each other along the first direction; the method comprising:

a measuring step that measures a dimension X1 from the P1 point to the Q1 point, and a dimension X2 from the P2 point to the Q2 point; and a selecting step that selects the deposition mask wherein the dimension X1 and the dimension X2 measured in the measuring step satisfy an equation below:

$$|X1 - X2| \le \frac{\alpha_X}{10} \times \frac{\alpha_Y}{W_Y} \times 10^{-3}$$

in which $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of two through holes in the second direction.

A fourteenth aspect of the present disclosure is:

a deposition mask extending in a first direction, comprising:

a first center axis line that extends in the first direction and is arranged at a center position of a second direction orthogonal to the first direction;

a P1 point and a Q1 point that are provided on one side of the first center axis line and are spaced apart from each other along the first direction; and a P2 point and a Q2 point that are provided on the other side of the first center axis line and are spaced apart from each other along the first direction;

wherein the deposition mask satisfies an equation below:

$$\left|\alpha_X - \frac{X1 + X2}{2}\right| \le \frac{\alpha_X}{15} \times 10^{-3}$$

in which X1 represents a dimension from the P1 point to the Q1 point, X2 represents a dimension from the P2 point to the Q2 point, and $\alpha_X$ represents a design value of the dimension X1 and the dimension X2.

A fifteenth aspect of the present disclosure is:

a deposition mask extending in a first direction and having a plurality of through holes, comprising:

a first center axis line that extends in the first direction and is arranged at a center position of a second direction orthogonal to the first direction;

a P1 point and a Q1 point that are provided on one side of the first center axis line and are spaced apart from each other along the first direction; and a P2 point and a Q2 point that are provided on the other side of the first center axis line and are spaced apart from each other along the first direction;

wherein the deposition mask satisfies an equation below:

$$|X1 - X2| \le \frac{\alpha_X}{10} \times \frac{\alpha_Y}{W_Y} \times 10^{-3}$$

in which X1 represents a dimension from the P1 point to the Q1 point, X2 represents a dimension from the P2 point to the Q2 point, $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of two through holes in the second direction.

A sixteenth aspect of the present disclosure is:

a deposition method comprising:

a step of preparing the deposition mask device by the method of manufacturing a deposition mask device according to the aforementioned eleventh aspect;

a step of bringing the deposition mask of the deposition mask device into tight contact with a substrate; and a step of depositing a deposition material on the substrate through the through holes of the deposition mask.

The present disclosure can improve the positional accuracy of the through holes, when the deposition mask is stretched.

BRIEF DESCRIPTION OF THE DRAWINGS

FIG. 29 is a view showing quality determination results of deposition masks, wherein $\alpha_X$=200 mm and $\alpha_Y$=65.0 mm, in an example of the present disclosure.

FIG. 30 is a view showing quality determination results of deposition masks, wherein $\alpha_X$=200 mm and $\alpha_Y$=43.3 mm, in an example of the present disclosure.

FIG. 31 is a view showing quality determination results of deposition masks, wherein $\alpha_X$=200 mm and $\alpha_Y$=21.7 mm, in an example of the present disclosure.

FIG. 32 is a view showing quality determination results of deposition masks, wherein $\alpha_X$=300 mm and $\alpha_Y$=65.0 mm, in an example of the present disclosure.

FIG. 33 is a view showing quality determination results of deposition masks, wherein $\alpha_X$=300 mm and $\alpha_Y$=43.3 mm, in an example of the present disclosure.

FIG. 34 is a view showing quality determination results of deposition masks, wherein $\alpha_X$=300 mm and $\alpha_Y$=21.7 mm, in an example of the present disclosure.

FIG. 35 is a view showing quality determination results of deposition masks, wherein $\alpha_X$=400 mm and $\alpha_Y$=65.0 mm, in an example of the present disclosure.

FIG. 36 a view showing quality determination results of deposition masks, wherein $\alpha_X$=400 mm and $\alpha_Y$=43.3 mm, in an example of the present disclosure.

FIG. 37 is a view showing quality determination results of deposition masks, wherein $\alpha_X$=400 mm and $\alpha_Y$=21.7 mm, in an example of the present disclosure.

FIG. 38 is a view showing quality determination results of deposition masks, wherein $\alpha_X$=600 mm and $\alpha_Y$=65.0 mm, in an example of the present disclosure.

FIG. 39 is a view showing quality determination results of deposition masks, wherein $\alpha_X$=600 mm and $\alpha_Y$=43.3 mm, in an example of the present disclosure.

FIG. 40 is a view showing quality determination results of deposition masks, wherein $\alpha_X$=600 mm and $\alpha_Y$=21.7 mm, in an example of the present disclosure.

FIG. 41 is a view showing quality determination results of deposition masks, wherein $\alpha_X$=800 mm and $\alpha_Y$=65.0 mm, in an example of the present disclosure.

FIG. 42 is a view showing quality determination results of deposition masks, wherein $\alpha_X$=800 mm and $\alpha_Y$=43.3 mm, in an example of the present disclosure.

FIG. 43 is a view showing quality determination results of deposition masks, wherein $\alpha_X$=800 mm and $\alpha_Y$=21.7 mm, in an example of the present disclosure.

FIG. 44 is a view showing quality determination results of deposition masks, wherein $\alpha_X$=900 mm and $\alpha_Y$=65.0 mm, in an example of the present disclosure.

FIG. 45 is a view showing quality determination results of deposition masks, wherein $\alpha_X$=900 mm and $\alpha_Y$=43.3 mm, in an example of the present disclosure.

FIG. 46 is a view showing quality determination results of deposition masks, wherein $\alpha_X$=900 mm and $\alpha_Y$=21.7 mm, in an example of the present disclosure.

DETAILED DESCRIPTION OF THE INVENTION

Figure 1:
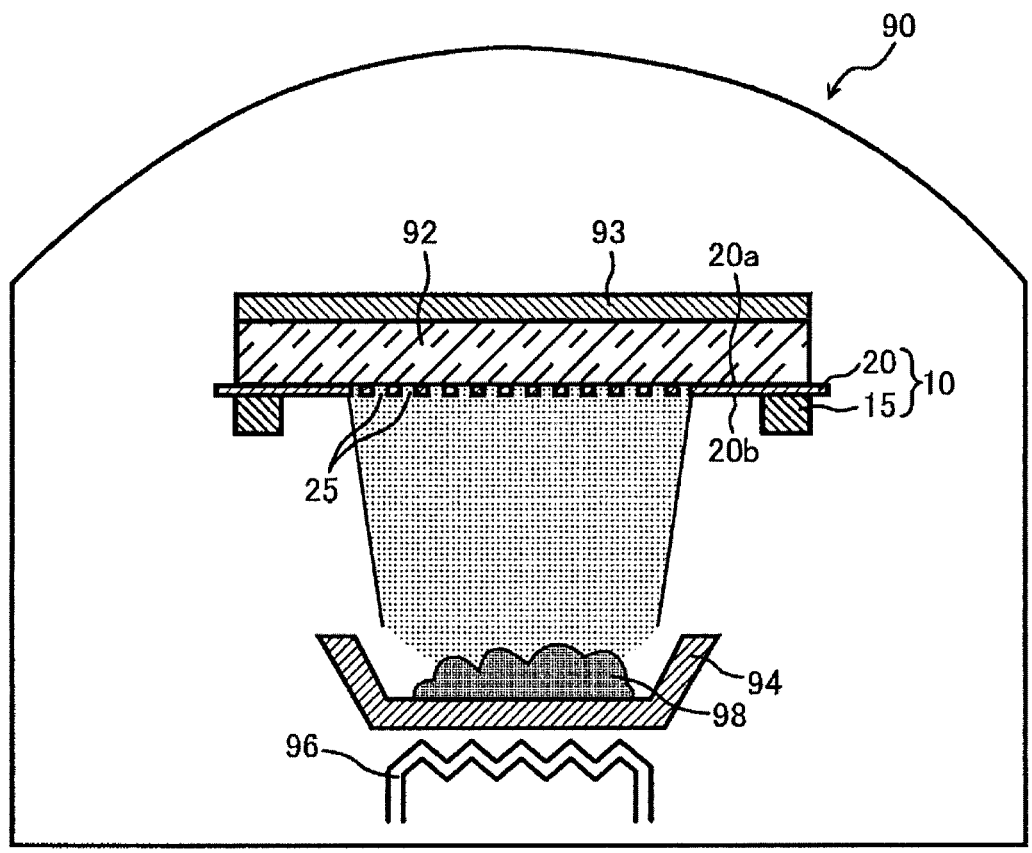
FIG. 1 is a view showing a deposition device comprising a deposition mask device according to an embodiment of the present disclosure.

In the specification and the drawings, terms such as "plate", "sheet" and "film" are not differentiated from one another based only on the difference of terms, unless otherwise specified. For example, the "plate" is a concept including a member which can be referred to as sheet or film. The term "surface (sheet surface, film surface)" means a surface corresponding to a plane direction of a plate-like (sheet-like, film-like) member as a target, when the plate-like (sheet-like, film-like) member as a target is seen as a whole in general. A normal direction used to the plate-like (sheet-like, film-like) member means a normal direction with respect to a surface (sheet surface, film surface) of the member. Further, terms specifying shapes, geometric conditions and their degrees, e.g., "parallel", "orthogonal", etc., and values of a length and an angle are not limited to their strict definitions, but construed to include a range capable of exerting a similar function.

In the specification and the drawings, unless otherwise specified, terms specifying shapes, geometric conditions and their degrees, e.g., "parallel", "orthogonal", etc., and values of a length and an angle are not limited to their strict definitions, but construed to include a range capable of exerting a similar function.

In the specification and the drawings, when a certain member or a certain structure, such as a zone, is located "above (or below)", "on an upper side (or on a lower side)" or "upward (or downward)", not only a case where the one structure is in direct contact with the other structure, but also a case in which another structure is included between the one structure and the other structure is included. In addition, unless otherwise specified, the terms "up (or upper side and upward)" and "down (or lower side and downward)" may be vertically reversed.

In the specification and the drawings, the same or similar symbols are given to the same parts or parts having similar functions, and the repeated description thereof may be omitted. In addition, a dimensional ratio of the drawings may differ from an actual one for convenience of explanation, and/or a part of a structure may be omitted from the drawings.

In the specification and the drawings, unless otherwise specified, embodiments of the present disclosure may be combined with another embodiment and a modification example to the extent that there is no contradiction. In addition, other embodiments, and another embodiment and a modification example may be combined to the extent that there is no contradiction. Moreover, modification examples may be combined to the extent that there is no contradiction.

In the specification and the drawings, unless otherwise specified, when a plurality of steps of a method, such as a manufacturing method, are disclosed, another step which is not disclosed may be performed between the disclosed steps. In addition, the order of the disclosed steps is optional to the extent that there is no contradiction.

In the specification and the drawings, unless otherwise specified, a numerical range represented by a symbol "-" includes numerical values placed before and after the symbol "-". For example, a numeral range defined by the expression "34-38% by mass" is the same as a numerical range defined by an expression "between 34% by mass or more and 38% by mass or less".

In one embodiment of the specification, a deposition mask used for patterning an organic material on a substrate in a desired pattern in the manufacture of an organic EL display device, and a manufacturing method thereof is described by way of example. Note that the present embodiment is not limited to such an application, and can be applied to a deposition mask used for various purposes.

An embodiment of the present disclosure is described in detail herebelow with reference to the drawings. The embodiment shown herebelow is an example of the embodiment of the present disclosure, and the present disclosure should not be construed as being confined to the embodiment alone. In the drawings attached to the specification, a scale dimension, an aspect ratio and so on are changed and exaggerated from the actual ones, for the convenience of easiness in illustration and understanding.

A deposition device 90 is described first with reference to FIG. 1. The deposition device 90 performs a deposition process of depositing a deposition material on a target. As shown in FIG. 1, the deposition device 90 may comprise therein a deposition source (e.g., crucible 94), a heater 96 and a deposition mask device 10. The deposition device 90 may further comprise evacuation means that creates a vacuum atmosphere inside the deposition device 90. The crucible 94 accommodates a deposition material 98 such as an organic luminescence material. The heater 96 heats the crucible 94 and evaporates the deposition material 98 under a vacuum atmosphere. The deposition mask device 10 is arranged to be opposed to the crucible 94.

The deposition mask device 10 is described herebelow. As shown in FIG. 1, the deposition mask device 10 may comprise the deposition mask 20, and a frame 15 supporting the deposition mask 20. The frame 15 supports the deposition mask 20 in such a manner that the deposition mask 20 is stretched in its plane direction, so as not to bend the deposition mask 20. As shown in FIG. 1, the deposition mask device 10 is arranged in the deposition device 90 such that the deposition mask 20 faces a substrate which is a target on which the deposition material 98 is deposited. The substrate is, for example, an organic EL substrate 92. In the description below, among surfaces of the deposition mask 20, a surface which is on the organic EL substrate 92 side is referred to as first surface 20a. In addition, a surface which is positioned on the opposite side of the first surface 20a, is referred to as second surface 20b.

As shown in FIG. 1, the deposition mask device 10 may comprise a magnet 93. The magnet 93 is arranged on a surface of the organic EL substrate 92, which is on the opposite side of the deposition mask 20. Since the magnet 93 magnetically attracts the deposition mask 20 toward the magnet 93, the deposition mask 20 can be brought into tight contact with the organic EL substrate 92.

Figure 3:
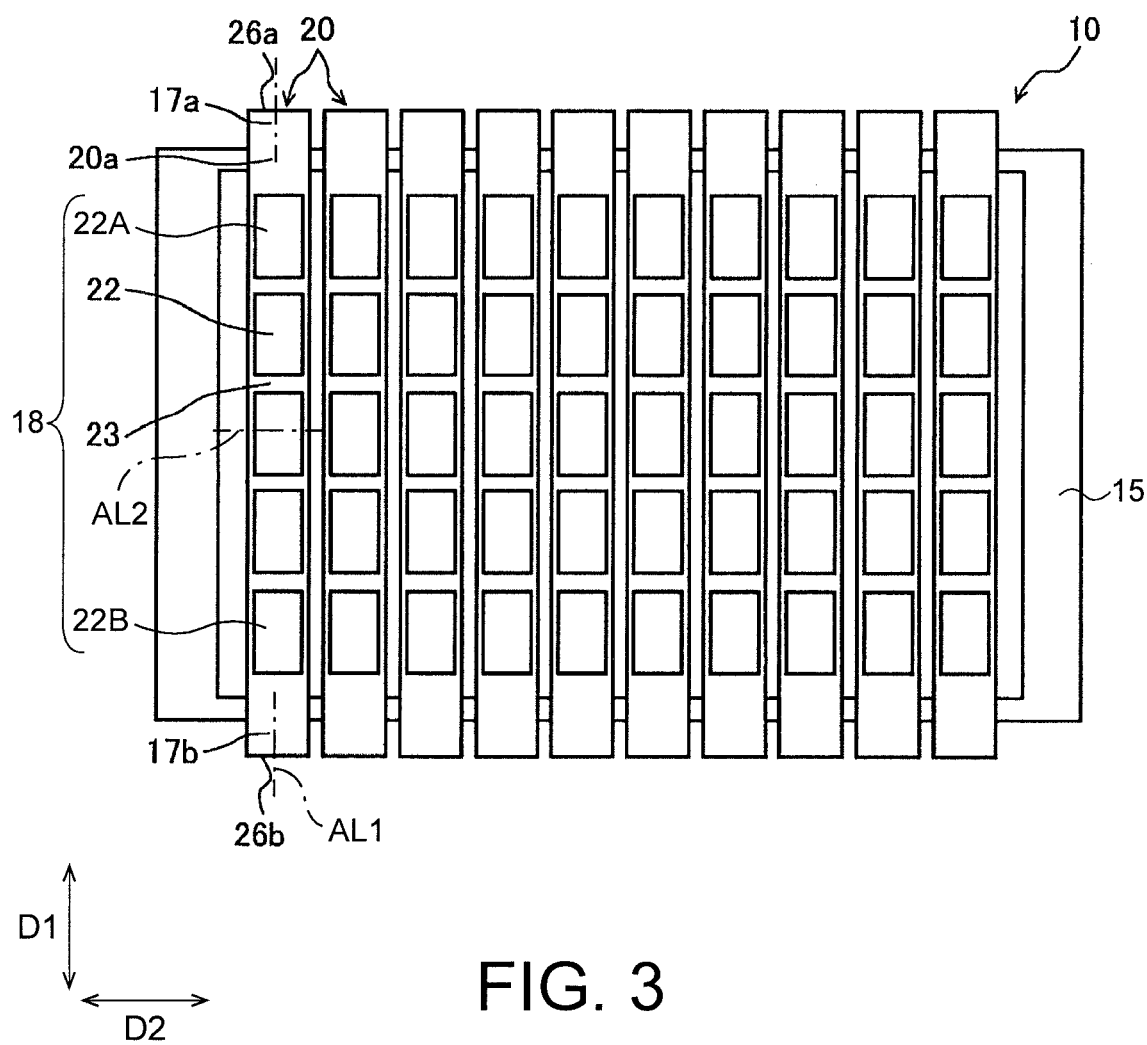
FIG. 3 is a plan view showing the deposition mask device according to the embodiment of the present disclosure.

FIG. 3 is a plan view showing the deposition mask device 10 seen from the first surface 20a side of the deposition mask 20. As shown in FIG. 3, the deposition mask device 10 comprises a plurality of deposition masks 20 each having substantially a rectangular shape in a plan view. Each of the deposition masks 20 is secured on the frame 15 at a pair of end portions 26a and 26b in a longitudinal direction D1 of the deposition mask 20.

The deposition mask 20 may include a metal plate having a plurality of through holes 25 passing through the deposition mask 20. The deposition material 98 evaporated from the crucible 94 reaches the deposition mask device 10. The deposition material 98 runs through the through holes 25 of the deposition mask 20 and deposits on the organic EL substrate 92. Thus, a film of the deposition material 98 can be formed on the surface of the organic EL substrate 92 in a desired pattern corresponding to the positions of the through holes 25 of the deposition mask 20.

Figure 2:
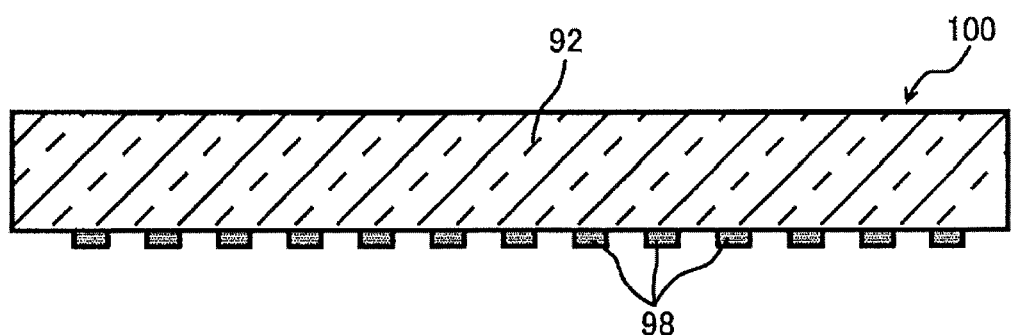
FIG. 2 is an organic EL display device manufactured by using the deposition mask device shown in FIG. 1.

FIG. 2 is a sectional view showing an organic EL display device 100 manufactured by using the deposition device 90 of FIG. 1. The organic EL display device 100 may comprise an organic EL substrate 92, and pixels containing the patterned deposition material 98.

In the case of colored display by a plurality of colors, the deposition devices 90 provided with the deposition masks 20 corresponding to respective colors may be respectively prepared, and the organic EL substrates 92 may be put into the respective deposition devices 90 in sequence. Thus, for example, an organic luminescence material for red color, an organic luminescence material for green color, and an organic luminescence material for blue color can be deposited on the organic EL substrates 92 in sequence.

The deposition process is sometimes performed inside the deposition device 90 in a high-temperature atmosphere. In this case, the deposition mask 20, the frame 15 and the organic EL substrate 92, which are arranged inside the deposition device 90, are also heated during the deposition process. At this time, the deposition mask 20, the frame 15 and the organic EL substrate 92 exhibit dimensional change behaviors depending on their respective thermal expansion coefficients. In this case, the thermal expansion coefficients of the deposition mask 20 and the frame 15 preferably do not differ significantly from the thermal expansion coefficient of the organic EL substrate 92. This can reduce positional deviation which might be caused by difference in dimensional change of them. As a result, dimensional accuracy and positional accuracy of the deposition material to be deposited on the organic EL substrate 92 can be improved.

The thermal expansion coefficients of the deposition mask 20 and the frame 15 may be values equivalent to the thermal expansion coefficient of the organic EL substrate 92. For example, when a glass substrate is used as the organic EL substrate 92, an iron alloy containing nickel may be used as a main material of the deposition mask 20 and the frame 15. For example, an iron alloy having a nickel content of between 30% or more and 54% or less by mass may be used as the material of the metal plate constituting the deposition mask 20. Specific examples of an iron alloy containing nickel may include an invar material having a nickel content of between 34% or more and 38% or less by mass, a super invar material containing cobalt in addition to a nickel content of between 30% or more and 34% or less by mass, a low thermal expansion Fe—Ni based plating alloy having a nickel content of between 38% or more and 54% or less by mass, etc.

When the temperatures of the deposition mask 20, the frame 15 and the organic EL substrate 92 do not reach high temperatures during the deposition process, the thermal expansion coefficients of the deposition mask 20 and the frame 15 may not necessarily be values equivalent to that of the thermal expansion coefficient of the organic EL substrate 92. In this case, a material other than the aforementioned iron alloy can be used as the material constituting the deposition mask 20. For example, an iron alloy other than the aforementioned iron alloy containing nickel, such as an iron alloy containing chrome, may be used. An iron alloy referred to as so-called stainless may be used as the iron alloy containing chrome, for example. An alloy other than the iron alloy, such as nickel or nickel-cobalt alloy, may be used.

Next, the deposition mask 20 is described in detail. As shown in FIG. 3, the deposition mask 20 in this embodiment may have an elongated or stick-like planar shape. The deposition mask 20 may comprise a pair of tip portions (first tip portion 17a and second tip portion 17b) constituting the pair of end portions (first end portion 26a and second end portion 26b) in the longitudinal direction D1 of the deposition mask 20, and an intermediate portion 18 located between the pair of tip portions 17a and 17b.

The tip portions 17a and 17b are described in detail first. The tip portions 17a and 17b are portions of the deposition mask 20, which are secured on the frame 15. In this embodiment, the tip portions 17a and 17b may be integrally formed with the intermediate portion 18. Alternatively, the tip portions 17a and 17b may be formed by separate members from the intermediate portion 18. In this case, the tip portions 17a and 17b may be joined to the intermediate portion 18 by welding, for example.

Next, the intermediate portion 18 is described. The intermediate portion 18 may include an effective zone 22 and a peripheral zone 23. A through hole 25 extending from the first surface 20a to reach the second surface 20b is formed in the effective zone 22. The peripheral zone 23 is located around the effective zone 22 to surround the effective zone 22. The effective zone 22 may be a zone of the deposition mask 20, which faces a display region of the organic EL substrate 92.

As shown in FIG. 3, the intermediate portion 18 may include a plurality of the effective zones 22. The effective zones 22 are arranged along the longitudinal direction D1 of the deposition mask 20 with predetermined intervals therebetween. One effective zone 22 may correspond to a display region of one organic EL display device 100. Thus, a multifaceted deposition of the organic EL display device 100 may be enabled, like the deposition mask device 10 shown in FIG. 1.

As shown in FIG. 3 the effective zone 22 may have a substantially rectangular profile in a plan view. Although not shown, each effective zone 22 may have any profile, depending on a shape of a display region of the organic EL substrate 92. For example, each effective zone 22 may have a circular profile.

Figure 4:
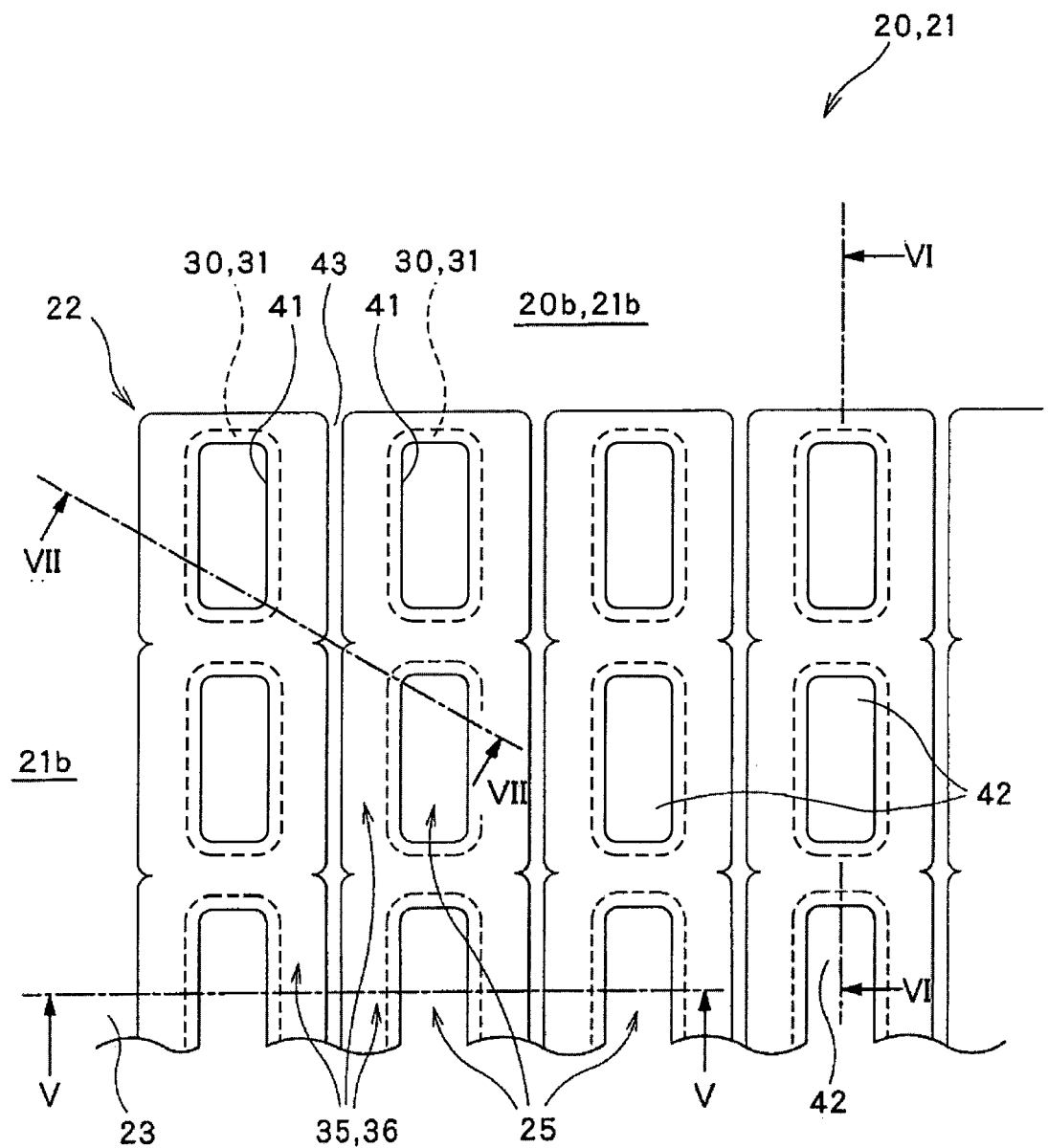
FIG. 4 is a partial plan view showing an effective zone of a deposition mask shown in FIG. 3.
Figure 9A:
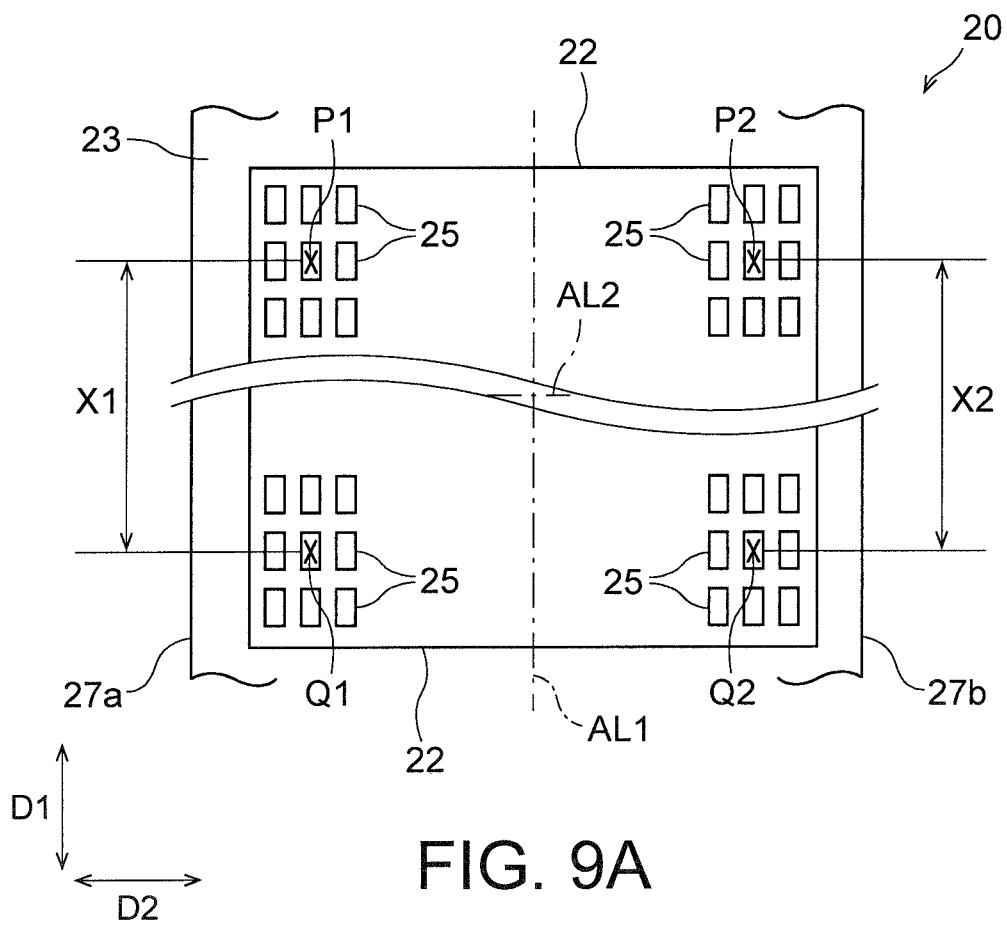
FIG. 9A is a schematic view for describing a dimension X1 and a dimension X2 in the deposition mask of FIG. 3.
Figure 9B:
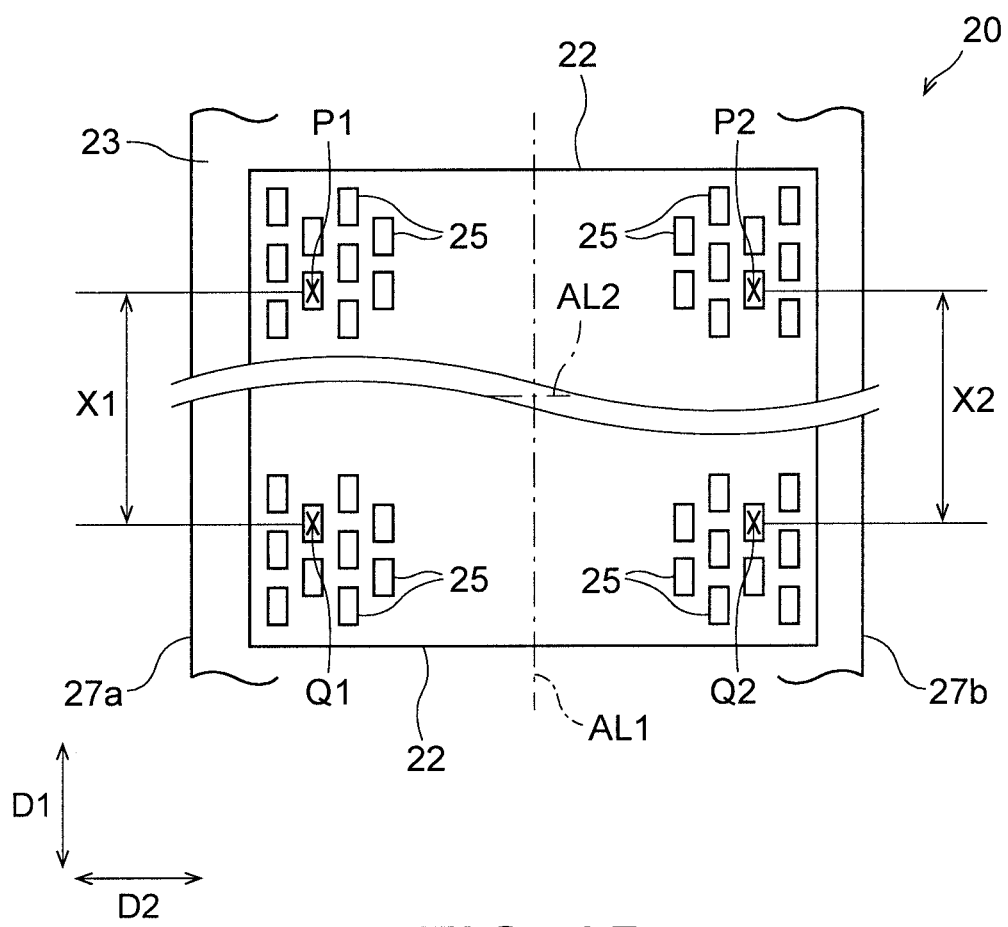
FIG. 9B is a schematic view for describing a dimension X1 and a dimension X2 in the deposition mask of FIG. 3 as a modification example of FIG. 9A.

The effective zone 22 is described in detail herebelow. FIG. 4 is an enlarged plan view showing the effective zones 22 seen from the second surface 20b side of the deposition mask 20. As shown in FIG. 4, in the illustrated example, a plurality of the through holes 25 formed in the respective effective zones 22 may be arranged in these effective zones 22 along two directions orthogonal to each other at predetermined pitches respectively. As shown in FIGS. 4 and 9A described later, the through holes 25 may be arranged in a grid pattern in a plan view. Suppose that the through holes 25 which are arranged along the first direction D1 form a first column, a second column, . . . , and that the first column and the second column are adjacent to each other in a second direction D2. Positions of the through holes 25 forming the first column in the first direction D1 and positions of the through holes 25 forming the second column in the first direction D1 are equal to each other. Alternatively, the positions of the through holes 25 forming the first column in the first direction D1 may be shifted from the positions of the through holes 25 forming the second column in the first direction D1. For example, as shown in FIG. 9B described later, a through hole 25 forming the second column may be arranged at a position corresponding to an intermediate position between through holes 25 forming the first column, which are adjacent to each other in the first direction D1. Also in this case, as shown in FIG. 9B, pitches between the through holes 25 forming the first column and pitches between the through holes 25 forming the second column may equal to each other. The layout of the through holes 25 shown in the FIG. 9B described later can also be referred to as staggered layout. When the through holes 25 are arranged in a grid pattern or a staggered pattern, the layout of the through holes 25 can have a regularity (or possibly symmetry). Thus, as described later, a quality of the deposition mask 20 can be well determined by using only four through holes 25 on behalf of a lot of the through holes 25. The four through holes 25 correspond to a P1 point, a P2 point, a Q1 point and a Q2 point. The through hole 25 may have any planar shape, and may be rectangular or polyangular (e.g., quadrangular, rhombic, etc.). In this case, each side may be inwardly concaved or outwardly convexed. The through hole 25 may have a circular or elliptic planar shape. FIG. 4 shows, by way of example, a rectangular shape with rounded corners.

Figure 5:
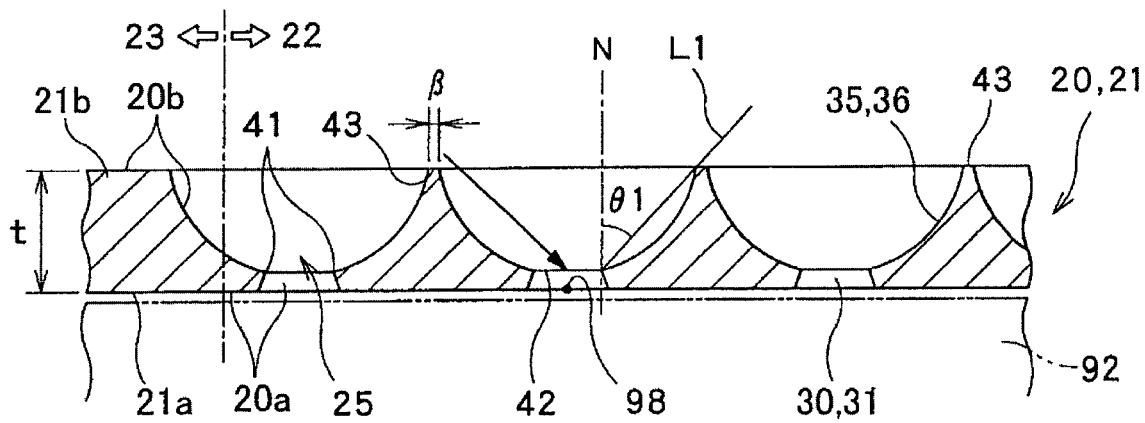
FIG. 5 is a sectional view along a V-V line of FIG. 4.
Figure 6:
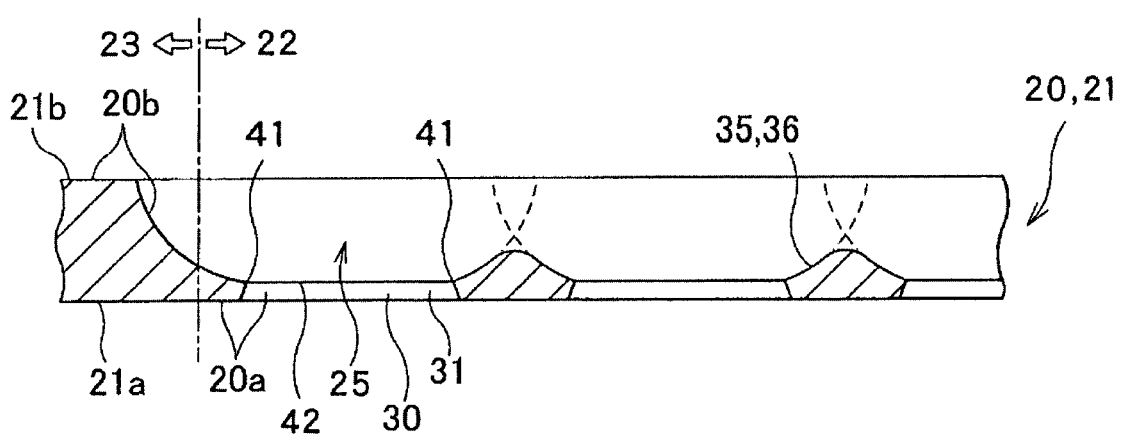
FIG. 6 is a sectional view along a VI-VI line of FIG. 4.
Figure 7:
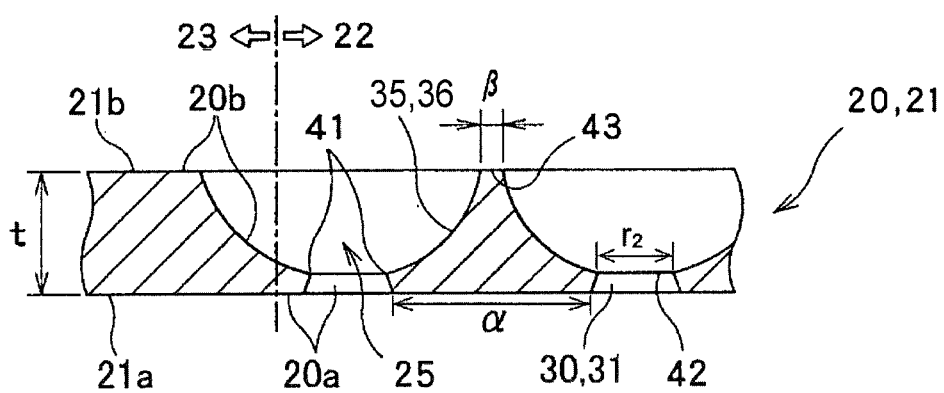
FIG. 7 is a sectional view along a VII-VII line of FIG. 4.

An example of the through hole 25 is further described in detail with reference mainly to FIGS. 5 to 7. FIGS. 5 to 7 are sectional views along a V-V direction to a VII-VII direction of the effective zone 22 of FIG. 4, respectively.

As shown in FIGS. 5 to 7, the through holes 25 pass through the deposition mask 20 from the first surface 20a to the second surface 20b. The first surface 20a serves as one side along a normal direction N of the deposition mask 20. The second surface 20b serves as the other side along the normal direction N of the deposition mask 20. In the illustrated example, as described in detail later, a first recess 30 may be formed by etching in a first surface 21a of a metal plate 21. The first surface 21a serves as one side in the normal direction N of the deposition mask 20. In addition, a second recess 35 may be formed in a second surface 21b of the metal plate 21. The second surface 21b serves as the other side in the normal direction N of the deposition mask 20. The first recess 30 may be connected to the second recess 35, so that the second recess 35 and the first recess 30 may be formed in communication with each other. The through hole 25 may be composed of the second recess 35 and the first recess 30 connected to the second recess 35.

As shown in FIGS. 5 to 7, an opening area of each second recess 35 in a section along a plate plane of the deposition mask 20 in each position along the normal direction N of the deposition mask 20 may gradually decrease from the second surface 20b of the deposition mask 20 toward the first surface 20a thereof. Similarly, an opening area of each first recess 30 in a section along the plate plane of the deposition mask 20 in each position along the normal direction N of the deposition mask 20 may gradually decrease from the first surface 20a of the deposition mask 20 toward the second surface 20b thereof.

As shown in FIGS. 5 to 7, a wall surface 31 of the first recess 30 and a wall surface 36 of the second recess 35 may be connected to each other through a circumferential connection portion 41. The connection portion 41 may be defined by a ridge line of a protrusion at which the wall surface 31 of the first recess 30, which is inclined with respect to the normal direction N of the deposition mask 20, and the wall surface 36 of the second recess 35, which is inclined with respect to the normal direction N of the deposition mask 20, merge. The connection portion 41 may define a through portion 42 at which an opening area of the through hole 25 is minimum in a plan view of the deposition mask 20.

As shown in FIGS. 5 to 7, the adjacent two through holes 25 on the other side surface along the normal direction N of the deposition mask 20, i.e., on the first surface 20a of the deposition mask 20, may be separated from each other along the plate plane of the deposition mask 20. Namely, as in the method of manufacturing described later, when the first recesses 30 are produced by etching the metal plate 21 from the first surface 21a of the metal plate 21, which correspond to the first surface 20a of the deposition mask 20, the first surface 21a of the metal plate 21 may remain between the adjacent two first recesses 30.

Similarly, as shown in FIGS. 5 and 7, the adjacent two second recesses 35 on the one side along the normal direction N of the deposition mask 20, i.e., on the second surface 20b of the deposition mask 20, may also be separated from each other along the plate plane of the deposition mask 20. Namely, the second surface 21b of the metal plate 21 may remain between the adjacent two second recesses 35. In the below description, a portion of the effective zone 22 of the second surface 21b of the metal plate 21, which is not etched and thus remains, is referred to also as top portion 43. The deposition mask 20 manufactured to have such a remaining top portion 43 can have sufficient strength. Thus, the deposition mask 20 can be more resistant to be damaged while being handled, for example. However, an excessively large width β of the top portion 43 may cause shadow in the deposition step, which lowers utilization efficiency of the deposition material 98. Thus, the deposition mask 20 is preferably produced such that the width β of the top portion 43 is not excessively large. For example, the width β of the top portion 43 is preferably 2 μm or less. The width β of the top portion 43 usually depends on a direction along which the deposition mask 20 is cut. For example, the widths β of the top portions 43 shown in FIGS. 5 and 7 may differ from one another. In this case, the deposition mask 20 may be configured such that the width β of the top portion 43 is 2 μm or less when the deposition mask 20 is cut in any direction.

As shown in FIG. 6, the metal plate 21 may be etched such that the adjacent two second recesses 35 are connected to each other depending on location. Namely, there may be a location where no second surface 21b of the metal plate 21 remains between the adjacent two second recesses 35. In addition, although not shown, the metal plate 21 may be etched such that adjacent two second recesses 35 are connected to each other over the entire second surface 21b.

When the deposition mask device 10 is received in the deposition device 90 as shown in FIG. 1, as indicated by the two-dot chain lines in FIG. 5, the first surface 20a of the deposition mask 20 faces the organic EL substrate 92, and the second surface 20b of the deposition mask 20 is located close to the crucible 94 accommodating the deposition material 98. Thus, the deposition material 98 passes through the second recess 35 whose opening area gradually decreases, and deposits on the organic EL substrate 92. As shown by the arrow extending from the second surface 20b to the first surface 20a in FIG. 5, the deposition material 98 not only moves from the crucible 94 toward the organic EL substrate 92 along the normal direction N of the organic EL substrate 92, but also sometimes moves along a direction largely inclined with respect to the normal direction N of the organic EL substrate 92.

At this time, when the thickness of the deposition mask 20 is large, most of the diagonally moving deposition material 98 may reach the wall surface 36 of the second recess 35 and deposit thereon, before it reaches the organic EL substrate 92 through the through hole 25. Thus, in order to improve the utilization efficiency of the deposition material 98, it may be preferable that the thickness t of the deposition mask 20 is reduced so that heights of the wall surface 36 of the second recess 35 and the wall surface 31 of the first recess 30 are reduced. Namely, it may be preferable to use, as the metal plate 21 for constituting the deposition mask 20, the metal plate 21 having the thickness t as small as possible, within a range where the strength of the deposition mask 20 can be ensured. This allows the height of the wall surface of the through hole 25 to be reduced, resulting in lowering of the ratio of the deposition material 98 which deposits on the wall surface of the through hole 25. Thus, the thickness of the deposition material 98 depositing on the organic EL substrate 92 can be made uniform. Namely, such a deposition mask 20 used for forming pixels of an organic EL display device can improve dimensional accuracy and positional accuracy of the pixels, thus improving luminance efficiency of the organic EL display device.

In this embodiment, a lower limit of the range of the thickness t of the deposition mask 20 may be, for example, 5 μm or more, 8 μm or more, 10 μm or more, 12 μm or more, 13 μm or more, or 15 μm or more. This can ensure the strength of the deposition mask 20, and can suppress damage and/or deformation of the deposition mask 20. An upper limit of the range of the thickness t of the deposition mask 20 may be, for example, 20 μm or less, 25 μm or less, 35 μm or less, 40 μm or less, 50 μm or less, or 100 μm or less. This can lower the ratio of the deposition material 98 which deposits on the wall surface of the through hole 25, as described above. The range of the thickness t of the deposition mask 20 may be determined based on a combination of any one of the plurality of lower limit candidate values described above and any one of the plurality of upper limit candidate values described above. For example, the thickness t of the deposition mask 20 may be between 5 μm or more and 100 μm or less, between 8 μm or more and 50 μm or less, between 10 μm or more and 40 μm or less, between 12 μm or more and 35 μm or less, between 13 μm or more and 30 μm or less, or between 15 μm or more and 20 μm or less. In addition, the range of the thickness t of the deposition mask 20 may be determined based on a combination of any two of the plurality of lower limit candidate values described above. For example, the thickness t of the deposition mask 20 may be between 5 μm or more and 15 μm or less, between 5 μm or more and 13 μm or less, between 8 μm or more and 15 μm or less, or between 8 μm or more and 13

μm or less. In addition, the range of the thickness t of the deposition mask 20 may be determined based on a combination of any two of the plurality of upper limit candidate values described above. For example, the thickness t of the deposition mask 20 may be between 20 μm or more and 100 μm or less, between 20 μm or more and 50 μm or less, between 25 μm or more and 100 μm or less, or between 25 μm or more and 50 μm or less. The thickness t is a thickness of the peripheral zone 23, i.e., a thickness of a portion of the deposition mask 20, in which neither the first recess 30 nor the second recess 35 is formed. Thus, the thickness t can be said as a thickness of the metal plate 21.

In FIG. 5, a minimum angle defined by a straight line L1 with respect to the normal direction N of the deposition mask 20 is indicated by a symbol θ1. The straight line L1 passes the connection portion 41 at which the through hole 25 has the minimum opening area, and another given position of the wall surface 36 of the second recess 35. In order that the diagonally moving deposition material 98 is allowed to reach the substrate 92 much without reaching the wall surface 36, it is advantageous to increase the angle θ1. In order to increase the angle θ1, it is effective to reduce the width β of the aforementioned top portion 43, as well as to reduce the thickness t of the deposition mask 20.

In FIG. 7, a symbol α indicates a width of a portion (hereinafter also referred to as rib portion) of the effective zone 22 of the first surface 21a of the metal plate 21, which is not etched and thus remains. The width α of the rib portion and a dimension $r_2$ of the through portion 42 are suitably determined depending on a dimension of an organic EL display device and the number of display pixels. Table 1 shows the numbers of display pixels and value examples of the width α of the rib portion and the dimension $r_2$ of the through portion 42 which are required in accordance with the numbers of display pixels in a 5-inch organic EL display device.

TABLE 1

| Number of Display Pixels | Width of Rib Portion | Dimension of Through Portion |
| --- | --- | --- |
| FHD (Full High Definition) | 20 μm | 40 μm |
| WQHD (Wide Quad High Definition) | 15 μm | 30 μm |
| UHD (Ultra High Definition) | 10 μm | 20 μm |

Figure 8:
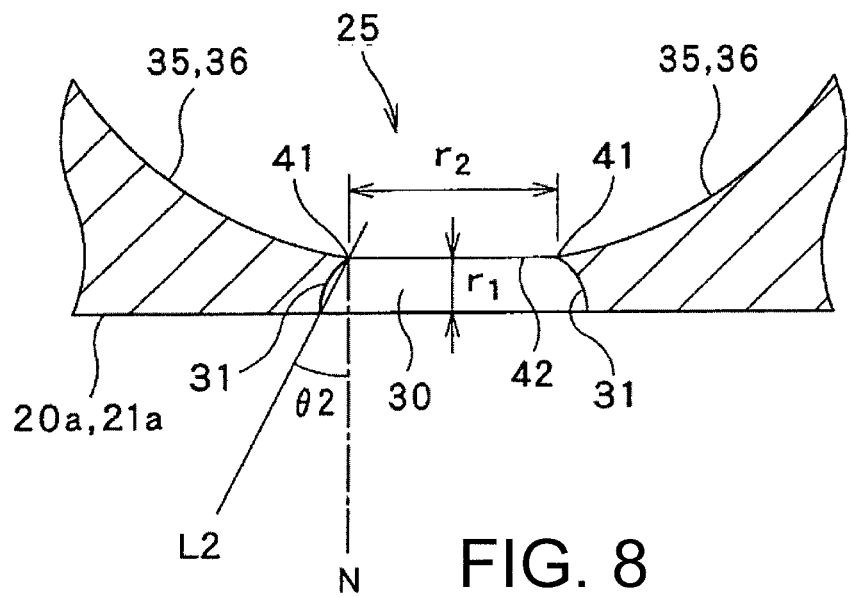
FIG. 8 is an enlarged sectional view showing a though hole shown in FIG. 5 and a zone in the vicinity thereof.

The deposition mask 20 according to this embodiment is considered to be particularly effective in producing an organic display device having a pixel density of 450 ppi or more, although it is not limited thereto. Herebelow, an example of a dimension of the deposition mask 20 required for producing an organic EL display device having such a high pixel density is described with reference to FIG. 8. FIG. 8 is an enlarged sectional view showing the though hole 25 of the deposition mask 20 shown in FIG. 5 and a zone in the vicinity thereof.

FIG. 8 shows parameters $r_1$ and $r_2$ as parameters of the shape of the through hole 25. The symbol $r_1$ represents a distance from the first surface 20a of the deposition mask 20 to the connection portion 41 along the normal direction N of the deposition mask 20, i.e., a height of the wall surface 31 of the first recess 30. The symbol $r_2$ represents a dimension of the first recess 30 where the first recess 30 is connected to the second recess 35, i.e., a dimension of the through portion 42. In addition, in FIG. 8, a symbol θ2 represents an angle defined by a straight line L2 with respect to the normal line N of the metal plate 21. The straight line L2 connects the connection portion 41 and a distal end edge of the first recess 30 on the first surface 21a of the metal plate 21.

When an organic EL display device having a pixel density of 450 ppi or more is produced, the dimension $r_2$ of the through portion 42 is preferably set to be between 10 μm or more and 60 μm or less. Thus, the deposition mask 20 capable of producing an organic EL display device having a high pixel density can be provided. The height $r_1$ of the wall surface 31 of the first recess 30 is preferably set to be 6 μm or less.

Next, the aforementioned angle θ2 shown in FIG. 8 is described. The angle θ2 corresponds to a maximum value of an inclined angle of the deposition material 98 which can reach the organic EL substrate 92, among the deposition material 98 which comes in an inclined manner with respect to the normal direction N of the metal plate 21 and passes through the through portion 42 near the connection portion 41. This is because the deposition material 98 coming at an inclined angle greater than the angle θ2 to pass through the connection portion 41 is considered to deposit on the wall surface 31 of the first recess 30, before the deposition material 98 reaches the organic EL substrate 92. Thus, by decreasing the angle θ2, the deposition material 98 coming at a large inclined angle and passing through the through portion 42 can be suppressed from depositing on the organic EL substrate 92. Therefore, it is less likely to occur that the deposition material 98 deposits on a portion of the organic EL substrate 92, which is outside a portion overlapping with the through portion 42. Namely, to decrease the angle θ2 is considered to reduce variation in planar dimension and thickness of the deposition material 98 depositing on the organic EL substrate 92. From this point of view, for example, the through hole 25 may be formed such that the angle θ2 is 45 degrees or less. FIG. 8 shows the example in which the dimension of the first recess 30 in the first surface 21a, i.e., the opening dimension of the through hole 25 in the first surface 21a is larger than the dimension $r_2$ of the first recess 30 in the connection portion 41. Namely, the value of the angle θ2 is a positive value. However, although not shown, the dimension $r_2$ of the first recess 30 in the connection portion 41 may be larger than the dimension of the first recess 30 in the first surface 21a. Namely, the value of the angle θ2 may be a negative value.

As shown in FIG. 3, the deposition mask 20 may be formed to extend from the first tip portion 17a constituting the first end portion 26a to the second tip portion 17b constituting the second end portion 26b, in the longitudinal direction D1 (first direction), as described above. The longitudinal direction D1 may be a direction parallel to a transfer direction when a base metal 55 (see FIG. 10) is rolled, and may be a longitudinal direction of the deposition mask 20 in which a plurality of the effective zones 22 are arranged. The term "transfer" is used to mean transfer of the base metal 55 in a roll-to-roll fashion as described below. A below-described width direction D2 (second direction) may be a direction orthogonal to the longitudinal direction D1 in a plane direction of the metal plate 21 and the elongated metal plate 64. The deposition mask 20 may have a first center axis line AL1 that extends in the longitudinal direction D1 and is arranged at a center position of the width direction D2, and a second center axis line AL2 that extends in the width direction D2 and is arranged at a center position of the longitudinal direction D1. When the number of through holes 25 in the width direction D2 is an odd number, the first center axis line AL1 passes a center point of the center through hole 25 in the width direction D2. On the other hand, when the number of the through holes 25 in the width direction D2 is an even number, the first center axis line AL1 passes an intermediate point between two through holes 25 adjacent to each other near the center of the width direction D2.

As shown in FIG. 9A, when a dimension from a below-described P1 point to a Q1 point is represented as X1, and a dimension from a P2 point to a Q2 point is represented as X2, the deposition mask according to this embodiment may satisfy the following Equation (1):

$$\left|\alpha_X - \frac{X1+X2}{2}\right| \le \frac{\alpha_X}{15} \times 10^{-3}$$

in which $\alpha_X$ represents a design value of the dimension X1 and the dimension X2. The left-hand member of the Equation (1) means an absolute value of an average value of a difference between the design value and the dimension X1, and a difference between the design value and the dimension X2.

In addition, the deposition mask according to this embodiment may satisfy the following Equation (2):

$$|X1 - X2| \le \frac{\alpha_X}{10} \times \frac{\alpha_Y}{W_Y} \times 10^{-3}$$

in which $\alpha_Y$ represents a design value of a dimension from the P1 point to the P2 point, which is a design value of a dimension from the Q1 to the Q2 point, and $W_Y$ represents a maximum value of a distance between center points of the two through holes 25 in the width direction D2. The left-hand member of the Equation (2) means an absolute value of a difference between the dimension X1 and the dimension X2. $W_Y$ means a distance (design value) between a center point of the through hole 25 arranged closest to a first side edge 27a and a center point of the through hole 25 arranged closest to a second side edge 27b. By using $W_Y$ as in the Equation (2), dependence of the quality determination of the deposition mask 20 using the Equation (2) on the width dimension of the deposition mask 20 (or effective zone 22) can be avoided.

The P1 point and the Q1 point may be provided on one side (left side in FIG. 9A) of the first center axis line AL1 of the deposition mask 20, and may be spaced apart from each other along the longitudinal direction D1. The P2 point and the Q2 point may be provided on the other side (right side in FIG. 9A) of the first center axis line AL1 of the deposition mask 20, and may be spaced apart from each other along the longitudinal direction D1. The P1 point and the P2 point may be arranged symmetrically with respect to the first center axis line AL1 during deposition. For example, the P1 point and the P2 point may be points that are intended to be arranged symmetrically with respect to the first center axis line AL1 during deposition, and may be points which are arranged symmetrically with respect to the first center axis line AL1 when designed. Similarly, the Q1 point and the Q2 point may be arranged symmetrically with respect to the first axis line AL1 during deposition.

The P1 point and the Q1 point may be set to be two points such that the dimension X1 from the P1 point to the Q1 point has the design value $\alpha_X$ when designed (or stretched, deposited). Namely, the P1 point and the Q1 point may be set at given two points which are spaced at a distance equal to the desired design value $\alpha_X$ when designed. As shown in FIG. 9A, the P1 point and Q1 point may be respectively positioned at center points of the two through holes 25 which are provided between the first tip portion 17a and the second tip portion 17b, and are spaced at a distance equal to the desired design value $\alpha_X$ when designed. When the deposition mask 20 on which the P1 point and the Q1 point are set in this manner is placed on a below-described stage 81 or the like to stand still, a linear distance between the P1 point and the Q1 point may be the dimension X1.

The P2 point and the Q2 point may be set to be two points such that the dimension X2 from the P2 point to the Q2 point has the design value $\alpha_X$ when designed. Namely, similarly to the P1 point and the Q1 point, the P2 point and the Q2 point may be set at given two points which are spaced at a distance equal to the desired design value $\alpha_X$ when designed. When the deposition mask 20 on which the P2 point and the Q2 point are set in this manner is placed on the below-described stage 81 or the like to stand still, a linear distance between the P2 point and the Q2 point may be the dimension X2.

The deposition mask 20 placed on the stage 81 or the like to stand still may be curved in a C-shape as described below (see FIG. 24). However, the dimension X1 and the dimension X2 may be linear distances measured in the deposition mask 20 placed on the stage 81 and curved in a C-shape.

The P1 point and the P2 point may be arranged on one side (i.e., first tip portion 17a side) with respect to the second center axis line AL2 of the deposition mask 20. In addition, the Q1 point and the Q2 point may be arranged on the other side (i.e., second tip portion 17b side) with respect to the second center axis line AL2. However, not being limited thereto, the P1 point and the P2 point, and the Q1 point and the Q2 point may be positioned on the same side with respect to the second center axis line AL2. Alternatively, the P1 point and the P2 point may be positioned on the second center axis line AL2, or the Q1 point and the Q2 point may be positioned on the second center axis line AL2.

In addition, the P1 point and the P2 point may be set to be two points such that a dimension from the P1 point to the P2 point has the design value $\alpha_Y$ when designed (or stretched, deposited). Namely, the P1 point and the P2 point may be set at given two points which are spaced at a distance equal to the desired design value $\alpha_Y$ when designed. As shown in FIG. 9A, the P1 point and the P2 point may be respectively positioned at center points of the two through holes 25 which are spaced at a distance equal to the desired design value $\alpha_Y$ when designed.

The Q1 point and the Q2 point may be set to be two points such that a dimension from the Q1 point to the Q2 point has the design value $\alpha_Y$ when designed. Namely, the Q1 point and the Q2 point may be set at given two points which are spaced at a distance equal to the desired design value ay when designed. As shown in FIG. 9A, the Q1 point and the Q2 point may be respectively positioned at the center points of two through holes 25 which are spaced at a distance equal to the desired design value $\alpha_Y$ when designed.

Although FIG. 9A shows the example in which each of the P1 point and the P2 point is set in the through hole 25 of the plurality of through holes 25 in the effective zone 22, which is positioned closer to the second tip portion 17b (lower side in FIG. 9A) by one than the through hole 25 which is closest to the first tip portion 17a (upper side in FIG. 9A), the present invention is not limited thereto. Similarly, although FIG. 9A shows the example in which each of the Q1 point and the Q2 point is set in the through hole 25 of the plurality of through holes 25 in the effective zone 22, which is positioned closer to the first tip portion 17a (lower side in FIG. 9A) by one than the through hole 25 which is closest to the second tip portion 17b (lower side in FIG. 9A), the present invention is not limited thereto. In addition, although FIG. 9A shows the example in which each of the P1 point and the Q1 point is set in the through hole 25 of the plurality of through holes 25 in the effective zone 22, which is positioned closer to the second side edge 27b (right side in FIG. 9A) by one than the through hole 25 which is closest to the first side edge 27a (left side in FIG. 9A), the present invention is not limited thereto. Similarly, although FIG. 9A shows the example in which each of the P2 point and the Q2 point is set in the through hole 25 of the plurality of through holes 25 in the effective zone 22, which is positioned closer to the first side edge 27a (left side in FIG. 9A) by one than the through hole 25 which is closest to the second side edge 27b (right side in FIG. 9A), the present invention is not limited thereto. Namely, the P1 point, the Q1 point, the P2 point and the Q2 point may be set at the center points of any through holes 25, as long as they are four points which have the design values $\alpha_X$ and $\alpha_Y$ when designed, as described above.

The P1 point and the P2 point may be set in the through holes 25 other than the through holes 25 which are positioned closest to the first tip portion 17a. The through holes 25 closest to the first tip portion 17a are positioned outermost (closest to the first tip portion 17a) in the effective zone 22 which is positioned closest to the first tip portion 17a, and are adjacent to the peripheral zone 23. Thus, the positional accuracy of the through holes 25 other than the outermost through holes 25 in this effective zone 22 may be higher than that of the outermost through holes 25. For this reason, the through holes 25 which are positioned closer to the second tip portion 17b than the through holes 25 closest to the first tip portion 17a (for example, the through holes 25 in which the P1 point and the P2 point are set in FIG. 9A or the through holes 25 below these through holes 25) may be set as the P1 point and the P2 point.

In addition, the Q1 point and the Q2 point may be set in the though holes 25 other than the through holes 25 positioned closest to the second tip portion 17b. The through holes 25 closest to the second tip portion 17b are positioned outermost (closest to the second tip portion 17b) in the effective region 22 which is positioned closest to the first tip portion 17a, and are adjacent to the peripheral zone 23. Thus, the positional accuracy of the through holes 25 other than the outermost through holes 25 in this effective zone 22 may be higher than that of the outermost through holes 25. For this reason, the through holes 25 which are positioned closer to the first tip portion 17a than the through holes 25 closest to the second tip portion 17b (for example, the through holes 25 in which the Q1 point and the Q2 point are set in FIG. 9A or the through holes 25 above these through holes 25) may be set as the Q1 point and the Q2 point.

In addition, the P1 point and the Q1 point may be set in the through holes 25 other than the though holes 25 positioned closest to the first side edge 27a. The through holes 25 closest the first side edge 27a are positioned outermost (closest to the first side edge 27a) in the effective region 22, and are adjacent to the peripheral zone 23. Thus, the positional accuracy of the through holes 25 other than the outermost through holes 25 in this effective zone 22 may be higher than that of the outermost through holes 25. From this reason, the through holes 25 which are positioned closer to the second side edge 27b than the through holes 25 closest to the first side edge 27a (for example, the through holes 25 in which the P1 point and the Q1 point are set in FIG. 9A or the through holes 25 on the right side of these through holes 25) may be set as the P1 point and the Q1 point.

In addition, the P2 point and the Q2 point may be set in the through holes 25 other than the though holes 25 positioned closest to the second side edge 27b. The through hole 25 closest the second side edge 27b are positioned outermost (closest to the second side edge 27b) in the effective regions 22, and are adjacent to the peripheral zone 23. Thus, the positional accuracy of the through holes 25 other than the outermost through holes 25 in this effective zone 22 may be higher than that of the outermost through holes 25. From this reason, the through holes 25 which are positioned closer to the first side edge 27a than the through holes 25 closest to the second side edge 27b (for example, the through holes 25 in which the P2 point and the Q2 point are set in FIG. 9A or through holes 25 on the left side of these through holes 25) may be set as the P2 point and the Q2 point.

The design value $\alpha_X$ shown in the Equations (1) and (2) may be either the design value of the dimension X1 or the design value of the dimension X2. This is because, since the P1 point and the Q1 point, and the P2 point and the Q2 point are arranged symmetrically with respect to the first center axis line AL1 of the deposition mask 20 when designed, the dimension X1 and the dimension X2 may be equal to each other. In addition, the design value $\alpha_Y$ shown in the Equation (2) may be either the design value of the dimension from the P1 point to the P2 point, or the design value of the dimension from the Q1 point to the Q2 point. This is because, since the P1 point and the Q1 point are arranged along the longitudinal direction D1 and the P2 point and the Q2 point are arranged along the longitudinal direction D1, the design value of the dimension from the P1 point to the P2 point and the design value of the dimension from the Q1 point to the Q2 point may be equal to each other. Herein, the design value may be a numerical value which is set with the intention that the through holes 25 are located at desired positions (deposition target positions) when the deposition mask 20 is stretched on the frame 15, and may correspond to a numerical value when the deposition mask 20 is stretched.

In this embodiment, a lower limit range of the design value $\alpha_X$ may be, for example, 200 mm or more, 300 mm or more, or 400 mm or more. An upper limit of the range of the design value $\alpha_X$ may be, for example, 600 mm or less, 800 mm or less, or 900 mm or less. The range of the design value $\alpha_X$ may be determined based on a combination of any one of the plurality of lower limit candidate values described above and any one of the plurality of upper limit candidate values described above. For example, the range of the design value $\alpha_X$ may be between 200 mm or more and 900 mm or less, between 300 mm or more and 800 mm or less, or between 400 mm or more and 600 mm or less. In addition, the range of the design value $\alpha_X$ may be determined based on a combination of any two of the plurality of lower limit candidate values described above. For example, the range of the design value $\alpha_X$ may be between 200 mm or more and 400 mm or less, between 200 mm or more and 300 mm or less, or between 300 mm or more and 400 mm or less. In addition, the range of the design value ax may be determined based on a combination of any two of the plurality of upper limit candidate values described above. For example, the design value $\alpha_X$ may be between 600 mm or more and 900 mm or less, between 600 mm or more and 800 mm or less, or between 800 mm or more and 900 mm or less.

In this embodiment, the design value $\alpha_Y$ may be between 21.7 mm or more and 65.0 mm or less, between 21.7 mm or more and 43.3 mm or less, or between 43.3 mm or more and 65.0 mm or less.

In this embodiment, when the design value $\alpha_X$ is 200 mm and the design value $\alpha_Y$ is 65.0 mm, the dimension X1 may be between 169.0 mm or more and 232.0 mm or less. When the design value $\alpha_X$ is 200 mm and the design value $\alpha_Y$ is 43.3 mm, the dimension X1 may be between 172.8 mm or more and 225.8 mm or less. When the design value $\alpha_X$ is 200 mm and the design value $\alpha_Y$ is 21.7 mm, the dimension X1 may be between 176.0 mm or more and 221.2 mm or less.

In this embodiment, when the design value $\alpha_X$ is 300 mm and the design value $\alpha_Y$ is 65.0 mm, the dimension X1 may be between 253.3 mm or more and 348.2 mm or less. When the design value $\alpha_X$ is 300 mm and the design value $\alpha_Y$ is 43.3 mm, the dimension X1 may be between 258.7 mm or more and 339.3 mm or less. When the design value $\alpha_X$ is 300 mm and the design value $\alpha_Y$ is 21.7 mm, the dimension X1 may be between 263.9 mm or more and 331.7 mm or less.

In this embodiment, when the design value $\alpha_X$ is 400 mm and the design value $\alpha_Y$ is 65.0 mm, the dimension X1 may be between 338.3 mm or more and 464.2 mm or less. When the design value $\alpha_X$ is 400 mm and the design value $\alpha_Y$ is 43.3 mm, the dimension X1 may be between 344.8 mm or more and 451.9 mm or less. When the design value $\alpha_X$ is 400 mm and the design value $\alpha_Y$ is 21.7 mm, the dimension X1 may be between 351.7 mm or more and 442.3 mm or less.

In this embodiment, when the design value $\alpha_X$ is 600 mm and the design value $\alpha_Y$ is 65.0 mm, the dimension X1 may be between 507.4 mm or more and 696.3 mm or less. When the design value $\alpha_X$ is 600 mm and the design value $\alpha_Y$ is 43.3 mm, the dimension X1 may be between 517.5 mm or more and 678.1 mm or less. When the design value $\alpha_X$ is 600 mm and the design value $\alpha_Y$ is 21.7 mm, the dimension X1 may be between 527.7 mm or more and 663.4 mm or less.

In this embodiment, when the design value $\alpha_X$ is 800 mm and the design value $\alpha_Y$ is 65.0 mm, the dimension X1 may be between 676.2 mm or more and 927.8 mm or less. When the design value $\alpha_X$ is 800 mm and the design value $\alpha_Y$ is 43.3 mm, the dimension X1 may be between 689.9 mm or more and 904.2 mm or less. When the design value $\alpha_X$ is 800 mm and the design value $\alpha_Y$ is 21.7 mm, the dimension X1 may be between 703.5 mm or more and 884.8 mm or less.

In this embodiment, when the design value $\alpha_X$ is 900 mm and the design value $\alpha_Y$ is 65.0 mm, the dimension X1 may be between 761.9 mm or more and 1044.9 mm or less. When the design value $\alpha_X$ is 900 mm and the design value $\alpha_Y$ is 43.3 mm, the dimension X1 may be between 776.8 mm or more and 1017.3 mm or less. When the design value $\alpha_X$ is 900 mm and the design value $\alpha_Y$ is 21.7 mm, the dimension X1 may be between 791.8 mm or more and 995.6 mm or less.

In this embodiment, when the design value $\alpha_X$ is 200 mm and the design value $\alpha_Y$ is 65.0 mm, the dimension X2 may be between 176.5 mm or more and 217.3 mm or less. When the design value $\alpha_X$ is 200 mm and the design value $\alpha_Y$ is 43.3 mm, the dimension X1 may be between 179.9 mm or more and 216.7 mm or less. When the design value $\alpha_X$ is 200 mm and the design value $\alpha_Y$ is 21.7 mm, the dimension X1 may be between 182.7 mm or more and 216.4 mm or less.

In this embodiment, when the design value $\alpha_X$ is 300 mm and the design value $\alpha_Y$ is 65.0 mm, the dimension X2 may be between 265.0 mm or more and 326.2 mm or less. When the design value $\alpha_X$ is 300 mm and the design value $\alpha_Y$ is 43.3 mm, the dimension X2 may be between 269.9 mm or more and 325.0 mm or less. When the design value $\alpha_X$ is 300 mm and the design value $\alpha_Y$ is 21.7 mm, the dimension X2 may be between 274.2 mm or more and 324.5 mm or less.

In this embodiment, when the design value $\alpha_X$ is 400 mm and the design value $\alpha_Y$ is 65.0 mm, the dimension X2 may be between 352.9 mm or more and 435.0 mm or less. When the design value $\alpha_X$ is 400 mm and the design value $\alpha_Y$ is 43.3 mm, the dimension X2 may be between 359.8 mm or more and 434.0 mm or less. When the design value $\alpha_X$ is 400 mm and the design value $\alpha_Y$ is 21.7 mm, the dimension X2 may be between 365.5 mm or more and 432.8 mm or less.

In this embodiment, when the design value $\alpha_X$ is 600 mm and the design value $\alpha_Y$ is 65.0 mm, the dimension X2 may be between 529.8 mm or more and 652.3 mm or less. When the design value $\alpha_X$ is 600 mm and the design value $\alpha_Y$ is 43.3 mm, the dimension X2 may be between 539.8 mm or more and 650.4 mm or less. When the design value $\alpha_X$ is 600 mm and the design value $\alpha_Y$ is 21.7 mm, the dimension X2 may be between 548.1 mm or more and 648.9 mm or less.

In this embodiment, when the design value $\alpha_X$ is 800 mm and the design value $\alpha_Y$ is 65.0 mm, the dimension X2 may be between 706.8 mm or more and 869.8 mm or less. When the design value $\alpha_X$ is 800 mm and the design value $\alpha_Y$ is 43.3 mm, the dimension X2 may be between 720.0 mm or more and 867.7 mm or less. When the design value $\alpha_X$ is 800 mm and the design value $\alpha_Y$ is 21.7 mm, the dimension X2 may be between 730.8 mm or more and 865.2 mm or less.

In this embodiment, when the design value $\alpha_X$ is 900 mm and the design value $\alpha_Y$ is 65.0 mm, the dimension X2 may be between 794.8 mm or more and 977.9 mm or less. When the design value $\alpha_X$ is 900 mm and the design value $\alpha_Y$ is 43.3 mm, the dimension X2 may be between 809.4 mm or more and 975.8 mm or less. When the design value $\alpha_X$ is 900 mm and the design value $\alpha_Y$ is 21.7 mm, the dimension X2 may be between 822.3 mm or more and 973.9 mm or less.

In this embodiment, the distance $W_Y$ which is a distance (design value) between the center point of the through hole 25 arranged closest to the first side edge 27a and the center point of the through hole 25 arranged closest to the second side edge 27b may be between 20 mm or more and 350 mm or less, between 20 mm or more and 65.0 mm or less, or between 65.0 mm or more and 350 mm or less. The $W_Y$ may be 65.0 mm.

The through holes 25 are arranged in a grid pattern as shown in FIG. 9A, but the present invention is not limited thereto. For example, as shown in FIG. 9B, the through holes 25 may be arranged in a staggered pattern. In this case, the P1 point, the P2 point, the Q1 point and the Q2 point may be set as shown in FIG. 9B.

The P1 point and the Q1 point may not be positioned at the center points of the through holes 25 through which the deposition material 98 passes during deposition, as long as they are any two points arranged along the longitudinal direction D1 of the deposition mask 20. For example, the P1 point and the Q1 point may be given recesses formed in the first surface 20a or the second surface 20b of the deposition mask 20, or other through holes (dummy holes) which are not intended to allow passage of the deposition material 98, or further a profile dimension of the deposition mask 20. A dummy hole may be arranged outside each effective area 22 (the first tip portion 17a side, the second it portion 17b side, the first side edge 27a side or the second side edge 27b side. For example, not only the through holes 25 arranged outermost in the effective zone 22, but also the through holes 25 which are inward of these outermost through holes 25 by one or more may be formed as dummy holes. Such through holes 25 serving as dummy holes allow passage of the deposition material 98 during deposition, but the deposition material 98 having passed therethrough and deposited on the organic EL substrate 92 is not used as a pixel.

Figure 9C:
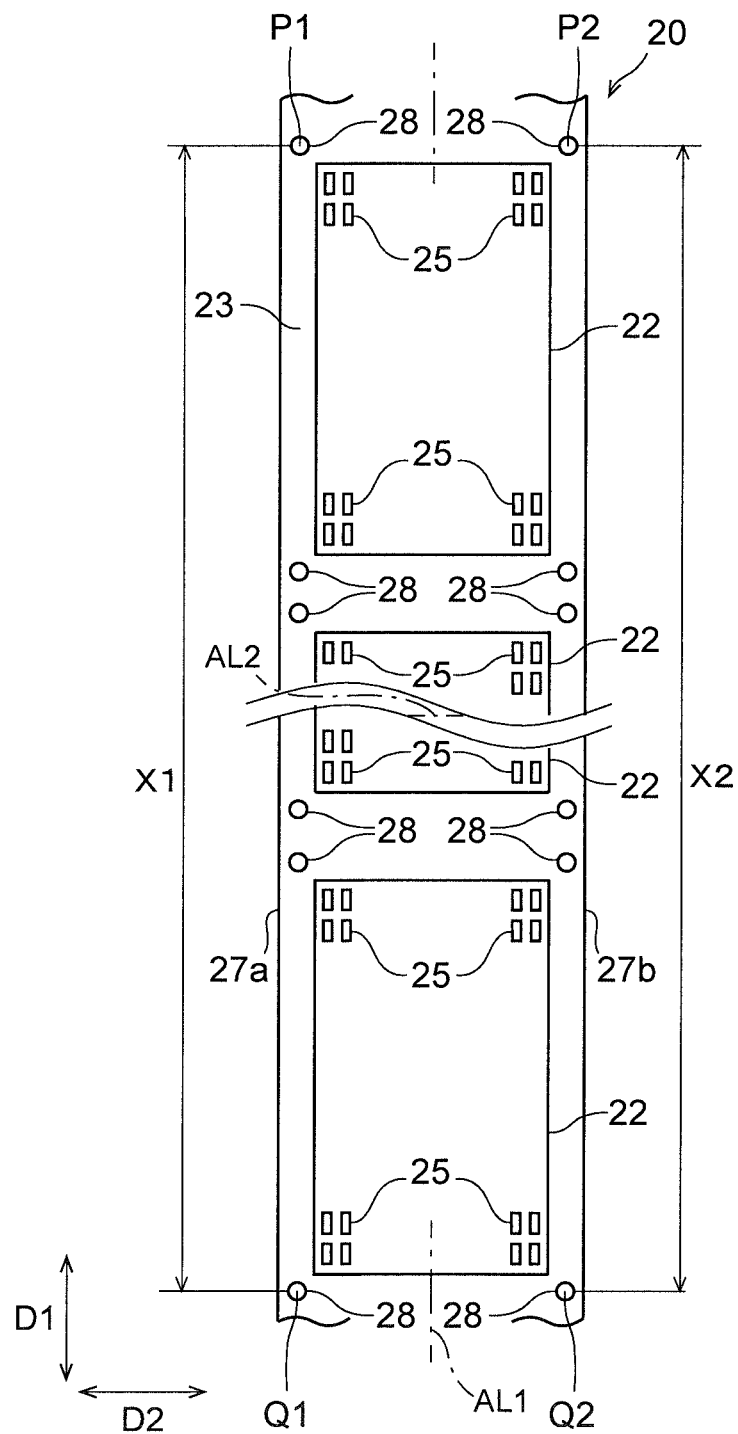
FIG. 9C is a schematic view for describing a dimension X1 and a dimension X2 in the deposition mask of FIG. 3 as another modification example of FIG. 9A.

For example, as shown in FIG. 9C, the P1 point, the Q1 point, the P2 point and the Q2 point may be positioned at center points of total pitch marks 28. The total pitch marks 28 are marks arranged outside each effective zone 22 (i.e., in the peripheral zone 23) near the corners of the effective zone 22. The total pitch marks 28 may be concavely formed by half-etching at desired positions in the first surface 20a or the second surface 20b, in a first-surface etching step or a second-surface etching step described below. Alternatively, the total pitch marks 28 may be formed by through holes extending from the first surface 20a to the second surface 20b. FIG. 9C shows the example in which the total pitch mark 28 has a circular shape in a plan view. However, not being limited thereto, the total pitch mark 28 may have any shape such as a rectangular shape.

Next, a method of manufacturing the deposition mask 20 is described.

An example of a method of manufacturing a metal plate used for manufacturing a deposition mask is described first.

Figure 10:
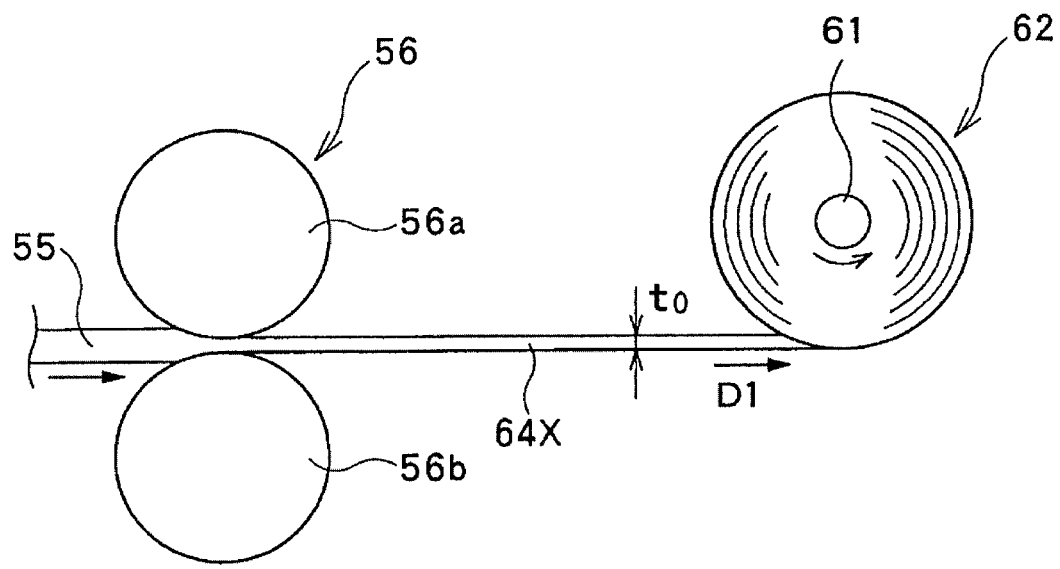
FIG. 10 is a view showing a step of rolling a base metal and obtaining a metal plate having a desired thickness.

First, as shown in FIG. 10, a rolling step may be performed. In the rolling step, a base metal 55 made of an iron alloy containing nickel is prepared. The base metal 55 is then transferred to a rolling device 56 including a pair of rolls 56a and 56b, along a direction shown by an arrow D1. The base metal 55 having reached between the pair of rolls 56a and 56b is rolled by the pair of rolls 56a and 56b, so that the base metal 55 is reduced in thickness and is extended along the transfer direction. Thus, a plate member 64X having a thickness $t_0$ can be obtained. As shown in FIG. 10, the plate member 64X may be wound around a core 61 to form a wound body 62. A specific value of the thickness $t_0$ is preferably between 5 µm or more and 85 µm or less, as described above.

FIG. 10 merely shows the rolling step schematically, and a specific structure and a procedure for performing the rolling step are not particularly limited. For example, the rolling step may include a hot rolling step and/or a cold rolling step. In the hot rolling step, the base metal is processed at a temperature equal to or higher than the temperature at which a crystalline orientation of the invar material constituting the base metal 55 is changed. In the cold rolling step, the base metal is processed at a temperature equal to or lower than the temperature at which a crystalline orientation of the invar material is changed. In addition, a direction along which the base metal 55 and the plate member 64X are passed through between the pair of rolls 56a and 56b is not limited to one. For example, the base metal 55 and the plate member 64X may be gradually rolled by repeatedly passing the base metal 55 and the plate member 64X through between the pair of rolls 56a and 56b in the direction from the left side to the right side in the sheet planes of FIGS. 10 and 11 and in the direction from the right side to the left side therein.

Thereafter, a slitting step may be performed. In the slitting step, both ends of the plate member 64X obtained by the rolling step are cut in the width direction over a predetermined range, respectively, such that the plate member 64X has a width within a predetermined range. The slitting step is performed to remove a crack which may be generated on both ends of the plate member 64X because of the rolling step. The slitting step can suppress a breakage phenomenon of the plate member 64X, which is so-called plate incision, from occurring from the crack as a starting point.

Figure 11:
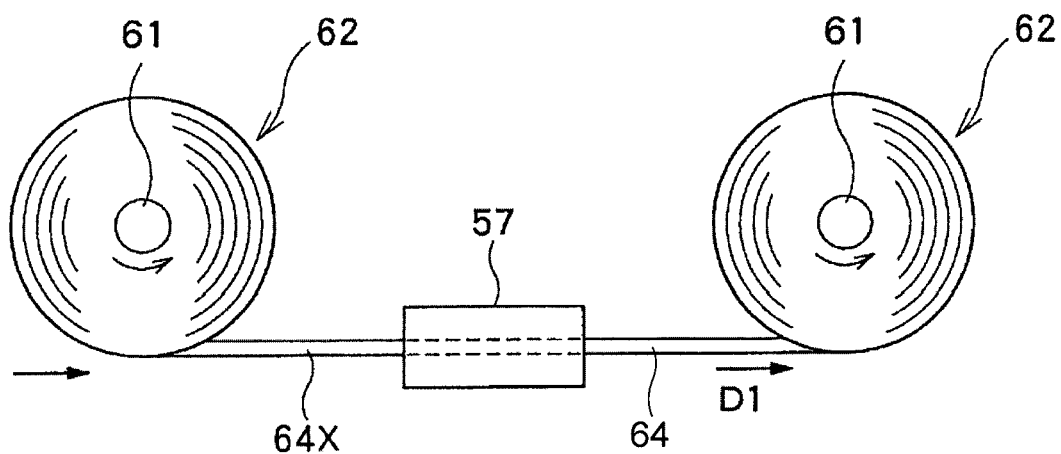
FIG. 11 is a view showing a step of annealing the metal plate obtained by rolling.

Thereafter, an annealing step may be performed. As shown in FIG. 11, in the annealing step, the plate member 64X is annealed by an annealing device 57, in order to remove residual stress (internal stress) accumulated in the plate member 64X by the rolling step. Thus, an elongated metal plate 64 is obtained. As shown in FIG. 11, the annealing step may be performed while the plate member 64X and the elongated metal plate 64 are being pulled in the transfer direction (longitudinal direction). Namely, the annealing step may be a continuous annealing step in which the plate member 64X and the elongated metal plate 64 are annealed while they are transferred, instead of a batch-type annealing step.

The aforementioned annealing step is preferably performed in an irreducible atmosphere or an inert gas atmosphere. The irreducible atmosphere herein means an atmosphere free of a reducing gas, such as hydrogen. The expression "free of a reducing gas" means that a concentration of the reducing gas such as hydrogen is 4% or less. In addition, the inert gas atmosphere means an atmosphere where an inert gas, such as an argon gas, a helium gas, or a nitrogen gas, exists 90% or more. By performing the annealing step in the irreducible atmosphere or the inert gas atmosphere, the aforementioned nickel hydroxide can be suppressed from generating in the first surface 64a and the second surface 64b of the elongated metal plate 64.

The annealing step makes it possible to obtain the elongated metal plate 64 of a thickness $t_0$, from which the residual strain is removed to a certain extent. The thickness $t_0$ may equal to a thickness t of the deposition mask 20.

The elongated metal plate 64 having the thickness $t_0$ may be produced by repeating the above rolling step, the slitting step and the annealing step a plurality of times. FIG. 11 shows the example in which the elongated metal plate 64 is annealed while it is being pulled in the longitudinal direction. However, not being limited thereto, the elongated metal plate 64 may be annealed in the state that it is wound around the core 61. Namely, the batch-type annealing may be performed. However, when the elongated metal plate 64 is annealed in the state that it is wound around the core 61, the elongated metal plate 64 may have a warping tendency corresponding to a winding diameter of the wound body 62. Thus, depending on a diameter of the wound body 62 and/or a material constituting the base metal 55, it is advantageous to perform the annealing step while the elongated metal plate 64 is being pulled in the longitudinal direction.

Thereafter, a cutting step may be performed. In the cutting step, both ends of the elongated metal plate 64 in the width direction thereof are cut over a predetermined range, respectively, such that the elongated metal plate 64 is adjusted to have a desired width. In this manner, the elongated metal plate 64 having a desired thickness and a desired width can be obtained.

Next, an example of a method of manufacturing the deposition mask 20 by using the elongated metal plate 64 is described with reference mainly to FIGS. 12 to 20. In the method of manufacturing the deposition mask 20 described hereinbelow, as shown in FIG. 12, the elongated metal 64 is supplied, the through holes 25 are formed in the elongated metal plate 64, and then the elongated metal plate 64 are severed to obtain the sheet-like deposition masks 20 made of the metal plate 21.

To be more specific, the method of manufacturing the deposition mask 20 may include a step of supplying the elongated metal plate 64 extending in a strip shape, a step of etching the elongated metal plate 64 by a photolithographic technique to form the first recesses 30 in the elongated metal plate 64 from a first surface 64a side, and a step of etching the elongated metal plate 64 by the photolithographic technique to form the second recesses 35 in the elongated metal plate 64 from a second surface 64b side. The through holes 25 may be formed in the elongated metal plate 64 by communicating the first recesses 30 and the second recesses 35 formed in the elongated metal plate 64 with each other. In the example shown in FIGS. 13 to 20, the step of forming the first recesses 30 is performed before the step of forming the second recesses 35. Further, a step of sealing the produced recesses 30 is further provided between the step of forming the first recesses 30 and the step of forming the second recesses 35. Details of the respective steps are described below.

Figure 12:
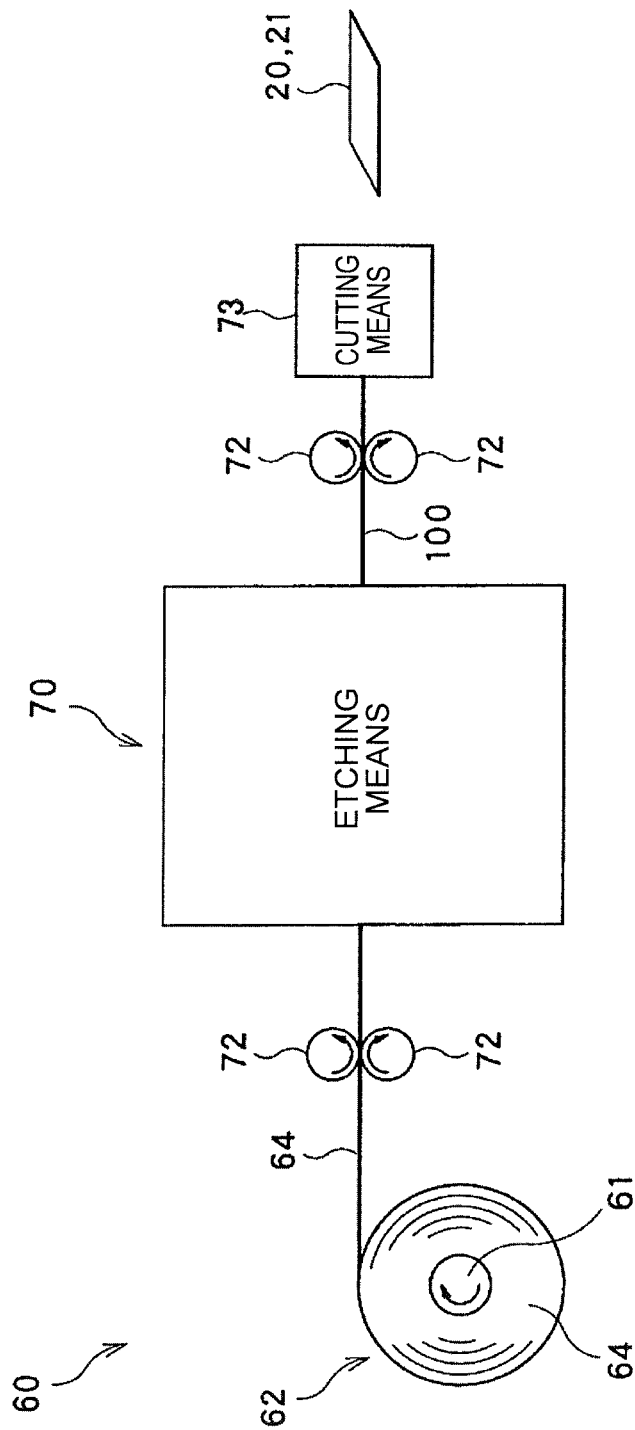
FIG. 12 is a schematic view generally describing a method of manufacturing a deposition mask according to an embodiment of the present disclosure.

FIG. 12 shows a manufacturing device 60 for manufacturing the deposition mask 20. As shown in FIG. 12, the wound body (metal plate roll) having the core 61 around which the elongated metal plate 64 is wound is prepared first. By rotating the core 61 to unwind the wound body 62, the elongated metal plate 64 extending in a strip shape is supplied as shown in FIG. 12. After the through holes 25 have been formed in the elongated metal plate 64, the elongated metal plate 64 provides the sheet-like metal plates 21 and further the deposition masks 20.

The supplied elongated metal plate 64 may be transferred by transfer rollers 72 to an etching device (etching means) 70. The respective processes shown in FIGS. 13 to 20 may be performed by the etching device 70. In this embodiment, an example in which a plurality of the deposition masks 20 are allocated in the width direction of the elongated metal plate 64 is described. Namely, the deposition masks 20 are produced from a zone occupying a predetermined position of the elongated metal plate 64 in the longitudinal direction. In this case, the deposition masks 20 are preferably allocated to the elongated metal plate 64 such that the longitudinal direction of each deposition mask 20 corresponds to the rolling direction of the elongated metal plate 64.

Figure 13:
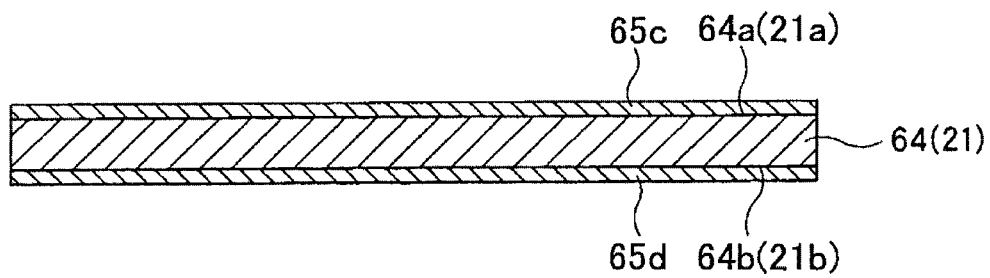
FIG. 13 is a view showing a step of forming a resist film on the metal plate, in the method of the manufacturing according to the embodiment of the present disclosure.

As shown in FIG. 13, resist films 65c and 65d each containing a negative photosensitive resist material may be formed first on the first surface 64a and the second surface 64b of the elongated metal plate 64. The resist films 65c and 65d may be formed by attaching a film having a layer containing a photosensitive resist material, such as an acryl-based photo-setting resin, i.e., a so-called dray film, to the first surface 64a and the second surface 64b of the elongated metal plate 64.

Figure 14:
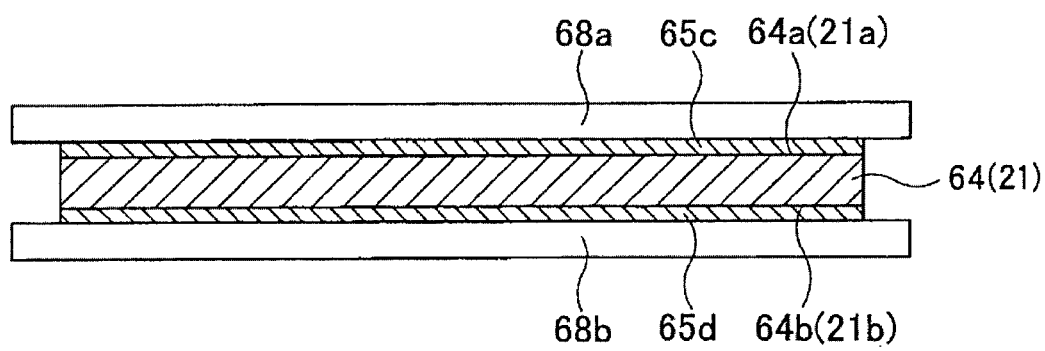
FIG. 14 is a view showing a step of bringing an exposure mask into tight contact with the resist film, in the method of manufacturing according to the embodiment of the present disclosure.

Next, exposure masks 68a and 68b may be prepared. The exposure masks 68a and 68b prevent light from transmitting through zones to be removed from the resist films 65c and 65d. As shown in FIG. 14, the exposure masks 68a and 68b are placed on the resist films 65c and 65d. The exposure mask 68a, 68b may be a glass dry plate which prevents light from transmitting through zones to be removed from the resist film 65c, 65d. Thereafter, the exposure masks 68a and 68b may be sufficiently brought into tight contact with the resist films 65c and 65d by vacuum adhesion. A positive photosensitive resist material may be used. In this case, an exposure mask which allows light to transmit through a zone to be removed from the resist film may be used.

Figure 15:
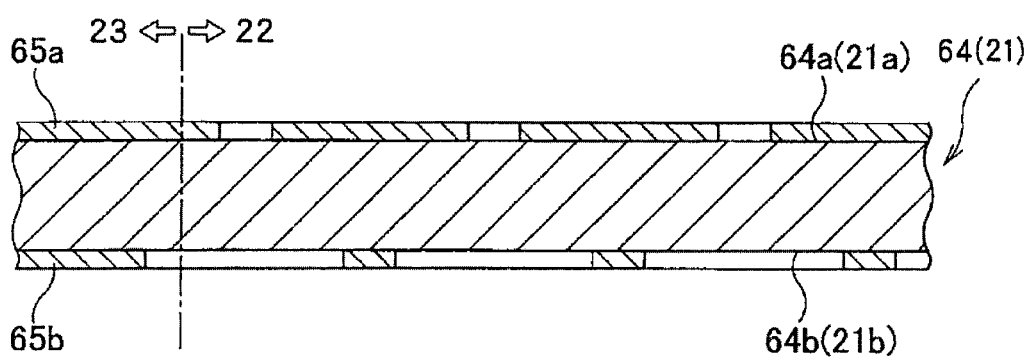
FIG. 15 is a view showing a step of developing the resist film, in the method of manufacturing according to the embodiment of the present disclosure.

Thereafter, the resist films 65c and 65d may be exposed through the exposure masks 68a and 68b (exposure step). Further, the resist films 65c and 65d may be developed to form images on the exposed resist films 65c and 65d (developing step). In this manner, as shown in FIG. 15, a first resist pattern 65a can be formed on the first surface 64a of the elongated metal plate 64, and a second resist pattern 65b can be formed on the second surface 64b of the elongated metal plate 64. The developing step may include a resist heating step for increasing hardness of the resist film 65c, 65d, or for more securely adhering the resist film 65c, 65d onto the elongated metal plate 64. The resist heating step may be performed in an atmosphere of an inert gas, such as an argon gas, a helium gas, a nitrogen gas or the like, at a temperature within a range of between 100° C. or more and 400° C. or less, for example.

Figure 16:
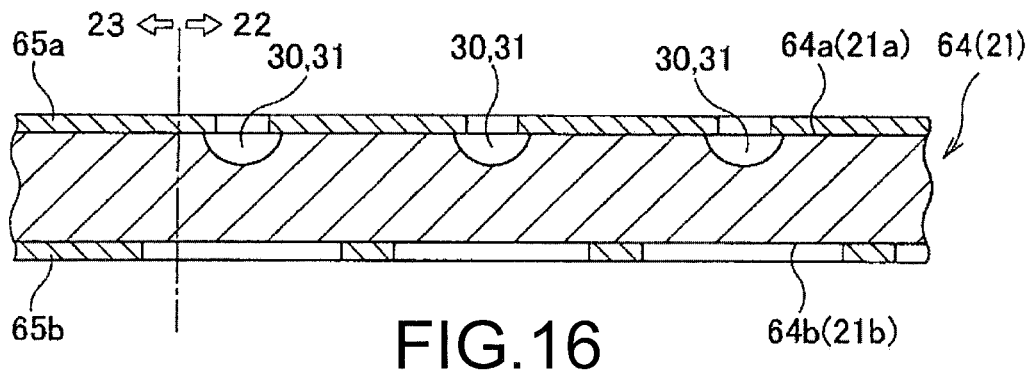
FIG. 16 is a view showing a first-surface etching step, in the method of manufacturing according to the embodiment of the present disclosure.

Next, as shown in FIG. 16, a first-surface etching step may be performed. In the first-surface etching step, zones of the first surface 64a of the elongated metal plate 64, which are not covered with the first resist pattern 65a, are etched by using a first etchant. For example, the first etchant may be ejected from a nozzle, which is positioned to face the first surface 64a of the transferred elongated metal plate 64, toward the first surface 64a of the elongated metal plate 64 through the first resist pattern 65a. As a result, as shown in FIG. 16, the zones of the elongated metal plate 64, which are not covered with the first resist pattern 65a, can be eroded by the first etchant. Thus, a lot of the first recesses 30 can be formed in the first surface 64a of the elongated metal plate 64. The first etchant to be used may be a ferric chloride solution and a liquid containing hydrochloric acid, for example.

Figure 17:
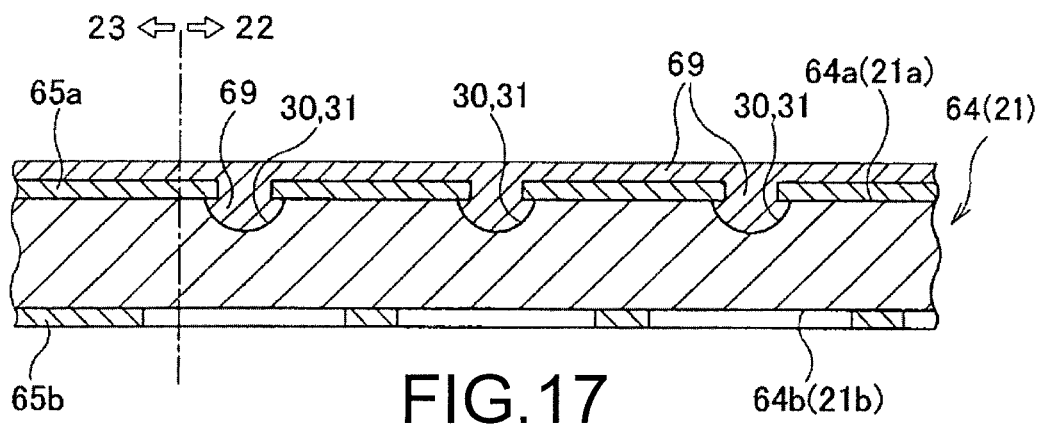
FIG. 17 is a view showing a step of coating a first recess with a resin, in the method of manufacturing according to the embodiment of the present disclosure.

Thereafter, as shown in FIG. 17, the first recesses 30 may be coated with a resin 69 resistant to a second etchant used in a succeeding second-surface etching step. Namely, the first recesses 30 may be sealed by the resin 69 resistant to the second etchant. In the example shown in FIG. 17, a film of the resin 69 may be formed to cover not only the formed first recesses 30 but also the first surface 64a (first resist pattern 65a).

Figure 18:
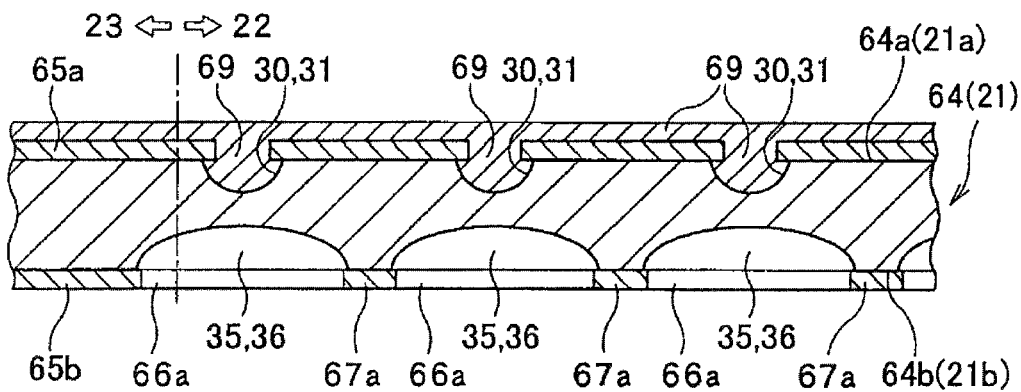
FIG. 18 is a second-surface etching step, in the method of manufacturing according to the embodiment of the present disclosure.

Next, as shown in FIG. 18, a second-surface etching step may be performed. In the second-surface etching step, zones of the second surface 64b of the elongated metal plate 64, which are not covered with the second resist pattern 65b, are etched so as to form the second recesses 35 in the second surface 64b. The second-surface etching step may be performed until the first recesses 30 and the second recesses 35 communicate with each other so that the through holes 25 are formed. Similarly to the first etchant, the second etchant to be used may be a ferric chloride solution and a liquid containing hydrochloric acid, for example.

Figure 19:
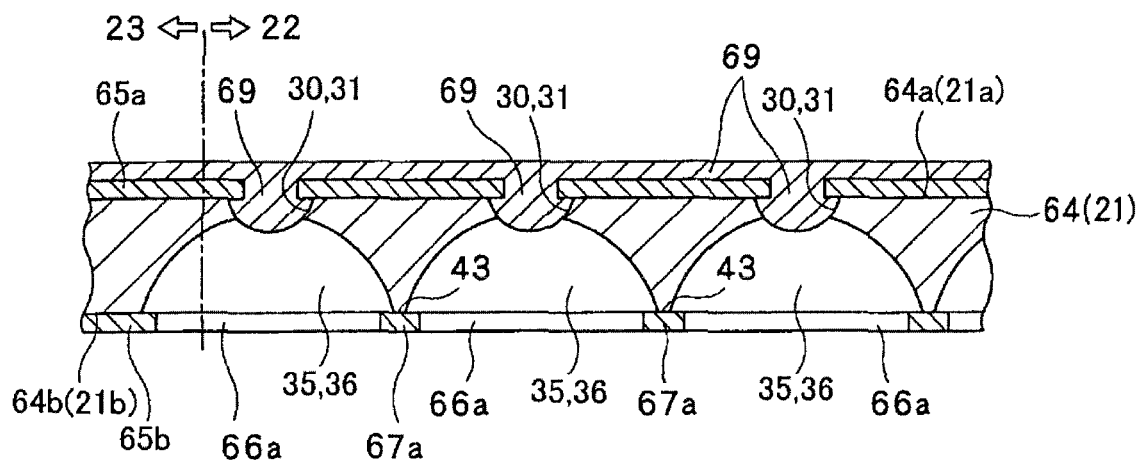
FIG. 19 is a view showing the second-surface etching step following to FIG. 18, in the method of manufacturing according to the embodiment of the present disclosure.

The erosion by the second etchant takes place in portions of the elongated metal plate 64, which are in contact with the second etchant. Thus, the erosion can develop not only in the normal direction N (thickness direction) of the elongated metal plate 64 but also in a direction along the plate plane of the elongated metal plate 64. Preferably, the second-surface etching step may be finished, before the two second recesses 35, which are respectively formed at positions facing adjacent two holes 66a of the second resist pattern 65b, merge with each other on a reverse side of the bridge portion 67a located between the two holes 66a. Thus, as shown in FIG. 19, the aforementioned top portion 43 can be left on the second surface 64b of the elongated metal plate 64.

Figure 20:
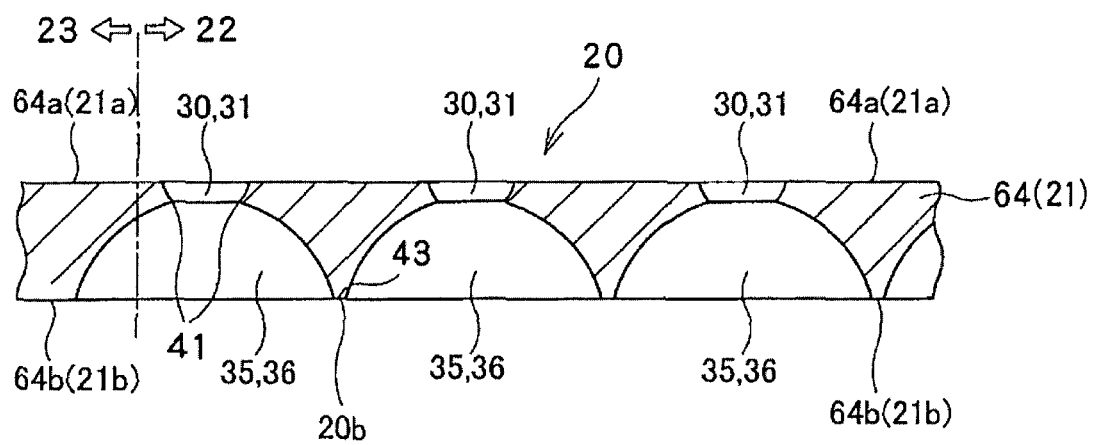
FIG. 20 is a view showing a step of removing a resin and a resist pattern from an elongated metal plate, in the method of manufacturing according to the embodiment of the present disclosure.

Thereafter, as shown in FIG. 20, the resin 69 may be removed from the elongated metal plate 64. The resin 69 can be removed by using, for example, an alkali-based peeling liquid. When the alkali-based peeling liquid is used, as shown in FIG. 20, the resist patterns 65a and 65b may be removed simultaneously with the resin 69. However, after the removal of the resin 69, the resist patterns 65a and 65b may be removed separately from the resin 69, by using a peeling liquid different from the peeling liquid for peeling the resin 69.

The elongated metal plate 64 having a lot of the through holes 25 formed therein in the above manner may be transferred to a cutting device (cutting means) 73 by the transfer rollers 72 and 72 which rotate while sandwiching therebetween the elongated metal plate 64. The elongated metal plate 64 may be supplied from the wound body 62 by rotating the aforementioned supply core 61 through a tension (tensile stress) applied by the rotation of the transfer rollers 72 and 72 to the elongated metal plate 64.

Thereafter, the elongated metal plate 64 having a lot of the through holes 25 formed therein may be cut by the cutting device 73 to have a predetermined length and a predetermined width. In this manner, the sheet-like metal plates 21 having a lot of the through holes 25 formed therein, i.e., the deposition masks 20 can be obtained.

Next, an example of a method of determining a quality of the deposition mask 20 by measuring the dimension X1 and the dimension X2 of the deposition mask 20 prepared as above is described with reference to FIGS. 21 to 24. Herein, a method of determining a quality of the deposition mask 20 in which the dimension X1 and the dimension X2 are measured by using a below-described quality determination system 80 and a quality of the deposition mask 20 is determined based on the measured results is described. Namely, whether the through holes 25 of the deposition mask 20 are arranged as designed can be checked by measuring the dimension X1 and the dimension X2, to thereby determine whether the positional accuracy of the through holes 25 of the deposition mask 20 meets a predetermined criterion.

Figure 21:
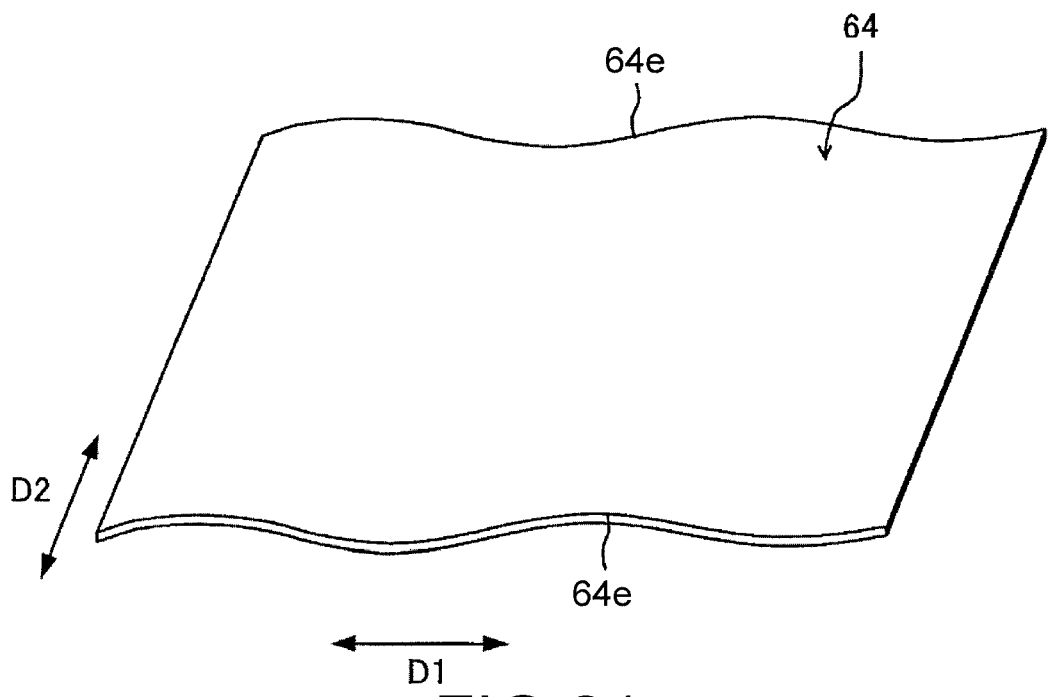
FIG. 21 is a perspective view showing an example of the elongated metal plate obtained by rolling.

In order to obtain the metal plate 21 with a reduced thickness, a reduction ratio in the manufacture of the metal plate 21 by rolling a base metal may be increased. The reduction ratio herein means a value obtained by a calculation of (thickness of base metal minus thickness of metal plate)/(thickness of base metal). However, an elongation percentage of the metal plate 64 differs depending on a position in the width direction D2 (direction orthogonal to transfer direction of base metal). The larger the reduction ratio is, the larger the non-uniformity degree of deformation caused by the rolling process may become. Thus, it is known that the metal plate 64 rolled at a large reduction ratio has a corrugation. To be specific, the corrugation may include a corrugated shape called edge wave which is formed in a side edge 64e of the metal plate 64 in the width direction D2, and a corrugated shape called middle wave which is formed in a center of the metal plate 64 in the width direction D2. Even when the metal plate is heated, e.g., annealed after the rolling step, such a corrugation may occur. For example, as shown in FIG. 21, the elongated metal plate 64 at least partially has a corrugation which is caused by a fact that a length in the longitudinal direction D1 differs depending on a poison in the width direction D2. For example, a corrugation occurs in the side edge 64e of the elongated metal plate 64, which extends along the longitudinal direction D1.

A metal plate having a predetermined thickness may be produced by a foil making step using a plating process. When a current density is non-uniform in the foil making step, the produced metal plate may have a non-uniform thickness. This also causes a similar corrugation in a side edge of the metal plate in the width direction.

Figure 22:
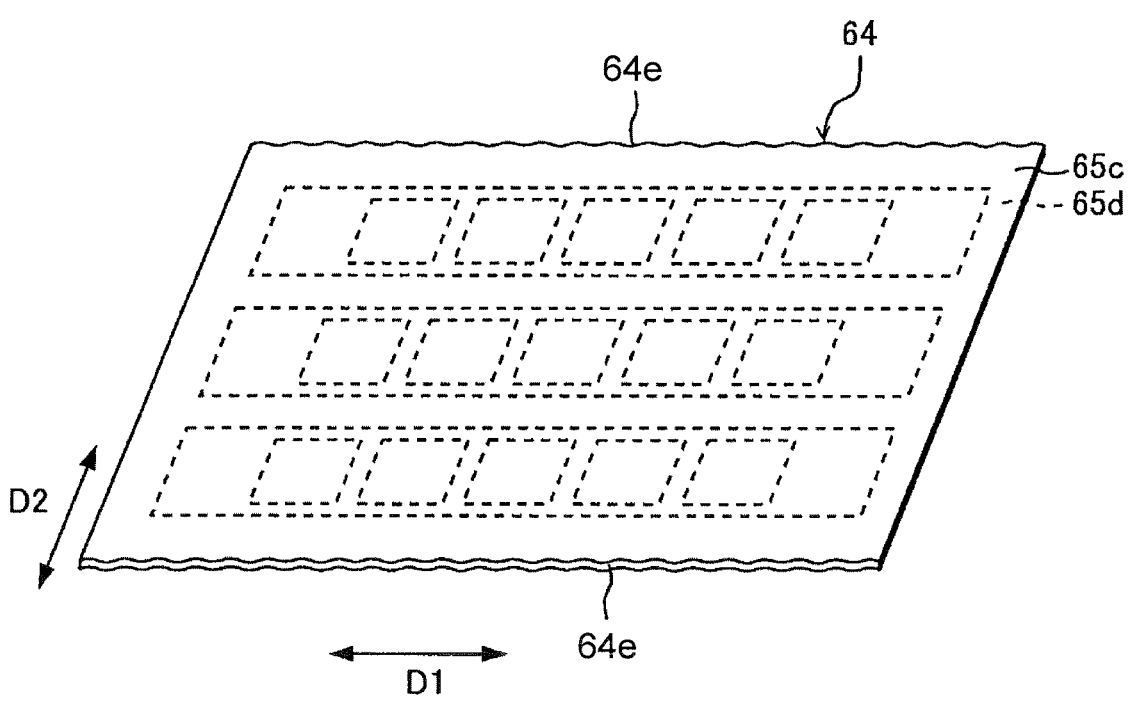
FIG. 22 is a perspective view describing that a deposition mask is formed on the elongated metal plate having substantially a flat shape, after its corrugation has been compressed.

On the other hand, in the aforementioned exposure step of exposing the resist films 65c and 65d, the exposure masks are brought into tight contact with the resist films 65c and 65d on the elongated metal plate 64 by vacuum adhesion or the like. Thus, as shown in FIG. 22, the corrugation in the side edge 64e of the elongated metal plate 64 is compressed by the exposure masks in tight contact with the resist films 65c and 65d, and the elongated metal plate 64 is substantially flat. Under this state, as shown by the dotted lines in FIG. 22, the resist films 65c and 65d provided on the elongated metal plate 64 are exposed to light in a predetermined pattern.

After the exposure masks have been removed from the elongated metal plate 64, the side edge 64e of the elongated metal plate 64 again has a corrugation. When the deposition mask 20 produced from the metal plate 64 having a corrugation is stretched, positions of the through holes 25 may move because the elongation of the deposition mask 20 differs in the width direction D2. To be more specific, when the metal plate 64 is formed as the deposition mask 20, a part of the metal plate 64, which has a large corrugation, has a larger longitudinal dimension than that of a part having a small corrugation. Here, suppose that the deposition mask 20 is stretched by applying tensile forces to a first position portion and a second position portion which differ from each other in the width direction D2. In this case, when a longitudinal length of the first position portion of the deposition mask 20 is shorter a longitudinal length of the second position portion thereof, tensile forces are applied to the deposition mask 20 such that the longitudinal length of the first position portion equals to the longitudinal length of the second position portion. Thus, the first position portion is more extended than the second position portion, whereby a longitudinal center portion of the deposition mask 20 may move toward the first position portion in the width direction D2. The positional deviation of the through holes 25 when the deposition mask 20 is stretched is desired to be small. Since the positional deviation of the deposition material 98 to be deposited on the organic EL substrate 92 through the through holes 25 can be suppressed, the dimensional accuracy and the positional accuracy of pixels of an organic EL display device can be improved.

Figure 23:
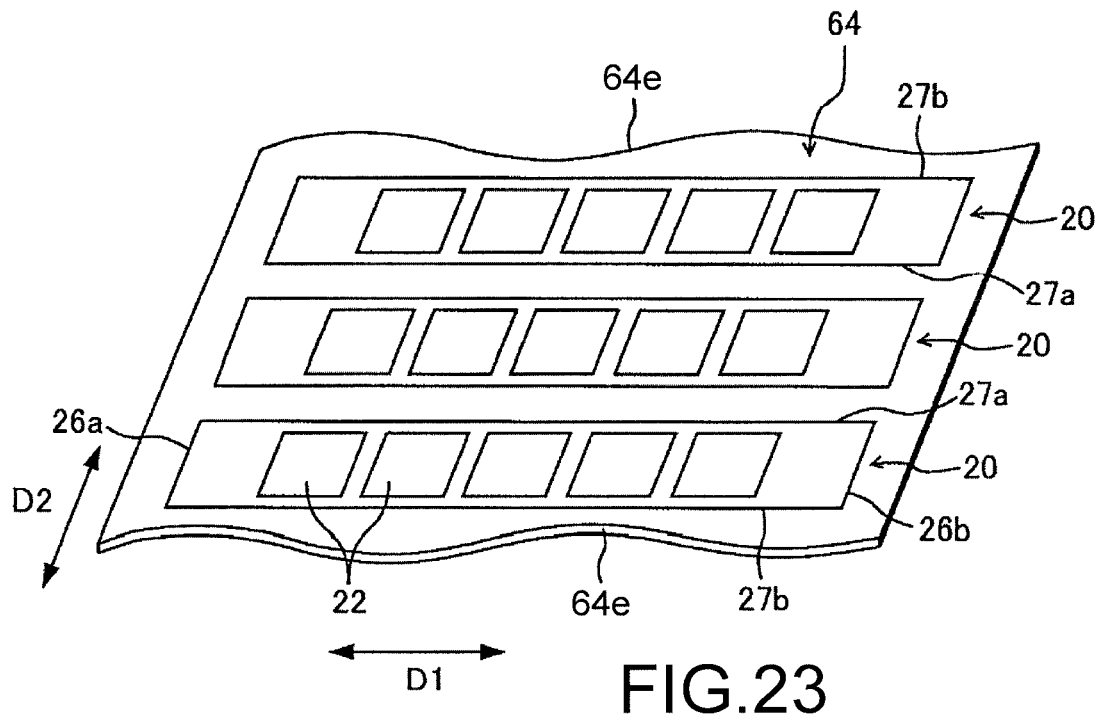
FIG. 23 is a perspective view showing a plurality of deposition masks formed on the elongated metal plate.

FIG. 23 shows the elongated metal plate 64 to which a plurality of the deposition masks 20 are allocated along the width direction D2 by etching. As shown in FIG. 23, among the three deposition masks 20 allocated to the elongated metal plate 64, at least the deposition mask 20 opposed to the side edge 64e of the elongated metal plate 64 is formed by a part having relatively a large corrugation. In FIG. 23, a symbol 27a indicates, among side edges of the deposition mask 20 which is allocated to the elongated metal plate 64 to be opposed to the side edge 64e thereof, the side edge (referred to as first side edge herebelow) positioned on the center side of the elongated metal plate 64. In FIG. 23, a symbol 27b indicates a side edge (referred to as second side edge herebelow) which is positioned on an opposite side of the first side edge 27a to be opposed to the side edge 64e of the elongated metal plate 64. As shown in FIG. 23, in the deposition mask 20 opposed to the side edge 64e of the elongated metal plate 64, a part closer to the second side edge 27b has a larger corrugation than that of a part closer to the first side edge 27a.

Figure 24:
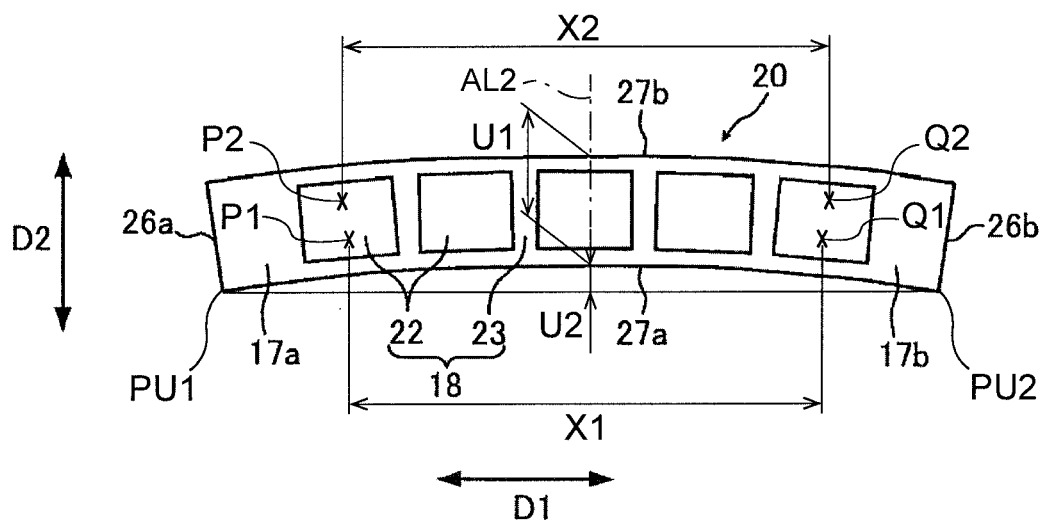
FIG. 24 is a plan view showing a deposition mask cut out from the elongated metal plate shown in FIG. 23.

FIG. 24 is a plan view showing the deposition mask 20, which was opposed to the side edge 64e of the elongated metal plate 64 and was cut from the elongated metal plate 64. As described above, when a part closer to the second side edge 27b of the deposition mask 20 has a larger corrugation than that of a part closer to the first side edge 27a, a length of the part closer to the second side edge 27b in the longitudinal direction D1 is longer than a length of the part closer to the first side edge 27a in the longitudinal direction D1. Namely, a dimension of the second side edge 27b (dimension along second side edge 27b) in the longitudinal direction D1 is larger than a dimension of the first side edge 27a (dimension along first side edge 27a). In this case, as shown in FIG. 24, the deposition mask 20 has a shape which is curved convexly from the first side edge 27a toward the second side edge 27b. Such a curved shape is referred to also as C shape herebelow.

In this embodiment, the dimension X1 and the dimension X2 of the deposition mask 20 are measured without applying a tensile force to the deposition mask 20. A method of quality determination according to this embodiment is described herebelow.

Figure 25:
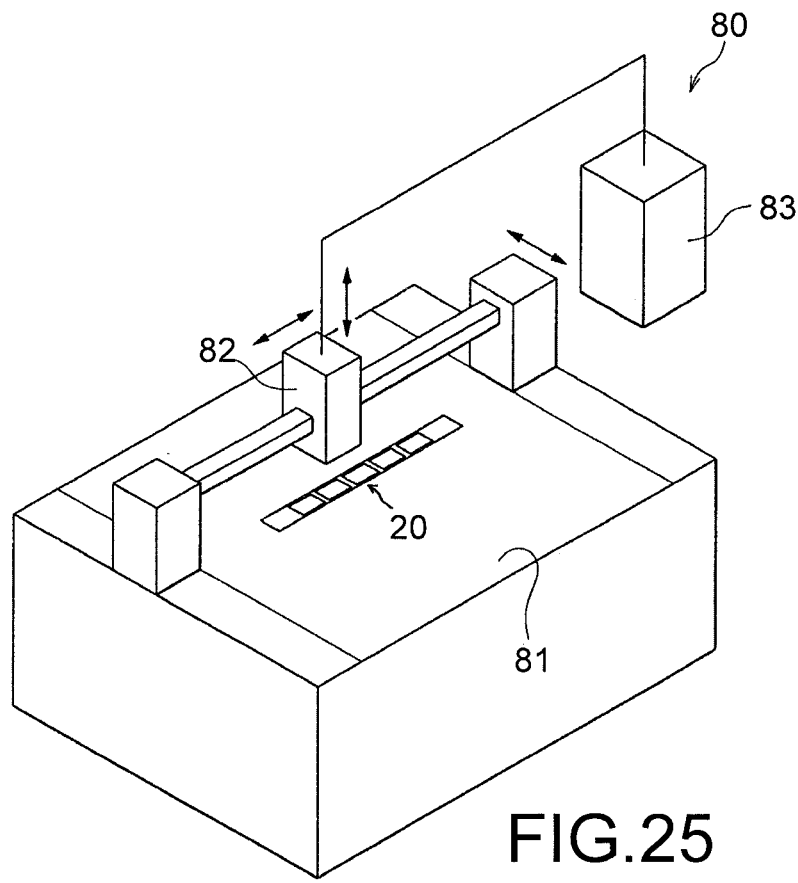
FIG. 25 is a view showing an example of a quality determination system of a deposition mask, used in a method of quality determination of a deposition mask according to an embodiment of the present disclosure.

FIG. 25 is a quality determination system for determining a quality of the deposition mask 20 by measuring a dimension thereof. As shown in FIG. 25, the quality determination system 80 may comprise a stage 81 on which the deposition mask 20 is placed, a dimension measuring device 82, and a determination device 83.

The dimension measuring device 82 may include, for example, a measurement camera (imaging unit) provided above the stage 81. The measurement camera images the deposition mask 20 and creates an image. At least one of the stage 81 and the dimension measuring device 82 may be movable to the other. In this embodiment, the stage 81 may be fixed, and the dimension measuring device 82 may be movable in two directions which are parallel to the stage 81 and orthogonal to each other, and in a direction perpendicular to the stage 81. Thus, the dimension measuring device 82 can be moved to a desired position. The quality determination system 80 may be configured such that the dimension measuring device 82 is fixed, and that the stage 81 is movable.

The dimension measurement of the deposition mask 20 can be performed differently depending on a size of a part to be measured of the deposition mask 20.

When a measurement target has relatively a small dimension (for example, several hundreds μm or less), the measurement target can be fit within the field of view of the measurement camera of the dimension measuring device 82. Thus, the dimension of the measurement target may be measured without moving the measurement camera.

On the other hand, when a measurement target has relatively a large dimension (for example, in the order of mm or more), it is difficult for the measurement target to be fit within the field of view of the measurement camera of the dimension measuring device 82. Thus, the dimension of the measurement target may be measured by moving the measurement camera. In this case, the dimension measuring device 82 may calculate the dimension of the deposition mask 20 based on an image imaged by the measurement camera and a moving amount of the measurement camera (in a case where the stage 81 is moved, its moving amount).

The determination device 83 may determine whether the aforementioned Equations (1) and (2) are satisfied, based on the measurement result by the dimension measuring device 82. The determination device 83 may include an arithmetic unit and a storage medium. The arithmetic unit is a CPU, for example. The storage medium is a memory such as ROM or RAM, for example. With a program stored in the storage medium to be executed by the arithmetic unit, the determination device 83 may perform a determination process of a dimension of the deposition mask 20.

In the method of quality determination of the deposition mask 20 according to this embodiment, a measuring step may be performed first. The measuring step measures the dimension X1 and the dimension X2 of the deposition mask 20.

In this case, the deposition mask 20 may be placed gently on the stage 81. At this time, the deposition mask 20 may be placed on the stage 81 without being fixed thereon. Namely, no tensile force may be applied to the deposition mask 20.

The deposition mask 20 placed on the stage 81 may be curved in a C shape as shown in FIG. 24, for example.

Next, the P1 point, the Q1 point, the P2 point and the Q2 point may be set. Herein, an example in which the P1 point and the Q1 point are set at center points of the two through holes 25 which are spaced at a distance equal to a desired design value $\alpha_X$ when designed (or stretched, deposited) is described. Similarly, the P2 point and the Q2 point may be set at center points of the two through holes 25 which are spaced at a distance equal to the desired design value $\alpha_X$ when designed. In addition, the P1 point and the P2 point may be set at center points of the two through holes 25 which are spaced at a distance equal to a desired design value $\alpha_Y$ when designed. Similarly, the Q1 point and the Q2 point may be set at center points of the two through holes 25 which are spaced at a distance equal to the desired design value $\alpha_Y$ when designed.

For example, when the desired value $\alpha_X$ is 200 mm and the desired value $\alpha_Y$ is 65.0 mm, center points of the through holes 25 positioned at apexes (corners) of a rectangle of 200 mm×65.0 mm may be set as the P1 point, the Q1 point, the P2 point and the Q2 point. When there is no center point of a through hole 25 corresponding to an apex of the rectangle, a center point of a through hole 25 close to the apex (preferably closest to the apex) may be set as the P1 point, the Q1 point, the P2 point or the Q2 point. In this case, the design values $\alpha_X$ and $\alpha_Y$ corresponding to the thus set P1 point, the Q1 point, the P2 point and the Q2 point may be obtained and used in a below-described determining step. When there are two or more through holes 25 closest to the apex, any one of the through holes 25 may be selected.

The center point of the through hole 25 may be a center point of a planar shape of the aforementioned connection portion 41 (or through portion 42). When assuming an object having the same planar shape as that of the connection portion 41 and having a constant density, this center point may be defined as a centroid which can support the object at one point. Thus, even when the through hole 25 has a complicated planar shape, the center point can be determined. A device for determining the center point may be, for example, AMIC1710-D (manufactured by SINTO S-PRECISION Co., Ltd.) which is a coordinate measuring instrument. The center point of the through hole 25 may be either a center point of a planar shape of the first recess 30 in the first surface 20a, or a center point of a planar shape of the second recess 35 in the second surface 20b.

Following thereto, the dimension X1 and the dimension X2 of the deposition mask 20 on the stage 81 (see FIG. 24) may be measured. In this case, the P1 point, the Q1 point, the P2 point and the Q2 point of the deposition mask 20 may be imaged by the measurement camera of the aforementioned dimension measuring device 82 shown in FIG. 25. Then, coordinates of the P1 point, the Q1 point, the P2 point and the Q2 point may be calculated based on the imaged images and a moving amount of the measurement camera when it was moved. Then, the dimension X1 which is a linear distance from the P1 point to the Q1 point, and the dimension X2 which is a linear distance from the P2 point to the Q2 point may be calculated based on the calculated coordinates of the respective points.

Next, the determining step may be performed. The determining step determines a quality of the deposition mask 20 based on the dimension X1 and the dimension X2 measured by the dimension measuring step.

For example, whether the calculated dimensions X1 and X2 satisfy at least one of the aforementioned Equations (1) and (2) may be determined, based on the measurement result by the dimension measuring device 82. Namely, the dimensions X1 and X2 calculated as above may be substituted into the aforementioned Equation (1) and the designed value may be substituted into $\alpha_X$, so as to calculate the left-hand member of the Equation (1) as an absolute value. Whether the value of the left-hand member is equal to or less than a value of the right-hand member based on the design value $\alpha_X$ may be determined. The deposition mask 20 which satisfies the Equation (1) may be determined to be an acceptable product (OK), and the deposition mask 20 which does not satisfy the Equation (1) may be determined to be a defective product (NG).

Similarly, the calculated dimensions X1 and X2 may be substituted into the aforementioned Equation (2), and the left-hand member of the Equation (2) may be calculated as an absolute value. Whether the value of the left-hand member is equal to or less than a value of the right-hand member based on the design values $\alpha_X$ and $\alpha_Y$ may be determined. The deposition mask 20 which satisfies the Equation (2) may be determined to be an acceptable product (OK), and the deposition mask 20 which does not satisfy the Equation (2) may be determined to be a defective product (NG).

In this manner, the deposition mask 20 which satisfies at least one of the Equation (1) and the Equation (2) may be determined as an acceptable product. However, not being limited thereto, the deposition mask 20 which satisfies both the Equation (1) and the Equation (2) may be determined as an acceptable product. Alternatively, the deposition mask 20 which does not satisfy the Equation (2) but satisfies the Equation (1) may be determined as an acceptable product, or the deposition mask 20 which does not satisfy the Equation (1) but satisfies the Equation (2) may be determined as an acceptable product.

Next, the deposition mask 20 is selected. Herein, an example in which the deposition mask 20 which satisfies at least one of the Equation (1) and the Equation (2) is selected is described.

Namely, the deposition mask 20 determined to be an acceptable product regarding the Equation (1), and the deposition mask 20 determined to be a defective product regarding the Equation (1) may be classified. Then, the deposition mask 20 which satisfies the Equation (1) and thus is an acceptable product may be selected as a deposition mask manufactured by the method of manufacturing according to this embodiment.

In addition, the deposition masks 20 determined to be a defective product regarding the Equation (1) may be classified into the deposition mask 20 determined to be an acceptable product regarding the Equation (2), and the deposition mask 20 determined to be a defective product regarding the Equation (2). Then, the deposition mask 20 which satisfies the Equation (2) and thus is an acceptable product may be selected as a deposition mask manufactured by the method of manufacturing according to this embodiment. Before the deposition mask 20 which satisfies the Equation (1) is selected, the deposition mask 20 which satisfies the Equation (2) may be selected.

In this manner, the deposition mask 20 which satisfies at least one of the Equation (1) and the Equation (2) can be selected as a deposition mask manufactured by the method of manufacturing according to this embodiment. The selected deposition mask 20 may be used in a below-described method of manufacturing a deposition mask device. The deposition mask 20 to be selected in the selecting step may be the deposition mask 20 which satisfies both the Equation (1) and the Equation (2). However, the deposition mask 20 which does not satisfy the Equation (2) but satisfies the Equation (1) may be selected, or the deposition mask 20 which does not satisfy the Equation (1) but satisfies the Equation (2) may be selected.

Next, an example of a method of manufacturing a deposition mask device 10 by using the deposition mask 20 which was determined to be an acceptable product and selected is described. In this case, as shown in FIG. 3, a plurality of the deposition masks 20 may be stretched on the frame 15. To be more specific, a tensile force in the longitudinal direction D1 of the deposition mask 20 may be applied to the deposition mask 20, and the tip portions 17a and 17b of the deposition mask 20 to which the tensile force is being applied may be secured on the frame 15. The tip portions 17a and 17b are fixed on the frame 15 by spot welding, for example.

Figure 26:
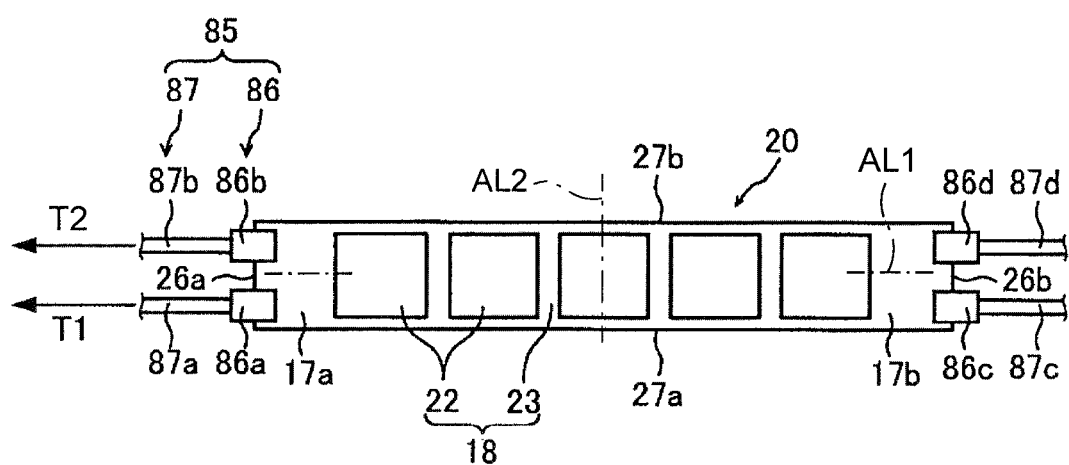
FIG. 26 is a view showing an example of a tensioning device, in the method of manufacturing a deposition mask device according to the embodiment of the present disclosure.

When the deposition mask 20 is stretched on the frame 15, a tensile force in the longitudinal direction D1 may be applied to the deposition mask 20. In this case, as shown in FIG. 26, the first end portion 26a of the deposition mask 20 may be clamped by a first clamp 86a and a second clamp 86b which are arranged on both sides of the first center axis line AL1. In addition, the second end portion 26b may be clamped by a third clamp 86c and a fourth clamp 86d which are arranged on both sides of the first center axis line AL1. A first tension unit 87a may be connected to the first clamp 86a, and a second tension unit 87b may be connected to the second clamp 86b. A third tension unit 87c may be connected to the third clamp 86c, and a fourth tension unit 87d may be connected to the fourth clamp 86d. In order to apply a tensile force to the deposition mask 20, the first tension unit 87a and the second tension unit 87b are driven so that the first clamp 86a and the second clamp 86b are moved with respect to the third clamp 86c and the fourth clamp 86d. Thus, tensile forces T1 and T2 can be applied to the deposition mask 20 in the longitudinal direction D1. In this case, the tensile force applied to the deposition mask 20 is a sum of the tensile force T1 of the first tension unit 87a and the tensile force T2 of the second tension unit 87b. Each of the tension units 87a to 87d may include an air cylinder, for example. Alternatively, the third tension unit 87c and the fourth tension unit 87d may be omitted, and the third clamp 86c and the fourth clamp 86d may be made immovable.

When the tensile forces T1 and T2 in the longitudinal direction D1 are applied to the deposition mask 20, the deposition mask 20 extends in the longitudinal direction D1 but contracts in the width direction D2. When the deposition mask 20 is stretched, the tensile force T1 of the first tension unit 87a and the tensile force T2 of the second tension unit 87b may be adjusted such that every through hole 25 of the elastically deformable deposition mask 20 is positioned within an allowable range of a desired position (deposition target position). This can locally adjust the extension of the deposition mask 20 in the longitudinal direction D1 and the contraction thereof in the width direction D2, thus allowing each through hole 25 to be positioned within the allowable range. For example, as shown in FIG. 24, when the deposition mask 20 to which no tensile force is applied is curved in a C shape, i.e., curved convexly from the first side edge 27a toward the second side edge 27b, the tensile force T1 of the first tension unit 87a located closer to the first side edge 27a may be made larger than the tensile force T2 of the second tension unit 87b. Thus, a larger tensile force can be applied to the part closer to the first side edge 27a than a tensile force applied to the part closer to the second side edge 27b. Therefore, the part closer to the first side edge 27a can be more extended than the part closer to the second side edge 27b, so that each through hole 25 can be easily positioned within the allowable range. On the other hand, when the deposition mask 20 to which no tensile force is applied is curved in a C shape, i.e., curved convexly from the second side edge 27b toward the first side edge 27a, the tensile force T2 of the second tension unit 87b located closer to the second side edge 27b may be larger than the tensile force T1 of the first tension unit 87a. Thus, a larger tensile force can be applied to the part closer to the second side edge 27b than a tensile force applied to the part closer to the first side edge 27a. Therefore, the part on the second side edge 27b side can be more extended than the part closer to the first side edge 27a, so that each through hole 25 can be easily positioned within the allowable range.

However, even when a tensile force applied to the deposition mask 20 is locally adjusted, it may be difficult to position each through hole 25 within the allowable range, depending on the positional accuracy of the through holes 25 formed in the deposition mask 20. For example, when the dimension X1 and the dimension X2 largely deviate from the design value, extension of the deposition mask 20 in the longitudinal direction D1 increases so that contraction thereof in the width direction D2 increases, or conversely the extension thereof in the longitudinal direction D1 decreases so that contraction thereof in the width direction D2 decreases. When the deposition mask 20 is stretched, each through hole 25 is desired to be positioned within an allowable range of a desired position (deposition target position). The Equation (1) is an equation for suppressing the positional misalignment of each through hole 25 when the deposition mask 20 is stretched, which might be caused by such a reason.

Namely, as in this embodiment, the fact that the dimension X1 and the dimension X2 of the deposition mask 20 placed on the stage 81 satisfy the Equation (1) makes it possible that an elongation amount of the deposition mask 20 in the longitudinal direction D1 when it is stretched can be fit within a desired range. Thus, a contraction amount of the deposition mask 20 in the width direction D2 when it is stretched can be fit within a desired rage. As a result, when the dimension X1 and the dimension X2 satisfy the Equation (1), a position of each through hole 25 can be easily adjusted during stretching of the deposition mask 20.

In addition, in general, when the deposition mask 20 is formed from the elongated metal plate 64 having a corrugation, it may be difficult to position each through hole 25 at a desired position during stretching of the deposition mask 20 due to corrugation degree. This is because a longitudinal dimension of the elongated metal plate 64 in the width direction D2 is considered to differ depending on difference in corrugation degree in the width direction D2. In this case, the dimension X1 and the dimension X2 may differ from each other. Thus, the deposition mask 20 when not stretched may be curved in a C shape as shown in FIG. 24.

Figure 27:
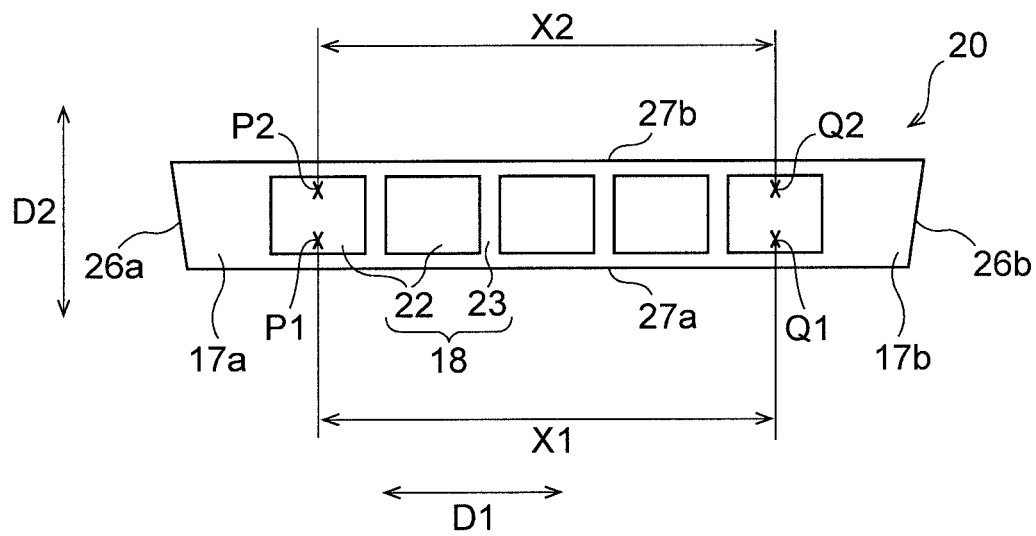
FIG. 27 is a plan view showing an example of a stretched state of the deposition mask shown in FIG. 24.
Figure 28:
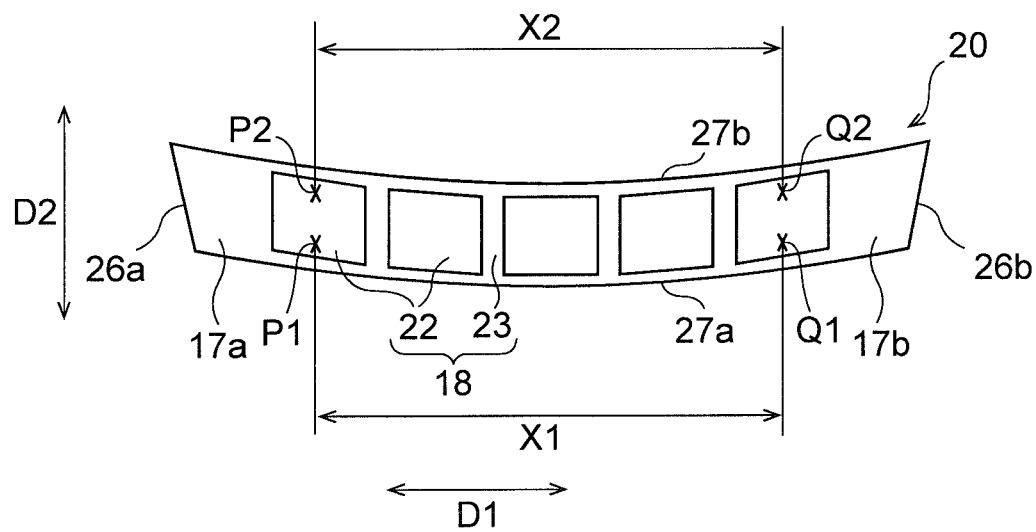
FIG. 28 is a plan view showing another example of a stretched state of the deposition mask shown in FIG. 24.

For example, when the deposition mask 20 which is curved as shown in FIG. 24 is not stretched, the dimension X1 is shorter than the dimension X2. Thus, when the deposition mask 20 is stretched, a tensile force is applied to the deposition mask 20 such that the dimension X1 equals to the dimension X2, as shown in FIG. 27. In this case, the part closer to the first side edge 27a extends more than the part closer to the second side edge 27b. Thus, the center position of the deposition mask 20 in the longitudinal direction D1 may move toward the first side edge 27a, so that the though holes 25 may be displaced in the width direction D2. In addition, even when the deposition mask 20 is stretched such that the dimension X1 and the dimension X2 equal to each other, the deposition mask 20 may be reversely curved as shown in FIG. 28. In this case, the first side edge 27a becomes convex, and the second side edge 27b becomes concave. Also in this case, the through holes 25 may be displaced in the width direction D2.

The positional deviation of each through hole 25 in the width direction D2 is desired to be small, and every through hole 25 is desired to be positioned within an allowable range of a desired position (deposition target position). The Equation (2) is an equation for suppressing misalignment of each through hole 25 when the deposition mask is stretched, which might be caused by such a reason.

Namely, as in this embodiment, the fact that the dimension X1 and the dimension X2 of the deposition mask 20 placed on the stage 81 satisfy the Equation (2) can suppress the length of the deposition mask 20 in the longitudinal direction D1 from differing in the width direction D2. Thus, when the deposition mask 20 is stretched, the elongation in the longitudinal direction D1 can be suppressed from differing in the width direction D2, which in turn can suppress positional deviation of the through holes 25 in the width direction D2. As a result, when the dimension X1 and the dimension X2 satisfy the Equation (2), each through hole 25 can be easily positioned within the allowable range during stretching of the deposition mask 20.

Next, an example of a method of depositing the deposition material 98 on the organic EL substrate 92 by using the thus obtained deposition mask device 10 is described.

In this case, as shown in FIG. 1, the frame 15 is first arranged such that the deposition mask 20 is opposed to the organic EL substrate 92. Following thereto, the deposition mask 20 is brought into tight contact with the organic EL substrate 92 by using the magnet 93. Thereafter, under this state, the deposition material 98 is evaporated toward the organic EL substrate 92 through the through holes 25 of the deposition mask 20. Thus, the deposition material 98 can be deposited on the organic EL substrate 92 in a predetermined pattern.

In this manner, according to this embodiment, a quality of the deposition mask 20 is determined based on the dimension X1 from the P1 point to the Q1 point on one side of the first center axis line AL1 of the deposition mask 20, and the dimension X2 from the P2 point to the Q2 point on the other side thereof. The use of the dimensions X1 and X2 can suppress the elongation of the deposition mask 20 in the longitudinal direction D1 from differing in the width direction D2, when the deposition mask 20 is stretched, which in turn can suppress the positional deviation of the through holes 25 in the width direction D2. Accordingly, the deposition mask device 10 can be produced with the use of the deposition mask 20 determined to be an acceptable product, whereby the positional accuracy of the through holes 25 of the deposition mask 20 in the deposition mask device 10 can be improved. As a result, the positional accuracy of the through holes 25 when the deposition mask 20 is stretched can be improved. In this case, the deposition material 98 can be deposited on the substrate 92 with a high position accuracy, whereby a high-definition organic EL display device 100 can be produced.

In addition, according to this embodiment, whether the dimension X1 from the P1 point to the Q1 point and the dimension X2 from the P2 point to the Q2 point satisfy the aforementioned Equation (1) is determined. Thus, when the dimension X1 and the dimension X2 of a deposition mask 20 satisfy a predetermined condition by the Equation (1), the deposition mask 20 is determined to be an acceptable product. In such a deposition mask 20, deviation of the dimension X1 and the dimension X2 from the design value can be reduced. Therefore, when the deposition mask 20 is stretched, a contraction amount in the width direction D2 can be fit within a desired range, to thereby improve the positional accuracy of the through holes 25.

In addition, according to this embodiment, whether the dimension X1 from the P1 point to the Q1 point and the dimension X2 from the P2 point to the Q2 point satisfy the aforementioned Equation (2) is determined. Thus, when the dimension X1 and the dimension X2 of a deposition mask 20 satisfy a predetermined condition by the Equation (2), the deposition mask 20 is determined to be an acceptable product. In such a deposition mask 20, a difference between the dimension X1 and the dimension X2 can be reduced. Therefore, when the deposition mask 20 is stretched, the elongation of the deposition mask 20 in the longitudinal direction D1 can be suppressed from differing in the width direction D2, which in turn can suppress the positional deviation of the through holes 25 in the width direction D2. As a result, the positional accuracy of the through holes 25 when the deposition mask 20 is stretched can be improved.

In addition, according to this embodiment, the P1 point and the P2 point are intended to be symmetrically arranged with respect to the first center axis line AL1 of the deposition mask 20, during deposition, and the Q1 point and the Q2 point are intended to be symmetrically arranged with respect to the first center axis line AL1 of the deposition mask 20 during deposition. Thus, the P1 point, the Q1 point, the P2 point and the Q2 point can be set at positions located at the same position in the longitudinal direction D1 of the deposition mask 20, and at positions where distances from the first center axis line AL1 are the same. This can improve the quality determination accuracy of the deposition mask 20.

In addition, according to this embodiment, the P1 point and the P2 point are arranged on one side with respect to the second center axis line AL2 of the deposition mask 20, and the Q1 point and the Q2 point are arranged on the other side. Thus, the P1 point, the P2 point, the Q1 point and the Q2 point can be set on both sides of the second center axis line AL2. This can improve the quality determination accuracy of the deposition mask 20.

In addition, according to this embodiment, the P1 point and the Q1 point are intended to be symmetrically arranged with respect to the second center axis line AL2 of the deposition mask 20 during deposition, and the P2 point and the Q2 point are intended to be symmetrically arranged with respect to the second center axis line AL2 during deposition. Thus, the P1 point, the Q1 point, the P2 point and the Q2 point can be set at positions located at the same position in the width direction D2 of the deposition mask 20, and at positions where distances from the second center axis line AL2 are the same. This can improve the quality determination accuracy of the deposition mask 20.

Further, according to this embodiment, the deposition mask 20 which satisfies the Equation (1) is selected and manufactured as the deposition mask 20. Thus, the deposition mask 20 in which deviation of the dimension X1 and the dimension X2 from the design value is reduced can be obtained. Therefore, when the deposition mask 20 is stretched, a contraction amount in the width direction D2 can be fit within a desired range, to thereby improve the positional accuracy of the through holes 25.

In addition, according to this embodiment, the deposition mask 20 which satisfies the Equation (2) is selected and manufactured as the deposition mask 20. Thus, the deposition mask 20 in which a difference between the dimension X1 and the dimension X2 is reduced can be obtained. Therefore, when the deposition mask 20 is stretched, the elongation of the deposition mask 20 in the longitudinal direction D1 can be suppressed from differing in the width direction D2, which in turn can suppress the positional deviation of the through holes 25 in the width direction D2. As a result, the positional accuracy of the through holes 25 when the deposition mask 20 is stretched can be improved.

The aforementioned embodiment can be variously modified. Herebelow, modification examples are described with reference to the drawings as necessary. In the following description and the drawings used in the following description, the same symbols as those used for the corresponding parts in the aforementioned embodiment are used for the parts that can be configured in the same manner in the above embodiment, and overlapped description is omitted. When the effect obtained in the aforementioned embodiment can be obviously obtained in the modification examples, description thereof may be omitted.

The aforementioned embodiment shows the example in which a dimension of the deposition mask 20 produced by etching a rolled metal plate is measured. However, a dimension of the deposition mask 20 produced by another method such as a plating process can be measured by using the aforementioned dimension measuring method and the quality determination system 80.

In addition, the aforementioned embodiment shows the example in which the deposition mask 20 which satisfies at least one of the Equation (1) and the Equation (2) is determined to be an acceptable product and is selected as a deposition mask manufactured by the method of manufacturing according to this embodiment. However, the method of quality determination and the equations used for the determination are not specifically limited thereto, as long as a quality of the deposition mask 20 can be determined based on the dimension X1 and the dimension X2. Namely, a quality of the deposition mask 20 is determined by using the dimension X1 from the P1 point to the Q1 point on the one side of the first center axis line AL1 of the deposition mask 20 and the dimension X2 from the P2 point to the Q2 point on the other side thereof. When the deposition mask 20 which is thus determined to be an acceptable product is stretched, the elongation of the deposition mask 20 in the longitudinal direction D1 can be suppressed from differing in the width direction D2. Thus, the positional deviation of the through holes 25 in the width direction D2 can be suppressed, whereby the positional accuracy of the through holes 25 of the deposition mask 20 in the deposition mask device 10 can be improved.

The present invention is not limited to the aforementioned embodiment and the modification examples as they are. When the present invention is carried out, constituent elements may be deformed without departing from the scope of the invention. Various inventions may be formed by suitably combining constituent elements disclosed in the aforementioned embodiment as it is and the modification examples. Some constituent elements may be deleted from all the constituent elements shown in the embodiment and the modification examples.

EXAMPLES

Next, this embodiment is described more specifically by way of examples. However, this embodiment is not limited to the below examples as long as it does not depart from its scope.

Twenty-five deposition masks 20 were prepared. These deposition masks 20 were the $1^{st}$ sample to the $25^{th}$ sample. The dimension X1 and the dimension X2 of each of the samples were measured.

First, as shown in FIG. 25, the deposition mask 20 was placed horizontally on the stage 81. At this time, the deposition mask 20 was gently placed on the stage 81 so as not to form a partial concave in the deposition mask 20 was partially indented.

Next, the dimension X1 from the P1 point to the Q1 point of the deposition mask 20 was measured, and the dimension X2 from the P2 point to the Q2 point was measured. FIGS. 29 to 46 show the measurement results as $\alpha_X$-X1 and $\alpha_X$-X2. In FIGS. 29 to 46, the P1 point and the Q1 point, and the P2 point and the Q2 point were set in centers of the through holes 25 in which $\alpha_X$ was 200 mm, 300 mm, 400 mm, 600 mm, 800 mm or 900 mm, and $\alpha_Y$ was 65.0 mm, 43.3 mm or 21.7 mm. The unit of the numerical values shown in FIGS. 29 to 46 is μm. The $1^{st}$ to $25^{th}$ samples shown in FIGS. 29 to 46 are the same samples. Dimensions of the $1^{st}$ sample with respect to each $\alpha_X$ and each $\alpha_Y$ were measured, which are shown in FIGS. 29 to 46. The same applies to the $2^{nd}$ to $25^{th}$ samples. In all the $1^{st}$ to $25^{th}$ samples, $W_Y$ was 65.0 mm.

FIG. 29 shows measurement results when the P1 point and the Q1 point, and the P2 point and the Q2 point were set in centers of the through holes 25 wherein $\alpha_X$ was 200 mm and $\alpha_Y$ was 65.0 mm. The dimensions X1 and X2 measured in this case were substituted into the aforementioned Equation (1) to calculate the left-hand member of the Equation (1). FIG. 29 shows the calculation results as $|\alpha_X-(X1+X2)/2|$. FIG. 29 shows dimension measurement results of the twenty-five deposition masks 20 obtained from the twenty-five samples, respectively. Herein, since $\alpha_X$ is 200 mm, a value of the right-hand member (threshold value of left-hand member) of the Equation (1) is 13.3 μm. Among the $1^{st}$ to $25^{th}$ samples, the $1^{st}$ to $10^{th}$ samples, the $21^{st}$ sample, the $22^{nd}$ sample, the $24^{th}$ sample and the $25^{th}$ sample satisfied the Equation (1). Thus, the deposition masks 20 of the $1^{st}$ to $10^{th}$ samples, the $21^{st}$ sample, the $22^{nd}$ sample, the $24^{th}$ sample and the $25^{th}$ sample were determined to be deposition masks 20 capable of improving the positional accuracy of the through holes 25 when the deposition masks 20 were stretched (acceptable products).

In addition, the dimensions X1 and X2 of the deposition mask 20 were substituted into the aforementioned Equation (2) to calculate the left-hand member of the Equation (2). FIG. 29 shows the calculation results as $|X1-X2|$. Herein, since $\alpha_Y$ is 65.0 mm, a value of the right-hand member (threshold value of left-hand member) of the Equation (2) is 20 μm. Among the $1^{st}$ to $25^{th}$ samples, the $1^{st}$ to $6^{th}$ samples, the $11^{th}$ to $16^{th}$ samples, the $21^{st}$ sample and the $23^{rd}$ sample satisfied the Equation (2). Thus, the deposition masks 20 of the $1^{st}$ to $6^{th}$ samples, the $11^{th}$ to $16^{th}$ samples, the $21^{st}$ sample and the $23^{rd}$ sample were determined to be deposition masks 20 capable of improving the positional accuracy of the through holes 25 when the deposition masks 20 were stretched (acceptable products).

Further, overall determination results in FIG. 29 show that, among the $1^{st}$ to $25^{th}$ samples, the $1^{st}$ to $6^{th}$ samples and the $21^{st}$ sample satisfied the Equation (1) and the Equation (2). Thus, the deposition masks 20 of the $1^{st}$ to $6^{th}$ samples and the $21^{st}$ sample were determined to be deposition masks 20 capable of further improving the positional accuracy of the through holes 25 when the deposition masks 20 were stretched (acceptable products).

Here, the reason why the satisfaction of the aforementioned Equations (1) and (2) can improve the positional accuracy of the through holes 25 when the deposition mask 20 is stretched is described.

The Equation (1) is described first. As described above, the Equation (1) is for suppressing the positional misalignment of each through hole 25 when the deposition mask 20 is stretched, because of the deviation of the dimensions X1 and X2 from the design value. Namely, the fact that the dimensions X1 and X2 satisfy the Equation (1) makes it possible that an elongation amount of the deposition mask 20 in the longitudinal direction D1 when it is stretched can be fit within a desired range, so that a contraction amount of the deposition mask 20 in the width direction D2 when it is stretched can be fit within a desired rage. In order to confirm that the satisfaction of the Equation (1) contributes to the improvement in positional accuracy of the through holes 25 when the deposition mask 20 is stretched, a width dimension U1 (see FIG. 24) of the deposition mask 20 when stretched is focused. The dimension U1 corresponds to a width dimension at a center position (second center axis line AL2) in the longitudinal direction D1. The contraction amount may become maximum at the center position in the width direction D2. Although FIG. 24 shows the deposition mask 20 to which no tensile force is applied, FIG. 24 shows the dimension U1 when the deposition mask 20 is stretched, for the sake of convenience. The same applies to a below-described dimension U2.

Next, the Equation (2) is described. As described above, the Equation (2) is for suppressing the positional misalignment of each through hole 25 when the deposition mask 20 is stretched, because the dimensions X1 and X2 differ from each other. Namely, the fact that the dimensions X1 and X2 satisfy the Equation (2) makes it possible that the elongation in the longitudinal direction D1 can be suppressed from differing in the width direction D2, which in turn can suppress the positional deviation of the through holes 25 in the width direction D2, when the deposition mask 20 is stretched. In order to confirm that the satisfaction of the Equation (2) contributes to the improvement in positional accuracy of the through holes 25 when the deposition mask 20 is stretched, a concave depth dimension U2 of the first side edge 27 of the deposition mask 20, which is curved in a C shape, is focused. The dimension U2 corresponds to a concave depth dimension at a center position in the longitudinal direction D1. To be more specific, the dimension U2 is a distance from a segment, which connects an intersection PU1 between the first end portion 26a of the deposition mask 20 and the first side edge 27a thereof, and an intersection PU2 between the second end portion 26b and the first side edge 27a, to the center position of the first side edge 27a in the longitudinal direction D1. Such a dimension U2 shows the maximum concave depth of the first side edge 27a. As shown in FIG. 28, when the deposition mask 20 when stretched is reversely curved, the dimension U2 may be a concave depth dimension of the second side edge 27b.

Measuring methods of the dimensions U1 and U2 are described below.

First, a tensile force was applied to the deposition mask 20 after completion of the measurement of the dimensions X1 and X2. To be more specific, the first end portion 26a and the second end portion 26b of the deposition mask 20 were clamped by the clamps 86a to 86d as shown in FIG. 26, for example, and a tensile force was applied to the deposition mask 20 from the first tension unit 87a to the fourth tension unit 87d. The applied tensile force was a force by which each through holes 25 was positioned within an allowable range of a desired position (deposition target position) in the longitudinal direction D1. Following thereto, the tensioned deposition mask 20 was fixed on the stage 81 shown in FIG. 25. Next, the dimensions U1 and U2 of the deposition mask 20 fixed on the stage 81 were measured. FIG. 29 shows the measurement results of the dimension U1 as $\alpha_U$-U1. Herein, $\alpha_U$ was a design value of the width dimension of the deposition mask 20 at the center poison in the longitudinal direction D1. The value $\alpha_U$ is a design value when the deposition mask 20 is stretched. In addition, FIG. 29 shows the measurement results of the dimension U2 as U2.

The measured dimensions U1 and U2 were evaluated.

The dimension U1 was evaluated based on whether the $\alpha_U$-U1 was a threshold value (±4.0 µm) or less. The threshold value was set as a value that allows positional deviation within a range in which luminance efficiency of pixels formed by deposition and color mixing with an adjacent pixel of another color can be suppressed. When a tensile force in the longitudinal direction D1 is applied to the deposition mask 20, the width dimension of the deposition mask 20 may be decreased at the center position in the longitudinal direction D1. In this case, the first side edge 27a and the second side edge 27b are deformed to come close to each other at the center position in the longitudinal direction D1. Thus, allowable values of the deformation of the first side edge 27a and the second side edge 27b were supposed respectively to be 2 µm, and their total value ±4.0 µm was adopted as the threshold value. Among the samples shown in FIG. 29, the $1^{st}$ to $10^{th}$ samples, in the $21^{st}$ sample, the $22^{nd}$ sample, the $24^{th}$ sample and the $25^{th}$ sample, $\alpha_U$-U1 was the threshold value or less. In the $1^{st}$ to $10^{th}$ samples, the $21^{st}$ sample, the $22^{nd}$ sample, the $24^{th}$ sample and the $25^{th}$ sample, deviation of the width dimension U1 of the deposition mask 20 is suppressed, whereby the positional deviation of the through holes 25 in the width direction D2 when the deposition mask 20 is stretched can be suppressed. On the other hand, as described above, the $1^{st}$ to $10^{th}$ samples, the $21^{st}$ sample, the $22^{nd}$ sample, the $24^{th}$ sample and the $25^{th}$ sample satisfy the Equation (1). Thus, it can be said that the satisfaction of the Equation (1) can improve the positional accuracy of the through holes 25 when the deposition mask 20 is stretched.

In particular, the dimension U1 shows a width dimension of the deposition mask 20 at the center position in the longitudinal direction D1. At the center position, the through holes 25 are mostly likely to move in the width direction D2. Thus, when $\alpha_U$-U1 at the center poison is a threshold value or less, it can be said that the positional deviation of the through holes 25, which are positioned other than the center position in the longitudinal direction D1, can be further suppressed.

The dimension U2 was evaluated based on whether the U2 was a threshold value (3.0 µm) or less. The threshold value was set as a value that allows positional deviation within a range in which luminance efficiency of pixels formed by deposition and color mixing with an adjacent pixel of another color can be suppressed. Among the samples shown in FIG. 29, in the $1^{st}$ to $6^{th}$ samples, the $11^{th}$ to $16^{th}$ samples, the $21^{st}$ sample and the $23^{rd}$ sample, the dimension U2 was the threshold value or less. Thus, in the $1^{st}$ to $6^{th}$ samples, the $11^{th}$ to $16^{th}$ samples, the $21^{st}$ sample and the $23^{rd}$ sample, the concave degree of the first side edge 27a of the deposition mask 20 is small. Thus, the positional deviation of the through holes 25 in the width direction D2 when the deposition mask 20 is stretched can be suppressed. On the other hand, as described above, the $1^{st}$ to $6^{th}$ samples, the $11^{th}$ to $16^{th}$ samples, the $21^{st}$ sample and the $23^{rd}$ sample satisfy the Equation (2). Thus, it can be said that the satisfaction of the Equation (2) can improve the positional accuracy of the through holes 25 when the deposition mask 20 is stretched.

In particular, the dimension U2 shows a depth dimension of the concavity of the first side edge 27a of the deposition mask 20 at the center position in the longitudinal direction D1. At the center position, the through holes 25 are most likely to positionally deviate in the width direction D2. Thus, when the dimension U2 at the center poison is a threshold value or less, it can be said that the positional deviation of the through holes 25 in the width direction D2, which are positioned other than the center position in the longitudinal direction D1, can be further suppressed.

FIG. 30 shows measurement results when the P1 point and the Q1 point, and the P2 point and the Q2 point were set in centers of the through holes 25 wherein $\alpha_X$ was 200 mm and $\alpha_Y$ was 43.3 mm (⅔ of 65 mm). The dimensions X1 and X2 measured in this case were substituted into the aforementioned Equation (1) to calculate the left-hand member of the Equation (1). FIG. 30 shows the calculation results as $|\alpha_X-(X1+X2)/2|$. FIG. 30 shows dimension measurement results of the twenty-five deposition masks 20 obtained from the twenty-five samples, respectively. Herein, since $\alpha_X$ is 200 mm, a value of the right-hand member (threshold value of left-hand member) of the Equation (1) is 13.3 µm. Among the $1^{st}$ to $25^{th}$ samples, the $1^{st}$ to $10^{th}$ samples, the $21^{st}$ sample, the $22^{nd}$ sample, the $24^{th}$ sample and the $25^{th}$ sample satisfied the Equation (1). Thus, the $1^{st}$ to $10^{th}$ samples, the $21^{st}$ sample, the $22^{nd}$ sample, the $24^{th}$ sample and the $25^{th}$ sample were determined to be deposition masks 20 capable of improving the positional accuracy of the through holes 25 when the deposition masks 20 were stretched (acceptable products).

In addition, the dimensions X1 and X2 of the deposition mask 20 were substituted into the aforementioned Equation (2) to calculate the left-hand member of the Equation (2). FIG. 30 shows the calculation results as $|X1-X2|$. Herein, since $\alpha_Y$ is 43.3 mm, a value of the right-hand member (threshold value of left-hand member) of the Equation (2) is 13.3 µm. Among the $1^{st}$ to $25^{th}$ samples, the $1^{st}$ to $6^{th}$ samples, the $11^{th}$ to $16^{th}$ samples, the $21^{st}$ sample and the $23^{rd}$ sample satisfied the Equation (2). Thus, the deposition masks 20 of the $1^{st}$ to $6^{th}$ samples, the $11^{th}$ to $16^{th}$ samples, the $21^{st}$ sample and the $23^{rd}$ sample were determined to be deposition masks 20 capable of improving the positional accuracy of the through holes 25 when the deposition masks 20 were stretched (acceptable products).

Further, overall determination results in FIG. 30 show that, among the $1^{st}$ to $25^{th}$ samples, the $1^{st}$ to $6^{th}$ samples and the $21^{st}$ sample satisfied the Equation (1) and the Equation (2). Thus, the deposition masks 20 of the $1^{st}$ to $6^{th}$ samples and the $21^{st}$ sample were determined to be deposition masks 20 capable of further improving the positional accuracy of the through holes 25 when the deposition masks 20 were stretched (acceptable products).

FIG. 31 shows measurement results when the P1 point and the Q1 point, and the P2 point and the Q2 point were set in centers of the through holes 25 wherein $\alpha_X$ was 200 mm and $\alpha_Y$ was 21.7 mm (⅓ of 65 mm). The dimensions X1 and X2 measured in this case were substituted into the aforementioned Equation (1) to calculate the left-hand member of the Equation (1). FIG. 31 shows the calculation results as $|\alpha_X-(X1+X2)/2|$. FIG. 31 shows dimension measurement results of the twenty-five deposition masks 20 obtained from the twenty-five samples, respectively. Herein, since $\alpha_X$ is 200 mm, a value of the right-hand member (threshold value of left-hand member) of the Equation (1) is 13.3 μm. Among the 1$^{st}$ to 25$^{th}$ samples, the 1$^{st}$ to 10$^{th}$ samples, the 21$^{st}$ sample, the 22$^{nd}$ sample, the 24$^{th}$ sample and the 25$^{th}$ sample satisfied the Equation (1). Thus, the 1$^{st}$ to 10$^{th}$ samples, the 21$^{st}$ sample, the 22$^{nd}$ sample, the 24$^{th}$ sample and the 25$^{th}$ sample were determined to be deposition masks 20 capable of improving the positional accuracy of the through holes 25 when the deposition masks 20 were stretched (acceptable products).

In addition, the dimensions X1 and X2 of the deposition mask 20 were substituted into the aforementioned Equation (2) to calculate the left-hand member of the Equation (2). FIG. 31 shows the calculation results as |X1−X2|. Herein, since $\alpha_Y$ is 21.7 mm, a value of the right-hand member (threshold value of left-hand member) of the Equation (2) is 6.7 μm. Among the 1$^{st}$ to 25$^{th}$ samples, the 1$^{st}$ to 6$^{th}$ samples, the 11$^{th}$ to 16$^{th}$ samples, the 21$^{st}$ sample and the 23$^{rd}$ sample satisfied the Equation (2). Thus, the deposition masks 20 of the 1$^{st}$ to 6$^{th}$ samples, the 11$^{th}$ to 16$^{th}$ samples, the 21$^{st}$ sample and the 23$^{rd}$ sample were determined to be deposition masks 20 capable of improving the positional accuracy of the through holes 25 when the deposition masks 20 were stretched (acceptable products).

Further, overall determination results in FIG. 31 show that, among the 1$^{st}$ to 25$^{th}$ samples, the 1$^{st}$ to 6$^{th}$ samples and the 21$^{st}$ sample satisfied the Equation (1) and the Equation (2). Thus, the deposition masks 20 of the 1$^{st}$ to 6$^{th}$ samples and the 21$^{st}$ sample were determined to be deposition masks 20 capable of further improving the positional accuracy of the through holes 25 when the deposition masks 20 were stretched (acceptable products).

As shown in FIGS. 29 to 31, when the quality of the deposition mask 20 was determined based on the P1 point, the Q1 point, the P2 point and the Q2 point which were set at different $\alpha_Y$ values, the same determination result was obtained. This shows that the quality of the deposition mask 20 can be suitably determined regardless of the distance between the P1 point and the P2 point (distance between Q1 point and Q2 point). Namely, it can be said that the use of at least one of the Equation (1) and the Equation (2) can suppress the quality determination result from being susceptible to the distance between the P1 point and the P2 point (distance between Q1 point and Q2 point).

FIGS. 32 to 34 show measurement results and quality determination results when the P1 point and the Q1 point, and the P2 point and the Q2 point were set in centers of the through holes 25 wherein $\alpha_X$ was 300 mm. In FIG. 32, $\alpha_Y$ is 65.0 mm, in FIG. 33, $\alpha_Y$ is 43.3 mm, and in FIG. 34, $\alpha_Y$ is 21.7 mm. In FIGS. 32 to 34, since $\alpha_X$ is 300 mm, a value of the right-hand member (threshold value of left-hand member) of the Equation (1) is 20.0 μm. In FIG. 32, since $\alpha_Y$ is 65.0 mm, a value of the right-hand member (threshold value of left-hand member) of the Equation (2) is 30.0 μm. In FIG. 33, since $\alpha_Y$ is 43.3 mm, a value of the right-hand member (threshold value of left-hand member) of the Equation (2) is 20.0 μm. In FIG. 34, since $\alpha_Y$ is 21.7 mm, a value of the right-hand member (threshold value of left-hand member) of the Equation (2) is 10.0 μm.

Also in the cases of FIGS. 32 to 34, the same determination results as those shown in FIGS. 29 to 31 were obtained. Namely, since the deposition masks 20 of the 1$^{st}$ to 10$^{th}$ samples, the 21$^{st}$ sample, the 22$^{nd}$ sample, the 24$^{th}$ sample and the 25$^{th}$ sample satisfied the Equation (1), they were determined to be deposition masks 20 capable of improving the positional accuracy of the through holes 25 when the they were stretched (acceptable products). Since the deposition masks 20 of the 1$^{st}$ to 6$^{th}$ samples, the 11$^{th}$ to 16$^{th}$ samples, the 21$^{st}$ sample and the 23$^{rd}$ sample satisfied the Equation (2), they were determined to be deposition masks 20 capable of improving the positional accuracy of the through holes 25 when they were stretched (acceptable products). Further, the deposition masks 20 of the 1$^{st}$ to 6$^{th}$ samples and the 21$^{st}$ sample satisfied the Equation (1) and the Equation (2), they were determined to be deposition masks 20 capable of further improving the positional accuracy of the through holes 25 when they were stretched (acceptable products). In addition, it was shown that the use of at least one of the Equation (1) and the Equation (2) can suppress the quality determination result from being susceptible to the distance between the P1 point and the P2 point (distance between Q1 point and Q2 point).

FIGS. 35 to 37 show measurement results and quality determination results when the P1 point and the Q1 point, and the P2 point and the Q2 point were set in centers of the through holes 25 wherein $\alpha_X$ was 400 mm. In FIG. 35, $\alpha_Y$ is 65.0 mm, in FIG. 36, $\alpha_Y$ is 43.3 mm, and in FIG. 37, $\alpha_Y$ is 21.7 mm. In FIGS. 35 to 37, since $\alpha_X$ is 400 mm, a value of the right-hand member (threshold value of left-hand member) of the Equation (1) is 26.7 In FIG. 35, since $\alpha_Y$ is 65.0 mm, a value of the right-hand member (threshold value of left-hand member) of the Equation (2) is 40.0 μm. In FIG. 36, since $\alpha_Y$ is 43.3 mm, a value of the right-hand member (threshold value of left-hand member) of the Equation (2) is 26.7 μm. In FIG. 37, since $\alpha_Y$ is 21.7 mm, a value of the right-hand member (threshold value of left-hand member) of the Equation (2) is 13.3 μm.

FIGS. 38 to 40 show measurement results and quality determination results when the P1 point and the Q1 point, and the P2 point and the Q2 point were set in centers of the through holes 25 wherein $\alpha_X$ was 600 mm. In FIG. 38, $\alpha_Y$ is 65.0 mm, in FIG. 39, $\alpha_Y$ is 43.3 mm, and in FIG. 40, $\alpha_Y$ is 21.7 mm. In FIGS. 38 to 40, since $\alpha_X$ is 600 mm, a value of the right-hand member (threshold value of left-hand member) of the Equation (1) is 40.0 μm. In FIG. 38, since $\alpha_Y$ is 65.0 mm, a value of the right-hand member (threshold value of left-hand member) of the Equation (2) is 60.0 μm. In FIG. 39, since $\alpha_Y$ is 43.3 mm, a value of the right-hand member (threshold value of left-hand member) of the Equation (2) is 40.0 μm. In FIG. 40, since $\alpha_Y$ is 21.7 mm, a value of the right-hand member (threshold value of left-hand member) of the Equation (2) is 20.0 μm.

FIGS. 41 to 43 show measurement results and quality determination results when the P1 point and the Q1 point, and the P2 point and the Q2 point were set in centers of the through holes 25 wherein $\alpha_X$ was 800 mm. In FIG. 41, $\alpha_Y$ is 65.0 mm, in FIG. 42, $\alpha_Y$ is 43.3 mm, and in FIG. 43, $\alpha_Y$ is 21.7 mm. In FIGS. 41 to 43, since $\alpha_X$ is 800 mm, a value of the right-hand member (threshold value of left-hand member) of the Equation (1) is 53.3 μm. In FIG. 41, since $\alpha_Y$ is 65.0 mm, a value of the right-hand member (threshold value of left-hand member) of the Equation (2) is 80.0 μm. In FIG. 42, since $\alpha_Y$ is 43.3 mm, a value of the right-hand member (threshold value of left-hand member) of the Equation (2) is 53.3 μm. In FIG. 43, since $\alpha_Y$ is 21.7 mm, a value of the right-hand member (threshold value of left-hand member) of the Equation (2) is 26.7 μm.

FIGS. 44 to 46 show measurement results and quality determination results when the P1 point and the Q1 point, and the P2 point and the Q2 point were set in centers of the through holes 25 wherein $\alpha_X$ was 900 mm. In FIG. 44, $\alpha_Y$ is 65.0 mm, in FIG. 45, $\alpha_Y$ is 43.3 mm, and in FIG. 46, $\alpha_Y$ is 21.7 mm. In FIGS. 44 to 46, since $\alpha_X$ is 900 mm, a value of the right-hand member (threshold value of left-hand member) of the Equation (1) is 60.0 μm. In FIG. 44, since $\alpha_Y$ is 65.0 mm, a value of the right-hand member (threshold value of left-hand member) of the Equation (2) is 90.0 µm. In FIG. 45, since $\alpha_Y$ is 43.3 mm, a value of the right-hand member (threshold value of left-hand member) of the Equation (2) is 60.0 µm. In FIG. 46, since $\alpha_Y$ is 21.7 mm, a value of the right-hand member (threshold value of left-hand member) of the Equation (2) is 30.0 µm.

Also in the cases of FIGS. 35 to 46, the same determination results as those shown in FIGS. 29 to 31 were obtained. Namely, since the deposition masks 20 of the $1^{st}$ to $10^{th}$ samples, the $21^{st}$ sample, the $22^{nd}$ sample, the $24^{th}$ sample and the $25^{th}$ sample satisfied the Equation (1), they were determined to be deposition masks 20 capable of improving the positional accuracy of the through holes 25 when they were stretched (acceptable products). Since the deposition masks 20 of the $1^{st}$ to $6^{th}$ samples, the $11^{th}$ to $16^{th}$ samples, the $21^{st}$ sample and the $23^{rd}$ sample satisfied the Equation (2), they were determined to be deposition masks 20 capable of improving the positional accuracy of the through holes 25 when they were stretched (acceptable products). Further, the deposition masks 20 of the $1^{st}$ to $6^{th}$ samples and the $21^{st}$ sample satisfied the Equation (1) and the Equation (2), they were determined to be deposition masks 20 capable of further improving the positional accuracy of the through holes 25 when they were stretched (acceptable products). In addition, it was shown that the use of at least one of the Equation (1) and the Equation (2) can suppress the quality determination result from being susceptible to the distance between the P1 point and the P2 point (distance between Q1 point and Q2 point).

Namely, as shown in FIGS. 29 to 46, even when the quality of the deposition mask 20 was determined based on the P1 point, the Q1 point, the P2 point and the Q2 point which were set at different $\alpha_X$ values, the same determination result was obtained. This shows that the quality of the deposition mask 20 can be suitably determined regardless of the distance between the P1 point and the Q1 point (distance between P2 point and Q2 point). Namely, it can be said that the use of at least one of the Equation (1) and the Equation (2) can suppress the quality determination result from being susceptible to the distance between the P1 point and the Q1 point (distance between P2 point and Q2 point).

The invention claimed is:

1. A method of manufacturing a deposition mask extending in a first direction, the method comprising:
a step of supplying an elongated metal plate extending in a strip shape;
a step of etching the metal plate by a photolithographic technique to form a first recess in the metal plate from a first surface side; and
a step of etching the metal plate by the photolithography technique to form a second recess in the metal plate from a second surface side,
the deposition mask comprises:
a first center axis line that extends in the first direction and is arranged at a center position of a second direction orthogonal to the first direction;
a P1 point and a Q1 point that are provided on one side of the first center axis line and are spaced apart from each other along the first direction; and
a P2 point and a Q2 point that are provided on the other side of the first center axis line and are spaced apart from each other along the first direction, and
a plurality of through holes formed by communicating the first recess and the second recess with each other,
wherein the deposition mask satisfies an equation below:

$$|X1 - X2| \leq \frac{\alpha_X}{10} \times \frac{\alpha_Y}{W_Y} \times 10^{-3}$$

in which X1 represents a dimension from the P1 point to the Q1 point, X2 represents a dimension from the P2 point to the Q2 point, and $\alpha_X$ represents a design value of the dimension X1 and the dimension X2,
wherein through holes of the plurality of through holes are positioned between the P1 point and the Q1 point in the first direction, and
other through holes of the plurality of through holes are positioned between the P2 point and the Q2 point in the first direction.

2. The method of manufacturing a deposition mask according to claim 1, wherein:
the deposition mask has a plurality of through holes formed by communicating the first recess and the second recess with each other; and
wherein the deposition mask satisfies an equation below:

$$|X1 - X2| \leq \frac{\alpha_X}{10} \times \frac{\alpha_Y}{W_Y} \times 10^{-3}$$

in which $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of the two through holes in the second direction.

3. A method of manufacturing a deposition mask extending in a first direction, the method comprising:
a step of supplying an elongated metal plate extending in a strip shape;
a step of etching the metal plate by a photolithographic technique to form a first recess in the metal plate from a first surface side; and
a step of etching the metal plate by the photolithography technique to form a second recess in the metal plate from a second surface side,
the deposition mask comprises:
a first center axis line that extends in the first direction and is arranged at a center position of a second direction orthogonal to the first direction;
a P1 point and a Q1 point that are provided on one side of the first center axis line and are spaced apart from each other along the first direction;
a P2 point and a Q2 point that are provided on the other side of the first center axis line and are spaced apart from each other along the first direction; and
a plurality of through holes formed by communicating the first recess and the second recess with each other,
wherein the deposition mask satisfies an equation below:

$$|X1 - X2| \leq \frac{\alpha_X}{10} \times \frac{\alpha_Y}{W_Y} \times 10^{-3}$$

in which X1 represents a dimension from the P1 point to the Q1 point, X2 represents a dimension from the P2 point to the Q2 point, $\alpha_X$ represents a design value of the dimension X1 and the dimension X2, $\alpha_Y$ represents a design value of a dimension from the P1 point to the P2 point and a dimension from the Q1 point to the Q2 point, and $W_Y$ represents a maximum value of a distance between center points of two through holes in the second direction, wherein through holes of the plurality of through holes are positioned between the P1 point and the Q1 point in the first direction, and other through holes of the plurality of through holes are positioned between the P2 point and the Q2 point in the first direction.

4. A method of manufacturing a deposition mask device comprising:

a step of preparing the deposition mask by the method of manufacturing a deposition mask according to claim 1; and a step of applying a tensile force to the deposition mask in the first direction and stretching the deposition mask on a frame.

5. A method of depositing a deposition material on a substrate comprising:

a step of preparing the deposition mask device by the method of manufacturing a deposition mask device according to claim 4;

a step of bringing the deposition mask of the deposition mask device into tight contact with the substrate; and a step of depositing the deposition material on the substrate through the through holes of the deposition mask.

6. A method of manufacturing a deposition mask device comprising:

a step of preparing the deposition mask by the method of manufacturing a deposition mask according to claim 3; and a step of applying a tensile force to the deposition mask in the first direction and stretching the deposition mask on a frame.

7. A method of depositing a deposition material on a substrate comprising:

a step of preparing the deposition mask device by the method of manufacturing a deposition mask device according to claim 6;

a step of bringing the deposition mask of the deposition mask device into tight contact with the substrate; and a step of depositing the deposition material on the substrate through the through holes of the deposition mask.

* * * * *